(12) United States Patent
He et al.

(10) Patent No.: US 7,910,020 B2
(45) Date of Patent: *Mar. 22, 2011

(54) LIQUID CRYSTAL COMPOSITIONS COMPRISING MESOGEN CONTAINING COMPOUNDS

(75) Inventors: Meng He, Murrysville, PA (US); Anil Kumar, Murrysville, PA (US); Jiping Shao, Monroeville, PA (US); Xiao-Man Dai, Export, PA (US); Ruisong Xu, Monroeville, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/489,843

(22) Filed: Jun. 23, 2009

(65) Prior Publication Data

US 2009/0323012 A1    Dec. 31, 2009

Related U.S. Application Data

(63) Continuation-in-part of application No. 12/163,116, filed on Jun. 27, 2008, now abandoned, and a continuation-in-part of application No. 12/163,180, filed on Jun. 27, 2008, now abandoned.

(51) Int. Cl.
   C09K 19/00     (2006.01)
   C09K 19/06     (2006.01)
   C09K 19/52     (2006.01)
   G02F 1/13      (2006.01)
   C07C 69/76     (2006.01)

(52) U.S. Cl. ........... 252/299.01; 252/299.6; 252/299.61; 252/299.62; 349/13; 349/182; 349/193; 560/59; 560/60; 560/81; 549/415; 549/416; 430/20; 428/1.1

(58) Field of Classification Search ............ 252/299.01, 252/299.1, 299.6–299.62; 349/1, 56, 117, 349/13, 182, 193; 430/20; 428/1.1; 560/59, 560/61, 81; 549/415, 416
See application file for complete search history.

(56) References Cited

U.S. PATENT DOCUMENTS

| | | | |
|---|---|---|---|
| 4,539,048 A | 9/1985 | Cohen | |
| 4,539,049 A | 9/1985 | Cohen | |
| 4,556,605 A | 12/1985 | Magomi et al. | |
| 4,650,526 A | 3/1987 | Claffey et al. | |
| 4,756,973 A | 7/1988 | Sakagami et al. | |
| 4,931,220 A | 6/1990 | Haynes et al. | |
| 5,458,814 A | 10/1995 | Kumar et al. | |
| 5,466,398 A | 11/1995 | Van Gemert et al. | |
| 5,514,817 A | 5/1996 | Knowles | |
| 5,573,712 A | 11/1996 | Kumar et al. | |
| 5,578,252 A | 11/1996 | Van Gemert et al. | |
| 5,637,262 A | 6/1997 | Van Gemert et al. | |
| 5,645,767 A | 7/1997 | Van Gemert | |
| 5,650,098 A | 7/1997 | Kumar et al. | |
| 5,658,501 A | 8/1997 | Kumar et al. | |
| 5,698,141 A | 12/1997 | Kumar | |
| 5,723,072 A | 3/1998 | Kumar | |
| 5,800,733 A | 9/1998 | Kelly | |
| 5,871,665 A | 2/1999 | Coates et al. | |
| 5,891,368 A | 4/1999 | Kumar | |
| 5,962,617 A | 10/1999 | Slagel | |
| 6,022,495 A | 2/2000 | Kumar | |
| 6,022,497 A | 2/2000 | Kumar | |
| 6,025,026 A | 2/2000 | Smith et al. | |
| 6,060,001 A | 5/2000 | Welch et al. | |
| 6,080,338 A | 6/2000 | Kumar | |
| 6,099,752 A | 8/2000 | Hall et al. | |
| 6,106,744 A | 8/2000 | Van Gemert et al. | |
| 6,113,814 A | 9/2000 | Van Gemert et al. | |
| 6,136,968 A | 10/2000 | Chamontin et al. | |
| 6,149,841 A | 11/2000 | Kumar | |
| 6,150,430 A | 11/2000 | Walters et al. | |
| 6,153,126 A | 11/2000 | Kumar | |
| 6,187,444 B1 | 2/2001 | Bowles, III et al. | |
| 6,217,948 B1 | 4/2001 | Verrall et al. | |
| 6,248,264 B1 | 6/2001 | Clarke et al. | |
| 6,268,055 B1 | 7/2001 | Walters et al. | |
| 6,296,785 B1 | 10/2001 | Nelson et al. | |
| 6,338,808 B1 | 1/2002 | Kawata et al. | |
| 6,348,604 B1 | 2/2002 | Nelson et al. | |
| 6,353,102 B1 | 3/2002 | Kumar | |
| 6,432,544 B1 | 8/2002 | Stewart et al. | |
| 6,433,043 B1 | 8/2002 | Misura et al. | |
| 6,436,525 B1 | 8/2002 | Welch et al. | |
| 6,459,847 B1 | 10/2002 | Van De Witte et al. | |
| 6,506,488 B1 | 1/2003 | Stewart et al. | |
| 6,531,076 B2 | 3/2003 | Crano et al. | |
| 6,555,028 B2 | 4/2003 | Walters et al. | |
| 6,597,856 B2 | 7/2003 | Van De Witte et al. | |
| 6,602,603 B2 | 8/2003 | Welch et al. | |
| 6,630,597 B1 | 10/2003 | Lin et al. | |
| 6,641,874 B2 | 11/2003 | Kuntz et al. | |
| 6,660,344 B2 | 12/2003 | Lub | |
| 6,713,536 B2 | 3/2004 | Misura et al. | |

(Continued)

FOREIGN PATENT DOCUMENTS

GB     2311289 A     9/1997

(Continued)

OTHER PUBLICATIONS

Kirk-Othmer, *Kirk-Othmer Encyclopedia of Chemical Technology*, 4th ed., 1997, vol. 6, pp. 322-325.

(Continued)

*Primary Examiner* — Geraldina Visconti
(74) *Attorney, Agent, or Firm* — Deborah M. Altman; Frank P. Mallak

(57) ABSTRACT

Liquid crystal compositions comprising compounds including at least one mesogenic substructure and at least one long flexible segment and a compound selected from a photochromic compound, a dichroic compound and a photochromic-dichroic compound and methods of synthesizing the same and their use in articles of manufacture and ophthalmic devices are disclosed.

20 Claims, 13 Drawing Sheets

U.S. PATENT DOCUMENTS

| | | |
|---|---|---|
| 6,733,689 B1 | 5/2004 | Meyer et al. |
| 6,733,690 B1 | 5/2004 | Lukac et al. |
| 6,736,998 B2 | 5/2004 | Petrovskaia et al. |
| 6,773,626 B2 | 8/2004 | Sanada et al. |
| 6,875,483 B2 | 4/2005 | Ichihashi et al. |
| 6,941,051 B2 | 9/2005 | Xu et al. |
| 7,029,728 B2 | 4/2006 | Dunn et al. |
| 7,058,249 B2 | 6/2006 | Purchase et al. |
| 7,094,368 B2 | 8/2006 | Kim et al. |
| 7,097,303 B2 | 8/2006 | Kumar et al. |
| 7,098,359 B2 | 8/2006 | Wellinghoff et al. |
| 7,169,448 B2 | 1/2007 | Coates et al. |
| RE39,605 E | 5/2007 | Verrall et al. |
| 7,238,831 B2 | 7/2007 | Wellinghoff et al. |
| 7,256,921 B2 | 8/2007 | Kumar et al. |
| 7,262,295 B2 | 8/2007 | Walters et al. |
| 7,320,826 B2 | 1/2008 | Kumar et al. |
| 7,342,112 B2 | 3/2008 | Kumar et al. |
| 7,410,691 B2 | 8/2008 | Blackburn et al. |
| 7,481,955 B2 | 1/2009 | Xiao |
| 7,618,690 B2 | 11/2009 | Nagayama et al. |
| 7,632,540 B2 | 12/2009 | Kumar et al. |
| 7,632,906 B2 | 12/2009 | Studer et al. |
| 2005/0040364 A1 | 2/2005 | Cherkaoui et al. |
| 2006/0049381 A1 | 3/2006 | Klein et al. |
| 2008/0081133 A1 | 4/2008 | Kato |
| 2009/0146104 A1 | 6/2009 | He et al. |
| 2009/0247782 A1 | 10/2009 | Irisawa et al. |

FOREIGN PATENT DOCUMENTS

| | | |
|---|---|---|
| WO | WO 01/02449 | 1/2001 |
| WO | WO 02/48282 | 6/2002 |
| WO | WO 2006/003435 | 1/2006 |
| WO | WO 2008/091090 A1 | 7/2008 |

OTHER PUBLICATIONS

Lewis, R.J., *Hawley's Condensed Chemical Dictionary*, 13th ed., 1997, John Wiley & Sons, New York, pp. 901-902.

"Structure-Property-Relationship in Polyurethanes", in *Polyurethane Handbook*, 2nd ed. Oertel, G. ed., 1994, Hanser Publishers, pp. 37-53.

"Photochromism", in *Techniques in Chemistry*, vol. III, 1971, John Wiley & Sons, New York.

Ullmann's Encyclopedia of Industrial Chemistry, 5h ed., vol. A21, 1992, pp. 665-716.

Baron, M. et al., "Definitions of Basic Terms Relating to Polymer Liquid Crystals (IUPAC Recommendations 2001)", Pure Appl. Chem., 2002, 74(3), 493-509.

Scruggs, N.R., "Conformational Anisotropy of Side-Group Liquid Crystal Polymers in Nematic Liquid Crystal Solvent: Small-Angle Neurtron Scattering of Semidilute Solutions", Chapter 5, 2007, pp. 122-142, available at etd.caltech.edu/etd/available/etd-02202007-131552/unrestricted/5_Chapter.pdf (last vistited Aug. 28, 2008).

LIQUID CRYSTAL COMPOSITIONS COMPRISING MESOGEN CONTAINING COMPOUNDS

CROSS-REFERENCE TO RELATED APPLICATIONS

This application is a continuation-in-part of U.S. patent application Ser. Nos. 12/163,116 and 12/163,180 which were filed Jun. 27, 2008, and each of which is hereby specifically incorporated by reference.

BACKGROUND

The present invention relates to a liquid crystal composition comprising a mesogen containing compound and a compound selected from a photochromic compound, a dichroic compound and a photochromic-dichroic compound, formulations thereof, optical elements, liquid crystal polymers comprising same and methods of making same.

The molecules of a liquid crystal ("LC") tend to align with one another in a preferred direction, yielding a fluid material with anisotropic optical, electromagnetic, and mechanical properties. The mesogen is the fundamental unit of a LC which induces the structural order in the liquid crystals.

Liquid crystal polymers ("LCPs") are polymers capable of forming regions of highly ordered structure while in a liquid phase. LCPs have a wide range of uses, ranging from strong engineering plastics to delicate gels for LC displays. The structure of LCPs may consist of densely packed fibrous polymer chains that provide self-reinforcement almost to the melting point of the polymer.

Dichroism may occur in LCs due to either the optical anisotropy of the molecular structure or the presence of impurities or the presence of dichroic dyes. As used herein, the term "dichroism", means the ability to absorb one of two orthogonal plane polarized components of at least transmitted radiation more strongly than the other.

Conventional, linearly polarizing elements, such as linearly polarizing lenses for sunglasses and linearly polarizing filters, are typically formed from stretched polymer sheets containing a dichroic material, such as a dichroic dye. Consequently, conventional linearly polarizing elements are static elements having a single, linearly polarizing state. Accordingly, when a conventional linearly polarizing element is exposed to either randomly polarized radiation or reflected radiation of the appropriate wavelength, some percentage of the radiation transmitted through the element will be linearly polarized. As used herein the term "linearly polarize" means to confine the vibrations of the electric vector of light waves to one direction or plane.

Further, conventional linearly polarizing elements are typically tinted. That is, conventional linearly polarizing elements contain a coloring agent (i.e., the dichroic material) and have an absorption spectrum that does not vary in response to actinic radiation. As used herein "actinic radiation" means electromagnetic radiation, such to ultraviolet and visible radiation that is capable of causing a response. The color of the conventional linearly polarizing element will depend upon the coloring agent used to form the element, and most commonly, is a neutral color (for example, brown or gray). Thus, while conventional linearly polarizing elements are useful in reducing reflected light glare, because of their tint, they are not well suited for use under certain low-light conditions. Further, because conventional linearly polarizing elements have only a single, tinted linearly polarizing state, they are limited in their ability to store or display information.

As discussed above, conventional linearly polarizing elements are typically formed using sheets of stretched polymer films containing a dichroic material. As used herein the term "dichroic" means capable of absorbing one of two orthogonal plane polarized components of at least transmitted radiation more strongly than the other. Thus, while dichroic materials are capable of preferentially absorbing one of two orthogonal plane polarized components of transmitted radiation, if the molecules of the dichroic material are not suitably positioned or arranged, no net linear polarization of transmitted radiation will be achieved. That is, due to the random positioning of the molecules of the dichroic material, selective absorption by the individual molecules will cancel each other such that no net or overall linear polarizing effect is achieved. Thus, it is generally necessary to suitably position or arrange the molecules of the dichroic material by alignment with another material in order to achieve a net linear polarization.

In contrast to the dichroic elements discussed above, conventional photochromic elements, such as photochromic lenses that are formed using conventional thermally reversible photochromic materials, are generally capable of converting from a first state, for example, a "clear state," to a second state, for example, a "colored state," in response to actinic radiation, and then reverting back to the first state in response to thermal energy. As used herein, the term "photochromic" means having an absorption spectrum for at least visible radiation that varies in response to at least actinic radiation. Thus, conventional photochromic elements are generally well suited for use in both low-light conditions and bright conditions. However, conventional photochromic elements that do not include linearly polarizing filters are generally not adapted to linearly polarize radiation. That is, the absorption ratio of conventional photochromic elements, in either state, is generally less than two. As used herein, the term "absorption ratio" refers to the ratio of absorbance of radiation linearly polarized in a first plane to the absorbance of the same wavelength radiation linearly polarized in a plane orthogonal to the first plane, wherein the first plane is taken as the plane with the highest absorbance. Therefore, conventional photochromic elements cannot reduce reflected light glare to the same extent as conventional linearly polarizing elements. Thus, photochromic-dichroic materials have been developed. Photochromic-dichroic materials are materials that display photochromic properties (i.e., having an absorption spectrum for at least visible radiation that varies in response to at least actinic radiation) and dichroic properties (i.e., capable of absorbing one of two orthogonal plane polarized components of at least transmitted radiation more strongly than the other).

Photochromic materials and photochromic-dichroic materials may be incorporated into a substrate or an organic material, for example a polymer substrate, including LCP substrates. When photochromic materials and photochromic-dichroic materials undergo a change from one state to another, the molecule(s) of the photochromic compound or photochromic-dichroic compound may undergo a conformational change from one conformational state to a second conformational state. This conformational change may result in a change in the amount of space that the compound occupies. However, for certain photochromic materials and certain photochromic-dichroic materials to effectively transition from one state to another, for example to transition from a clear state to a colored state, to transition from a colored state to a clear state, to transition from a non-polarized state to a polarized state, and/or to transition from a polarized state to a non-polarized state, the photochromic compound or photochromic-dichroic compound must be in an chemical environment that is sufficiently flexible to allow the compound to transition from one conformational state to the second conformational state at a rate that is sufficient to provide the desired response on over an acceptable time frame. Therefore, new polymeric materials, such as new LCPs, and materials to form these new materials are necessary to further develop photochromic and photochromic-dichroic materials and substrates.

BRIEF SUMMARY OF THE DISCLOSURE

The present disclosure provides for a liquid crystal composition comprising:

a mesogen containing compound represented by one of the following structures:

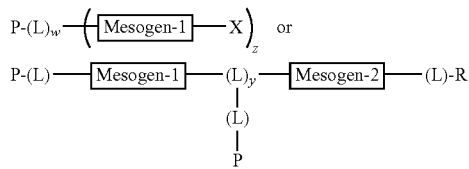

wherein,
a) each X is independently:
  i) a group R,
  ii) a group represented by $-(L)_y$-R,
  iii) a group represented by -(L)-R,
  iv) a group represented by $-(L)_w$-Q;
  v) a group represented by

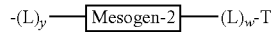

vi) a group represented by $-(L)_y$-P; or
  vi) a group represented by $-(L)_w$-[$(L)_w$-P]$_y$;
b) each P is a reactive group independently selected from a group Q, amino, alkylamino, nitro, acrylate, methacrylate, 2-chloroacrylate, 2-phenylacrylate, acryloylphenylene, acrylamide, methacrylamide, 2-chloroacrylamide, 2-phenylacrylamide, oxetane, glycidyl, cyano, vinyl ether, vinyl ester, a styrene derivative, siloxane, ethyleneimine derivatives, or substituted or unsubstituted chiral or non-chiral monovalent or divalent groups chosen from steroid radicals, terpenoid radicals, alkaloid radicals and mixtures thereof, wherein the substituents are independently chosen from alkyl, alkoxy, amino, cycloalkyl, alkylalkoxy, fluoroalkyl, cyano, cyanoalkyl, cyanoalkoxy or mixtures thereof, or P is a structure having from 2 to 4 reactive groups or P is an unsubstituted or substituted ring opening metathesis polymerization precursor;
c) the group Q is hydroxy, amine, alkenyl, alkynyl, azido, silyl, silylhydride, oxy(tetrahydro-2H-pyran-2-yl), thiol, isocyanato, thioisocyanato, acryloxy, methacryloxy, 2-(acryloxy)ethylcarbamyl, 2-(methacryloxy)ethylcarbamyl, aziridinyl, allyloxycarbonyloxy, epoxy, carboxylic acid, carboxylic acid derivatives particularly selected from carboxylic ester, amide and carboxylic anhydride, or acyl halide, preferably the carboxylic acid derivatives are selected from itaconic acid ester, maleic acid derivatives, fumaric acid derivatives, unsubstituted cinnamic acid derivatives, cinnamic acid derivatives that are substituted with at least one of methyl, methoxy, cyano and halogen;

d) each L is independently chosen for each occurrence, the same or different, from a single bond, a polysubstituted, monosubstituted, unsubstituted or branched spacer independently chosen from arylene, $(C_1-C_{30})$alkylene, $(C_1-C_{30})$alkylenecarbonyloxy, $(C_1-C_{30})$alkyleneamino, $(C_1-C_{30})$alkyleneoxy, $(C_1-C_{30})$perfluoroalkylene, $(C_1-C_{30})$perfluoroalkyleneoxy, $(C_1-C_{30})$alkylenesilyl, $(C_1-C_{30})$dialkylenesiloxyl, $(C_1-C_{30})$alkylenecarbonyl, $(C_1-C_{30})$alkyleneoxycarbonyl, $(C_1-C_{30})$alkylenecarbonylamino, $(C_1-C_{30})$alkyleneaminocarbonyl, $(C_1-C_{30})$alkyleneaminocarbonyloxy, $(C_1-C_{30})$alkyleneaminocarbonylamino, $(C_1-C_{30})$alkyleneurea, $(C_1-C_{30})$alkylenethiocarbonylamino, $(C_1-C_{30})$alkyleneaminocarbonylthio, $(C_2-C_{30})$alkenylene, $(C_1-C_{30})$thioalkylene, $(C_1-C_{30})$alkylenesulfone, or $(C_1-C_{30})$alkylenesulfoxide, wherein each substituent is independently chosen from $(C_1-C_5)$alkyl, $(C_1-C_5)$alkoxy, fluoro, chloro, bromo, cyano, $(C_1-C_5)$alkanoate ester, isocyanato, thioisocyanato, or phenyl;

e) the group R is selected from hydrogen, $C_1-C_{18}$ alkyl, $C_1-C_{18}$ alkoxy, $C_1-C_{18}$ alkoxycarbonyl, $C_3-C_{10}$ cycloalkyl, $C_3-C_{10}$ cycloalkoxy, poly$(C_1-C_{18}$ alkoxy), or a straight-chain or branched $C_1-C_{18}$ alkyl group that is unsubstituted or substituted with cyano, fluoro, chloro, bromo, or $C_1-C_{18}$ alkoxy, or poly-substituted with fluoro, chloro, or bromo; and f) the groups Mesogen-1 and Mesogen-2 are each independently a rigid straight rod-like liquid crystal group, a rigid bent rod-like liquid crystal group, or a rigid disc-like liquid crystal group;

g) the group T is selected from P and hydrogen, aryl, alkyl, alkoxy, alkylalkoxy, alkoxyalkoxy, polyalkylether, (C1-C6)alkyl(C1-C6)-alkoxy(C1-C6)alkyl, polyethyleneoxy and polypropyleneoxy.

wherein w is an integer from 1 to 26, y is an integer from 2 to 25, z is 1 or 2, provided that when:

(i) the group X is represented by R, then w is an integer from 2 to 25, and z is 1;
(ii) the group X is represented by $-(L)_y$-R, then w is 1, y is an integer from 2 to 25, and z is 1;
(iii) the group X is represented by $-(L)_w$-R, then w is an integer from 3 to 26, and z is 2;
(iv) the group X is represented by $-(L)_w$-Q; then if P is represented by the group Q, then w is 1, and z is 1; and if P is other than the group Q, then each w is independently an integer from 1 to 26, and z is 1;
(v) the group X is represented by

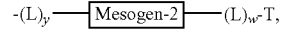

then w is 1, y is an integer from 2 to 25, and z is 1;
(vi) the group X is represented by $-(L)_y$-P, then w is 1, y is an integer from 2 to 25, and z is 1 and $-(L)_y$-comprises a linear sequence of at least 25 bonds between the mesogen and P;
(vii) the group X is represented by $-(L)_w$-[$(L)_w$-P]$_y$, then each w is independently an integer from 1 to 25, y is an integer from 2 to 6, whereby and z is 1; and in $-(L)_y$-and $-(L)_w$-no two arylene groups are linked by a single bond;

or residue thereof;

a compound selected from a photochromic compound, a dichroic compound and a photochromic-dichroic compound; and optionally a liquid crystal polymer.

According to another embodiment, the present disclosure provides for an optical element comprising a substrate and an at least partial layer on at least a portion of the substrate, the layer comprising a liquid crystal composition as described herein.

Still another embodiment of the present disclosure provides for an ophthalmic element comprising a substrate and an at least partial layer comprising a liquid crystal composition as described herein on at least a portion of a surface of the substrate. Preferably, the dichroic compound and the photochromic-dichroic compound are at least partially aligned. The composition may further comprise one or more additives; a liquid crystal polymer, preferably having a Fischer microhardness ranging from 0 Newtons/mm$^2$ to 150 Newtons/mm$^2$. According to these embodiments, the one or more additives are selected from the group consisting of a liquid crystal, a liquid crystal property control additive, a non-linear optical material, a dye, an alignment promoter, a kinetic enhancer, a photoinitiator, a thermal initiator, a surfactant, a polymerization inhibitor, a solvent, a light stabilizer, a thermal stabilizer, a mold release agent, a rheology control agent, a gelator, a leveling agent, a free radical scavenger, a coupling agent, a tilt control additive, a block or non-block polymeric material, and an adhesion promoter.

Further embodiments of the present disclosure provide for a liquid crystal cell comprising a first substrate having a first surface, a second substrate having a second surface, wherein the second surface of the second substrate is opposite and spaced apart from the first surface of the first substrate so as to define a region, and a liquid crystal composition as described herein positioned within the region defined by the first surface and the second surface.

Still further embodiments of the present disclosure provide for an article of manufacture comprising a composition comprising a liquid crystal composition as described herein.

Other embodiments of the present disclosure provide for a method of forming an ophthalmic element. The method comprises formulating a liquid crystal composition as described herein; coating at least a portion of a substrate with the liquid crystal composition; at least partially aligning at least a portion of the liquid crystal composition in the coating; and curing the liquid crystal coating layer.

BRIEF DESCRIPTION OF THE SEVERAL VIEWS OF THE DRAWINGS

Aspects of the present disclosure will be better understood when read in conjunction with the figures, in which:

FIGS. 1-13 illustrate exemplary methods for synthesizing certain embodiments of the mesogen containing compounds described herein. In particular:

FIG. 1 illustrates Lewis acid catalyzed or base catalyzed processes for synthesizing a mesogen containing soft chain acrylate system;

FIGS. 3 and 4 illustrate two processes for synthesizing bi-mesogen containing compounds having structures according to Formula IV;

FIG. 5 illustrates the use of a Mitsunobo coupling reaction for synthesizing a bi-mesogen containing compound having a structure according to Formula IV;

FIG. 6 illustrates a process for synthesizing mesogen containing compounds having a structure according to Formula VI or VII;

FIG. 7 illustrates the use of a polycarbonate linking group according to certain embodiments of Formula II;

FIG. 8 illustrates a process for synthesizing a mesogen containing compound having a structure according to Formula III;

FIG. 9 illustrates a process for synthesizing a bi-mesogen containing compound having a structure according to Formula VI;

FIGS. 10 and 11 illustrate processes for synthesizing mesogen containing compounds having structures according to Formula VI;

FIG. 12 illustrates a process for synthesizing mesogen containing compounds having structures according to Formula VI or VII; and FIG. 13 illustrates a process for synthesizing mesogen containing compounds having a structure according to Formula VIII.

DETAILED DESCRIPTION OF THE EMBODIMENTS

Figure 1:
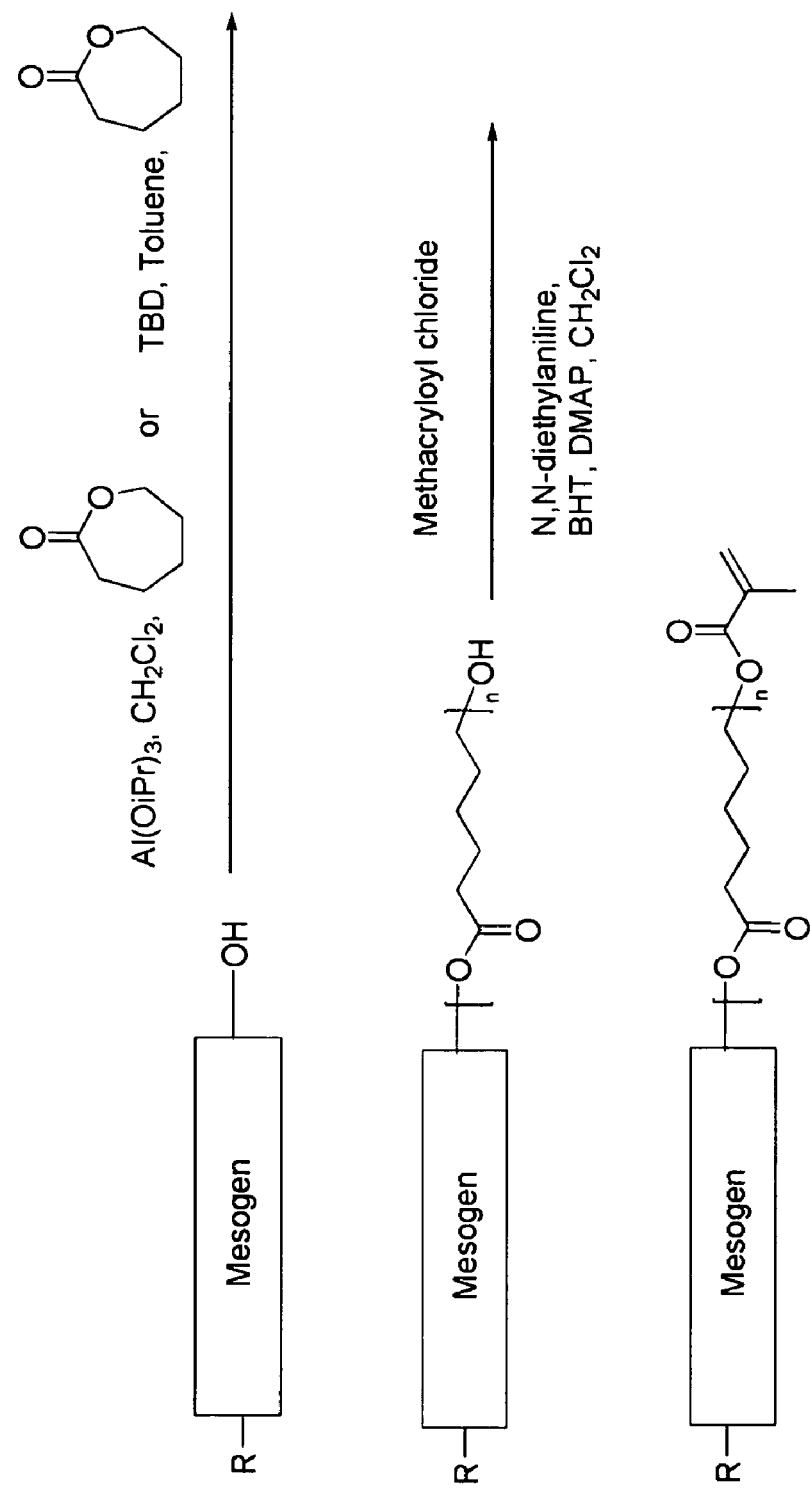

As used in this specification and the appended claims, the articles "a", "an", and "the" include plural references unless expressly and unequivocally limited to one referent.

Liquid crystal compositions and formulations containing the mesogen containing compounds according to various embodiments of the present disclosure will now be described. According to certain embodiments, the formulations and compositions may be used, for example liquid crystal polymers ("LCPs"), in optical elements such as, for example, ophthalmic elements, display elements, windows, and mirrors. According to certain embodiments, the mesogen containing compounds of the present disclosure may act as monomers for the formation of LCPs.

The mesogen is the fundamental unit of a liquid crystal ("LC"), which induces the structural order in the liquid crystal. The mesogenic portion of the LC typically comprises a rigid moiety which aligns with other mesogenic components in the LC composition, thereby aligning the LC molecules in one direction. The rigid portion of the mesogen may consist of a rigid molecular structure, such as a mono or polycyclic ring structure, including, for example a mono or polycyclic aromatic ring structures. Examples of potential mesogens are set forth in greater detail herein and include those mesogenic compounds set forth in Demus et al., "Flüssige Kristalle in Tabellen," VEB Deutscher Verlag für Grundstoffindustrie, Leipzig, 1974 and "Flüssige Kristalle in Tabellen II," VEB Deutscher Verlag für Grundstoffindustrie, Leipzig, 1984. LCs may also include one or more flexible portions in the LC molecule. The one or more flexible portions may impart fluidity to the LC. LCs may exist in a non-ordered state or an ordered (or aligned) state. The LC molecules in the non-ordered state will adopt an essentially random orientation, that is there will be no general orientation to the LC molecules. The LC molecules in the ordered or aligned state will generally adopt an orientation where the mesogenic portions of the LC molecules are at least partially aligned throughout the LC material. As used herein, the terms "align" or "aligned" means to bring into suitable arrangement or position by interaction with another material, compound or structure. In certain embodiments, the mesogenic portions of the LC molecules may be at least partially aligned in a parallel orientation. In other embodiments, the mesogenic portions of the LC molecules may be at least partially aligned in a helical orientation, such as in a reflective polarizer.

The mesogen containing compounds of the present disclosure may be used for a variety of functions, such as, as LC compositions and as monomers for the synthesis of LCPs. The mesogen containing compounds of the present disclosure may behave as monomers to form polymers or may act as non-monomeric components, such as non-monomeric LC components. In certain embodiments, the mesogen containing compounds may form crosslinked networks or LCPs. As used herein the term "compound" means a substance formed by the union of two or more elements, components, ingredients, or parts and includes, molecules and macromolecules (for example polymers and oligomers) formed by the union of two or more elements, components, ingredients, or parts. The compositions formed from the mesogen containing compounds may have a variety of uses, including, as layers, such as, cured coatings and films on at least a portion of a substrate, which may impart certain desired characteristics to the substrate, and as articles of manufacture, such as, molded articles, assembled articles and cast articles. For example, the compositions formed from the mesogen containing compounds may be used, for example as at least partial layers, coatings or films on at least a portion of a substrate which may impart certain desired characteristics to the substrate, such as, for use in optical data storage applications, as photomasks, as decorative pigments; in cosmetics and for security applications (see, for example U.S. Pat. No. 6,217,948); as curable resins for medical, dental, adhesive and stereolithographic applications (see, for example, U.S. Pat. No. 7,238,831); as articles of manufacture, such as, molded assembled, or cast articles for use in the aforementioned applications and various related devices.

In certain embodiments, the mesogen containing compositions may be formulated into LCs and/or LCPs which may be used or incorporated into optical elements such as, for example, ophthalmic elements, display elements, windows, mirrors, active and passive liquid crystal cells, elements and devices, and other LC or LCP containing articles of interest, such as, polarizers, optical compensators (see, for example, U.S. Pat. No. 7,169,448), optical retarders (see, for example, U.S. Reissue Pat. No. RE39,605 E), color filters, and waveplates for lightwave circuits (see, for example, U.S. Pat. No. 7,058,249). For example, the LCPs may be used to form optical films such as retarders, wave guides, reflectors, circular polarizers, wide view angle films, etc. As will be described in more detail herein, the mesogen containing materials of various embodiments of the present disclosure may be particularly suited to give the desired kinetic properties for photochromic or photochromic-dichroic materials, such as in ophthalmic elements and optical elements. In other embodiments, the LCPs may also be used as a host material for organic photochromic materials such as thermally and non-thermally reversible materials as well as photochromic/dichroic material, inorganic photochromic materials, fluorescent or phosphorescent materials and non-linear optical materials ("NLOs"). Non-photosensitive materials may include fixed tint dyes, dichroic materials, thermochroic materials, and pigments.

The mesogen containing compounds of the various embodiments of the present disclosure generally comprise at least one mesogen unit, at least one reactive group, and at least one flexible linking group as defined above which may be from 1 to 500 atomic bonds in linear length and may therefore act as LCs, which may be incorporated into materials or compositions which display LC properties or may be used as LC monomers, for example, for the formation of LCPs.

According to various embodiments, the mesogen containing compounds of the present disclosure may be represented by a compound having Formula I:

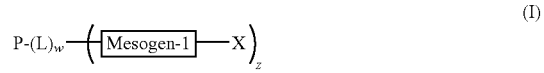

(I)

In Formula I, each X may be independently represented by: (i) a group —R; (ii) a group represented by the structure -(L)$_y$-R; (iii) a group represented by the structure -(L)-R; (iv) a group represented by the structure -(L)$_w$-Q; (v) a group represented by the structure:

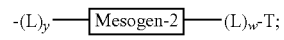

(vi) a group represented by -(L)$_y$-P; or (vii) a group represented by -(L)$_w$-[(L)$_w$-P]$_y$. Further, in Formula I, each group P represents a reactive group as defined above. For example, in certain embodiments, the reactive group may react with a group, react with a comonomer or a reactive group on a developing polymer such that the structure corresponding to Formula I or a residue thereof is incorporated into the polymer.

Further, in certain embodiments P may be a reactive group comprising a polymerizable group, wherein the polymerizable group may be any functional group adapted to participate in a polymerization reaction. Examples of polymerization reactions include those described in the definition of "polymerization" in *Hawley's Condensed Chemical Dictionary Thirteenth Edition*, 1997, John Wiley & Sons, pages 901-902. For example polymerization reactions include: "addition polymerization," in which free radicals are the initiating agents that react with the double bond of a monomer by adding to it on one side at the same time producing a new free electron on the other side; "condensation polymerization," in which two reacting molecules combine to form a larger molecule with elimination of a small molecule, such as a water molecule; and "oxidative coupling polymerization." In an additional embodiment, P may be an unsubstituted or substituted ring opening metathesis polymerization precursor. Further, examples of polymerizable groups include hydroxy, acryloxy, methacryloxy, 2-(acryloxy)ethylcarbamyl, 2-(methacryloxy)ethylcarbamyl, isocyanato, aziridine, allylcarbonate, and epoxy, e.g., oxiranylmethyl. In other embodiments, P may have a structure having a plurality of reactive groups, such as the reactive groups disclosed herein. For example, in certain embodiments, P may have a structure having from 2 to 4 reactive groups, as described herein. In certain embodiment, having multiple reactive groups on P may allow for more effective incorporation into a polymer or allow for cross-linking between individual polymer strands. Suitable examples of P groups with multiple reactive groups include diacryloyloxy($C_1$-$C_6$)alkyl; diacryloyloxyaryl; triacryloyloxy($C_1$-$C_6$)alkyl; triacryloyloxyaryl; tetraacryloyloxy($C_1$-$C_6$)alkyl; tetraacryloyloxyaryl; dihydroxy($C_1$-$C_6$)alkyl; trihydroxy($C_1$-$C_6$)alkyl; tetrahydroxy($C_1$-$C_6$)alkyl; diepoxy($C_1$-$C_6$)alkyl; diepoxyaryl; triepoxy($C_1$-$C_6$)alkyl; triepoxyaryl; tetraepoxy($C_1$-$C_6$)alkyl; tetraepoxyaryl; diglycidyloxy($C_1$-$C_6$)alkyl; diglycidyloxyaryl; triglycidyloxy($C_1$-$C_6$)alkyl; triglycidyloxyaryl; tetraglycidyloxy($C_1$-$C_6$)alkyl; and tetraglycidyloxyaryl.

Further, with reference to Formula I, each group Q may represent hydroxy, amine, alkenyl, alkynyl, azido, silyl, silylhydride, oxy(tetrahydro-2H-pyran-2-yl), isocyanato, thiol, thioisocyanato, carboxylic acid, carboxylic ester, amide, carboxylic anhydride, or acyl halide. In certain embodiments, the group Q may act as a reactive group such that a mesogen containing compound comprising at least one group Q may be incorporated into the backbone of a polymer or copolymer. For example, Q may be a polymerizable group, such as those described herein, including a group selected from hydroxy, acryloxy, methacryloxy, 2-(acryloxy)ethylcarbamyl, 2-(methacryloxy)ethylcarbamyl, isocyanato, thiol, thioisocyanato, aziridine, allylcarbonate, carboxylic acid or carboxylic acid derivative, and epoxy, e.g., oxiranylmethyl. As used herein, the terms "(meth)acryloxy" and "(meth)acryloyloxy" are used interchangeably and refer to a substituted or unsubstituted prop-2-en-1-oyloxy structure.

As described herein and with reference to Formula I, the groups L, (L)$_y$, or (L)$_w$ represents a linking group as defined above having preferably a linear length of from 1 to 500 atomic bonds. That is, for the general structure F-L-E, the longest linear length of the linking group between groups F and E (where groups F and E may each generally represent any of groups P, R, Q, X T or a mesogen) may range from 1 to 500 bonds (inclusive of the intervening atoms). It should be understood that when discussing the linear length of the linking group, one of ordinary skill in the art will understand that the length of the linking group may be calculated by determining the length of each of the bonds in the linear sequence and the distance occupied by the various intervening atoms in the linear sequence of the linking group and totaling the values. In certain embodiments, the longest linear sequence of bonds may be at least 25 bonds between the linked groups. In other embodiments, the longest linear sequence of bonds may be at least 30 bonds. In still other embodiments, the longest linear sequence of bonds may be at least 50 bonds. It has been determined that, in certain embodiments, a linking group L with at least 25 bonds improves a variety of benefits for the resulting mesogen containing compound. For example, a linking group of at least 25 bonds may improve the solubilities of the additives, such as the photochromic compounds in compositions comprising the mesogen containing compounds; may provide for faster or improved alignment properties of the compositions comprising the mesogen containing compounds; and/or may lower the viscosity of a composition comprising the mesogen containing compound.

Each group L may be independently chosen for each occurrence, the same or different, from a single bond and the groups defined above. According to the various, "w" may be represented by an integer from 1 to 26, "y" may be represented by an integer from 2 to 25, and "z" is either 1 or 2. It should be noted that when more than one L group occurs in sequence, for example in the structure (L)$_y$ or (L)$_w$ where "y" and/or "w" is an integer greater than 1, then the adjacent L groups may or may not have the same structure. That is, for example, in a linking group having the structure -(L)$_3$- or -L-L-L- (i.e., where "y" or "w" is 3), each group -L- may be independently chosen from any of the groups L recited above and the adjacent -L-groups may or may not have the same structure. For example, in one exemplary embodiment, -L-L-L- may represent —(C$_1$-C$_{30}$)alkyenel-(C$_1$-C$_{30}$)alkylene-(C$_1$-C$_{30}$)alkylene-(i.e., where each occurrence of -L-is represented by (C$_1$-C$_{30}$)alkylene, where each adjacent (C$_1$-C$_{30}$) alkylene group may have the same or different number of carbons in the alkylene group). In another exemplary embodiment, -L-L-L- may represent -arylene-(C$_1$-C$_{30}$)alkylenesilyl-(C$_1$-C$_{30}$)alkyleneoxy-(i.e., where each occurrence of -L- differs from the adjacent groups -L-). Thus, the structure of (L)$_y$ or (L)$_w$ should be understood as covering all possible combinations of the various sequences of the linking groups -L-, including those where some or all of the adjacent -L-groups are the same and where all the adjacent -L-groups are different, provided that no two arylene groups are linked by a single bond.

Still with reference to Formula I, the group R represents an end group as defined above.

With further reference to Formula I, in certain embodiments the groups Mesogen-1 and Mesogen-2 are each independently a rigid straight rod-like liquid crystal group, a rigid bent rod-like liquid crystal, or a rigid disc-like liquid crystal group. The structures for Mesogen-1 and Mesogen-2 may be any suitable mesogenic group known in the art, for example, any of those recited in Demus et al., "Flüssige Kristalle in Tabellen," VEB Deutscher Verlag für Grundstoffindustrie, Leipzig, 1974 or "Flüssige Kristalle in Tabellen II," VEB Deutscher Verlag für Grundstoffindustrie, Leipzig, 1984. Further, according to certain embodiments, the groups Mesogen-1 and Mesogen-2 may independently have a structure represented by:

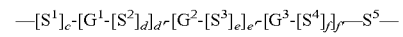

In certain embodiments, the mesogen structure, above, is further defined such that each group each $G^1$, $G^2$, and $G^3$ may independently be chosen for each occurrence from: a divalent group chosen from: an unsubstituted or a substituted aromatic group, an unsubstituted or a substituted alicyclic group, an unsubstituted or a substituted heterocyclic group, and mixtures thereof, wherein substituents are chosen from: thiol, amide, hydroxy($C_1$-$C_{18}$)alkyl, isocyanato($C_1$-$C_{18}$)alkyl, acryloyloxy, acryloyloxy($C_1$-$C_{18}$)alkyl, halogen, $C_1$-$C_{18}$ alkoxy, poly($C_1$-$C_{18}$ alkoxy), amino, amino($C_1$-$C_{18}$)alkylene, $C_1$-$C_{18}$ alkylamino, di-($C_1$-$C_{18}$)alkylamino, $C_1$-$C_{18}$ alkyl, $C_2$-$C_{18}$ alkene, $C_2$-$C_{18}$ alkyne, $C_1$-$C_{18}$ alkyl($C_1$-$C_{18}$) alkoxy, $C_1$-$C_{18}$ alkoxycarbonyl, $C_1$-$C_{18}$ alkylcarbonyl, $C_1$-$C_{18}$ alkyl carbonate, aryl carbonate, perfluoro($C_1$-$C_{18}$) alkylamino, di-(perfluoro($C_1$-$C_{18}$)alkyl)amino, $C_1$-$C_{18}$acetyl, $C_3$-$C_{10}$cycloalkyl, $C_3$-$C_{10}$cycloalkoxy, isocyanato, amido, cyano, nitro, a straight-chain or branched $C_1$-$C_{18}$ alkyl group that is mono-substituted with cyano, halo, or $C_1$-$C_{18}$ alkoxy, or poly-substituted with halo, and a group comprising one of the following formulae: -M(T)$_{(t-1)}$ and -M(OT)$_{(t-1)}$, wherein M is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and t is the valence of M. Further, in the mesogenic structure, "c", "d", "e", and "f" may be each independently chosen from an integer ranging from 0 to 20, inclusive and "d'", "e'" and "f'" are each independently an integer from 0 to 4 provided that a sum of d'+e'+f' is at least 1. Still with reference to the mesogenic structure above, the groups S represent spacer groups such that each of groups $S^1$, $S^2$, $S^3$, $S^4$, and $S^5$ may be independently chosen for each occurrence from a spacer unit chosen from:

(A) —(CH$_2$)$_g$—, —(CF$_2$)$_h$—, —Si(CH$_2$)$_g$—, or —(Si(CH$_3$)$_2$O)$_h$—, wherein "g" is independently chosen for each occurrence from 1 to 20 and "h" is a whole number from 1 to 16 inclusive;

(B) —N(Z)-, —C(Z)=C(Z)-, —C(Z)=N—, —C(Z')$_2$-C(Z')$_2$-, or a single bond, wherein Z is independently chosen for each occurrence from hydrogen, $C_1$-$C_6$ alkyl, cycloalkyl and aryl, and Z' is independently chosen for each occurrence from $C_1$-$C_6$alkyl, cycloalkyl and aryl; or (C) —O—, —C(O)—, —C≡C—, —N=N—, —S—, —S(O)—, —S(O)(O)—, —(O)S(O)O—, —O(O)S(O) O— or straight-chain or branched $C_1$-$C_{24}$ alkylene residue, said $C_1$-$C_{24}$ alkylene residue being unsubstituted, mono-substituted by cyano or halo, or poly-substituted by halo;

provided that when two spacer units comprising heteroatoms are linked together the spacer units are linked so that heteroatoms are not directly linked to each other and when $S_1$ and $S_5$ are linked to another group, they are linked so that two heteroatoms are not directly linked to each other.

According to various embodiments disclosed herein, in the structure of the mesogen, above, "c", "d", "e", and "f" each can be independently chosen from an integer ranging from 1 to 20, inclusive; and "d'", "e'" and "f'" each can be independently chosen from 0, 1, 2, 3, and 4, provided that the sum of d'+e'+f' is at least 1. According to other embodiments disclosed herein, "c", "d", "e", and "f" each can be independently chosen from an integer ranging from 0 to 20, inclusive; and "d'", "e'" and "f'" each can be independently chosen from 0, 1, 2, 3, and 4, provided that the sum of d'+e'+f' is at least 2. According to still other embodiments disclosed herein, "c", "d", "e", and "f" each can be independently chosen from an integer ranging from 0 to 20, inclusive; and "d'", "e'" and "f'" each can be independently chosen from 0, 1, 2, 3, and 4, provided that the sum of d'+e'+f' is at least 3. According to still other embodiments disclosed herein, "c", "d", "e", and "f" each can be independently chosen from an integer ranging from 0 to 20, inclusive; and "d'", "e'" and "f'" each can be independently chosen from 0, 1, 2, 3, and 4, provided that the sum of d'+e'+f' is at least 1.

Finally, with reference to Formula I, the structure of the mesogen containing compound in the various embodiments of the present disclosure require that: when the group X is represented by —R, then "w" is an integer from 2 to 25 and "z" is 1; when the group X is represented by -(L)$_y$-R, then "w" is 1, "y" is an integer from 2 to 25, and "z" is 1;

when the group X is represented by -(L)-R, then "w" is an integer from 3 to 26 and "z" is 2;

when the group X is represented by -(L)$_w$-Q, then if the group P in Formula I is represented by the group Q, which may be the same or different that the other group Q, "w" is 1, and "z" is 1 and if the group P is other than the group Q (i.e., P is another group as defined herein), then each "w" is independently an integer from 1 to 26 and "z" is 1;

when the group X is represented by the structure

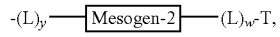

then "w" is 1, "y" is an integer from 2 to 25, and "z" is 1;

when the group X is represented by -(L)$_y$-P, then "w" is 1, "y" is an integer from 2 to 26, and "z" is 1, and -(L)$_y$-comprises a linear sequence of at least 25 bonds between the mesogen and P; and when the group X is represented by -(L)$_w$-[(L)$_w$-P]$_y$, then each "w" is independently an integer from 1 to 25, "y" is an integer from 2 to 6, and "z" is 1.

According to certain embodiments of the mesogen containing compound, the mesogen containing compound may be a functional mono-mesogen containing compound (i.e., a mesogen containing compound that contains one mesogenic structure). According to one embodiment, the functional mono-mesogen containing compound may have a structure represented by Formula I, wherein the group X is represented by —R, "w" is an integer from 2 to 25, and "z" is 1. According to another embodiment, the functional mono-mesogen containing compound may have a structure represented by Formula I, wherein the group X is represented by -(L)$_y$-R, "w" is 1, "y" is an integer from 2 to 25, and "z" is 1.

According to other embodiments of the mesogen containing compound, the mesogen containing compound may be a functional bi-mesogen containing compound (i.e., a mesogen containing compound that contains two mesogenic structures (which may be the same or different)). For the various embodiments, the structures of the functional bi-mesogen containing compound will have a long chain linking group between the two mesogenic units. According to one embodiment, the functional bi-mesogen containing compound may have a structure represented by Formula I, wherein the group X is represented by

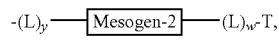

"w" is 1, "y" is an integer from 2 to 25, and "z" is 1.

In another embodiment of the mesogen containing compound, the mesogen containing compound may be a functional mono-mesogen containing compound (i.e., a mesogen containing compound that contains one mesogenic structure). According to specific embodiments, the functional mono-mesogen containing compound may have a structure represented by Formula I, wherein the group X is represented by -(L)$_w$-Q and if the group P in Formula I is represented by the group Q, which may be the same or different than the other group Q, "w" is 1, and "z" is 1 and if the group P is other than the group Q, then each "w" is independently and integer from 1 to 26 and "z" is 1. According to specific embodiments, the structure of this embodiment may contain two groups Q which may be the same or different and may be reactive with one or more other monomeric units which may react to form a copolymer. According to these embodiments, the mesogen containing compound may be a di-functional monomer that may be incorporated into a polymer backbone. That is, the mesogen containing group will be incorporated into the polymer backbone and be attached at each end to the formed polymer by the residues of the group(s) Q. As used herein, the term "residue" means that which remains after reaction of a reactive group. In another embodiment, the functional mono-mesogen containing compound may have a structure represented by Formula I, wherein the group X is represented by the -(L)$_y$-P, "w" is 1, "y" is an integer from 2 to 25, and "z" is 1; and -(L)$_y$-comprises a linear sequence of at least 25 bonds between the mesogen and P. In specific embodiments, -(L)$_y$- may comprise a linear sequence of at least 50 bonds between the mesogen and P. In another embodiment, the mesogen containing compound may have a structure according to Formula I wherein the group X is represented by the structure -(L)$_w$-[(L)$_w$-P]$_y$, each "w" is independently an integer from 1 to 25, "y" is an integer from 2 to 6, and "z" is 1. According to these embodiments, the mesogen containing compound may have from 3 to 7 reactive groups P.

According to various embodiments, the mesogen containing compound of the present disclosure, as represented by Formula I, may be a liquid crystal monomer. As used herein, the term "liquid crystal monomer" means a monomeric compound that may display liquid crystal properties in the monomeric state and/or in the polymeric state. That is, the liquid crystal monomer may display liquid crystal properties by itself and/or after it has been incorporated into a polymer or copolymer to form a LCP. One skilled in the art will recognize that when the mesogen compound is in the polymeric state, it has been reacted with other monomers and/or co-monomers to form the polymer and is therefore a residue of the liquid crystal monomer.

Thus, embodiments of the present disclosure also contemplate a polymer or copolymer which comprises the mesogen containing compounds or residues thereof according to the various embodiments described herein. For example, according to one embodiment, the polymer or copolymer may comprise the mesogen containing compound, such as a monomeric compound which is suspended or mixed in the polymer or copolymer composition. In another embodiment, the polymer or copolymer may comprise a residue of the mesogen containing compound. According to one example, the residue of the mesogen containing compound may be incorporated into the polymeric structure, for example, as part of the polymeric backbone, or as a monomer incorporated into the backbone and forming a side chain off the backbone. In another example, the residue of the mesogen containing compound may have been reacted with another reactant (thereby forming the residue) and the product of that reaction may be suspended or mixed into the polymer or copolymer.

According to certain embodiments, the polymer compositions comprising the mesogen containing compounds or residues thereof, as described herein, may be liquid crystal polymers. For example, the LCPs may be an anisotropic LCP, an isotropic LCP, a thermotropic LCP or a lyotropic LCP. In various embodiments, the LCPs may display at least one of a nematic phase, a smectic phase, a chiral nematic phase (i.e., a cholesteric phase), a discotic phase (including chiral discotic), a discontinuous cubic phase, a hexagonal phase, a bicontinuous cubic phase, a lamellar phase, a reverse hexagonal columnar phase, or an inverse cubic phase. In addition, in certain LCPs of the present disclosure, the LC monomers or residues thereof may transition from one phase to another, for example, in response to thermal energy or actinic radiation.

In particular embodiments, the present disclosure provides a liquid crystal monomer represented by the structure according to Formula II or Formula III:

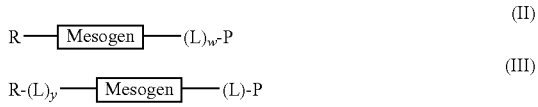

According to these embodiments, the group P in either Formula II or III may be a reactive group such as those set forth in the listing for P described herein and including those P groups comprising polymerizable groups, a plurality of reactive groups, or ring opening metathesis polymerization precursors. The group Q may independently be any of those groups listed for group Q herein. Further, in either Formula II or III, the group (L) may be independently chosen for each occurrence, which may be the same or different, from the listing of possible (L) groups set forth herein. In either Formula II or III, the group R may be selected from the listing of possible R groups set forth herein. The mesogen component in either Formula II or III may be a rigid straight rod-like liquid crystal group, a rigid bent rod-like liquid crystal group, or a rigid disc-like liquid crystal group, such as the mesogens set forth herein including those having the structure:

$$—[S^1]_c-[G^1-[S^2]_d]_{d'}-[G^2-[S^3]_e]_{e'}-[G^3-[S^4]_f]_{f'}—S^5—$$

as further defined herein. In addition, in Formulae II and III, "w" may be an integer ranging from 2 to 25 and "y" may be an integer ranging from 2 to 25.

In other embodiments, the present disclosure provides for a bi-mesogen liquid crystal monomer represented by the structure according to Formula IV or Formula V:

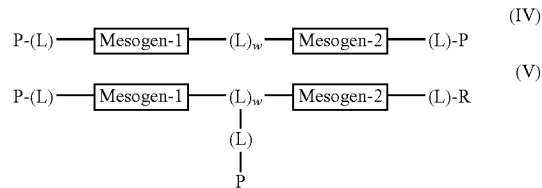

According to these embodiments, each group P in either Formula IV or V may independently be a reactive group such as those set forth in the listing for P described herein and including those P groups comprising polymerizable groups, a plurality of reactive groups, or ring opening metathesis polymerization precursors. The group Q may independently be any of those groups listed for group Q herein. Further, in either Formula IV or V, the group (L) may be independently chosen for each occurrence, which may be the same or different, from the listing of possible (L) groups set forth herein. In either Formula IV or V, each group R may be independently selected from the listing of possible R groups set forth herein. The mesogen components in either Formula IV or V may have rigid straight rod-like liquid crystal groups, rigid bent rod-like liquid crystal groups, rigid disc-like liquid crystal groups or a combination thereof. Thus, Mesogen-1 and Mesogen-2 of either Formula IV or V may be independently selected from the mesogen structures set forth herein including those having the structure:

$$—[S^1]_c-[G^1-[S^2]_d]_{d'}-[G^2-[S^3]_e]_{e'}-[G^3-[S^4]_f]_{f'}—S^5—$$

as further defined herein. In addition, in Formulae IV and V, "w" may be an integer ranging from 2 to 25.

In still another embodiment, the present disclosure provides for a bi-functional liquid crystal monomer represented by the structure according to Formula VI:

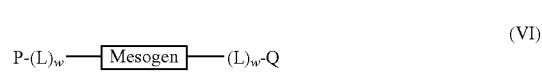

According to these embodiments, each group P in Formula VI may independently be a reactive group such as those set forth in the listing for P described herein and including those P groups comprising polymerizable groups, a plurality of reactive groups, or ring opening metathesis polymerization precursors. However, if P is represented by the group Q, then "w" is 1 and if P is other than the group Q, then each "w" is independently an integer from 1 to 26. In Formula VI, each group Q may independently be any of those groups listed for group Q herein. Further, in Formula VI, each group (L) may be independently chosen for each occurrence, which may be the same or different, from the listing of possible (L) groups set forth herein. The mesogen component in Formula VI may be a rigid straight rod-like liquid crystal group, a rigid bent rod-like liquid crystal group, or a rigid disc-like liquid crystal group, such as the mesogens set forth herein including those having the structure:

$$—[S^1]_c-[G^1-[S^2]_d]_{d'}-[G^2-[S^3]_e]_{e'}-[G^3-[S^4]_f]_{f'}—S^5—$$

as further defined herein.

In further embodiments, the present disclosure provides for a liquid crystal monomer represented by the structure according to Formula VII:

(VII)

According to these embodiments, each group P in Formula VII may independently be a reactive group such as those set forth in the listing for P described herein and including those P groups comprising polymerizable groups, a plurality of reactive groups, or ring opening metathesis polymerization precursors. The group Q may independently be any of those groups listed for group Q herein. Further, in Formula VII, each group (L) may be independently chosen for each occurrence, which may be the same or different, from the listing of possible (L) groups set forth herein. The mesogen component in Formula VII may be a rigid straight rod-like liquid crystal group, a rigid bent rod-like liquid crystal group, or a rigid disc-like liquid crystal group, such as the mesogens set forth herein including those having the structure:

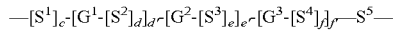

as further defined herein. In addition, in Formula VII, "y" may be an integer ranging from 2 to 25 and in certain embodiments, $-(L)_y-$ comprises a linear sequence of at least 25 bonds between the mesogen and the group P. In other embodiments, $-(L)_y-$ may comprise a linear sequence of at least 50 bonds between the mesogen and the group P.

In further embodiments, the present disclosure provides for a liquid crystal monomer represented by the structure according to Formula VIII:

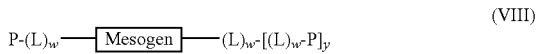

(VIII)

According to these embodiments, Formula VIII may comprise from 3 to 7 P groups, wherein each group P in Formula VIII may independently be a reactive group such as those set forth in the listing for P described herein and including those P groups comprising polymerizable groups, a plurality of reactive groups, or ring opening metathesis polymerization precursors. The group Q may independently be any of those groups listed for group Q herein. Further, in Formula VIII, each group (L) may be independently chosen for each occurrence, which may be the same or different, from the listing of possible (L) groups set forth herein. The mesogen component in Formula VIII may be a rigid straight rod-like liquid crystal group, a rigid bent rod-like liquid crystal group, or a rigid disc-like liquid crystal group, such as the mesogens set forth herein including those having the structure:

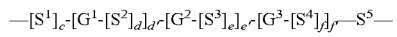

as further defined herein. In addition, in Formula VIII, each "w" may independently be an integer ranging from 1 to 25 and "y" may be an integer ranging from 2 to 6.

According to the various embodiments of the mesogen containing compounds disclosed herein, the structure of the mesogen containing compound, for example as represented by Formulae I-VIII as described in detail herein, may be designed to include a long flexible linking group between one or more portions of the compound. For example, in the various structures of the mesogen containing compounds disclosed herein, the linking groups $-(L)_y-$ and/or $-(L)_w-$ and in certain cases the group $-(L)-$ (for example, when $-(L)-$ comprises at least 25 linear bonds) may be a long flexible linking group comprising a long linear sequence of chemical bonds, ranging from 25 to 500 chemical bonds in length, between the two groups linked by the linking group. In certain embodiments the linking groups may comprise a long linear sequence of chemical bonds ranging from 30 to 500 chemical bonds in length between the two groups. In other embodiments the linking groups may comprise a long linear sequence of chemical bonds ranging from 50 to 500 chemical bonds in length between the two groups. As used with reference to the linking group, the chemical bonds in the linear sequence between the groups linked by the linking group may be covalent or polar covalent chemical bonds, such as covalent or polar covalent σ-bonds and may also include one or more π-bonds (although the π-bonds are not included when calculating the length of chemical bonds in the linear sequence). Further, it will be understood by those skilled in the art that the linking group also comprises those intervening atoms through which the linear sequence of bonds are associated.

As will be described in greater detail herein, it is believed that the one or more flexible linking group in the mesogen containing compounds disclosed herein impart certain desirable characteristics to the compound and compositions, such as cured compositions, formed therefrom. For example, while not wishing to be limited by any interpretation, it is believed that the one or more flexible linking group in the mesogen containing compound or residue thereof may result in cured compositions made therefrom having a "softer" structure. As used herein, with reference to the character of cured compositions, such as LCPs, layers, coatings, and coated articles made from the compounds, the term "softer" refers to compositions exhibiting a Fischer microhardness typically less than 150 Newtons/mm$^2$, e.g, from 0 to 149.9 Newtons/mm$^2$. Cured compositions having a softer structure may display desired or improved characteristics, for example, improved LC character, improved photochromic performance, and improved dichroic performance. For example, for cured compositions such as a polymer, a copolymer or blends of (co) polymers, it may be desirable to have hard and soft segments or components in the polymer. The concept that cured polymers may be composed of hard and soft segments or components is known in the art (see, for example, "Structure-Property-Relationship in Polyurethanes", *Polyurethane Handbook*, G. Oertel, editor, 2nd ed. Hanser Publishers, 1994, pp 37-53). Typically the hard segment or component includes a crystalline or semi-crystalline region within the cured polymer structure, whereas the soft segment or component includes a more amorphous, non-crystalline or rubbery region. In certain embodiments, the contribution of the structure of a component or monomer residue in a polymer to either the hardness or softness of the resulting polymer may be determined, for example, by measuring the Fischer microhardness of the resulting cured polymer. The physical properties of the polymers are derived from their molecular structure and are determined by the choice of building blocks, e.g., the choice of monomer and other reactants, additives, the ratio of hard and soft segments, and the supramolecular structures caused by atomic interactions between polymer chains. Materials and methods for the preparation of polymers such as polyurethanes are described in Ullmann's Encyclopedia of Industrial Chemistry, 5th ed., 1992, Vol. A21, pages 665-716.

For example, in the photochromic and/or dichroic materials and cured layers and coatings described herein, it is believed that the soft segments or components of the polymeric material or cured layers and coatings may provide an improved solubilizing environment for the photochromic, photochromic-dichroic, and/or dichroic compound(s) to reversibly transform from a first state to a second state, while the hard segments or components of the polymeric material or coating provides structural integrity for the material or coating and/or prevent migration of the transformable compounds. In one application for photochromic and/or dichroic materials, a balance of soft and hard components in the polymer may achieve desired benefits of a suitable cured material or cured layer or coating, i.e., a material, layer, or coating having a Fischer microhardness ranging from 0 to 150 Newtons/mm$^2$ that also exhibits good photochromic and/or dichroic response characteristics. In another application, the photochromic and/or dichroic material may be located in a cured polymeric material having a Fischer microhardness less than 60 Newtons/mm$^2$, e.g. from 0 to 59.9 Newtons/mm$^2$, or alternatively from 5 to 25 N/mm$^2$, and coated with or contained within a harder polymeric material that provides structural strength. In a further application, the photochromic and/or dichroic material may already be within a soft polymeric material such as a soft polymeric shell that could be incorporated in a hard polymeric coating or material, e.g., a material having a Fischer microhardness greater than 150 Newtons/mm$^2$, e.g. 200 Newtons/mm$^2$ or even higher.

In other embodiments, the LC compositions may further comprise a liquid crystal polymer, including, for example a cured LCP. The liquid crystal polymer may comprise a residue of a first liquid crystal monomer, wherein the residue of the first LC monomer is the residue of the mesogen containing compound represented by the structure of Formula I as defined herein. In specific embodiments, the LCP may be a copolymer wherein the copolymer comprising the residue of the mesogen containing compound wherein the residue of the mesogen containing compound is incorporated into the copolymer, for example, as a co-monomer residue. That is, in certain embodiments, the residue of the mesogen containing compound may be incorporated into the main chain of the copolymer (i.e., the main chain of the residue is incorporated completely into the main chain of the copolymer) or in other embodiments, the residue of the mesogen containing compound may be incorporated into the copolymer as a side-chain off the main chain (for example, the residue may be bonded to the main chain by the reactive group P, with the remainder of the residue being a side-chain of the copolymer main chain). In various embodiments, where the residue of the mesogen containing compound, as represented by Formula I, is incorporated into the main chain of the copolymer, the group X may be represented by -(L)-Q, P is represented by the group Q, "w" is 1, and "z" is 1.

General synthetic methods have been developed to synthesize the scaffolds of the mesogen containing compounds represented by Formulae I-VIII. Exemplary embodiments of approaches to the Formulae structures are illustrated in the Figures. For example, referring to FIG. 1, a mesogen containing compound having a soft chain linker with a reactive group (hydroxyl or (meth)acrylate group) may be synthesized by either a Lewis acid catalyzed process or a base catalyzed process using excess caprolactone. The resulting mesogen containing compound corresponds to a structure represented by Formula II.

Figure 2A:
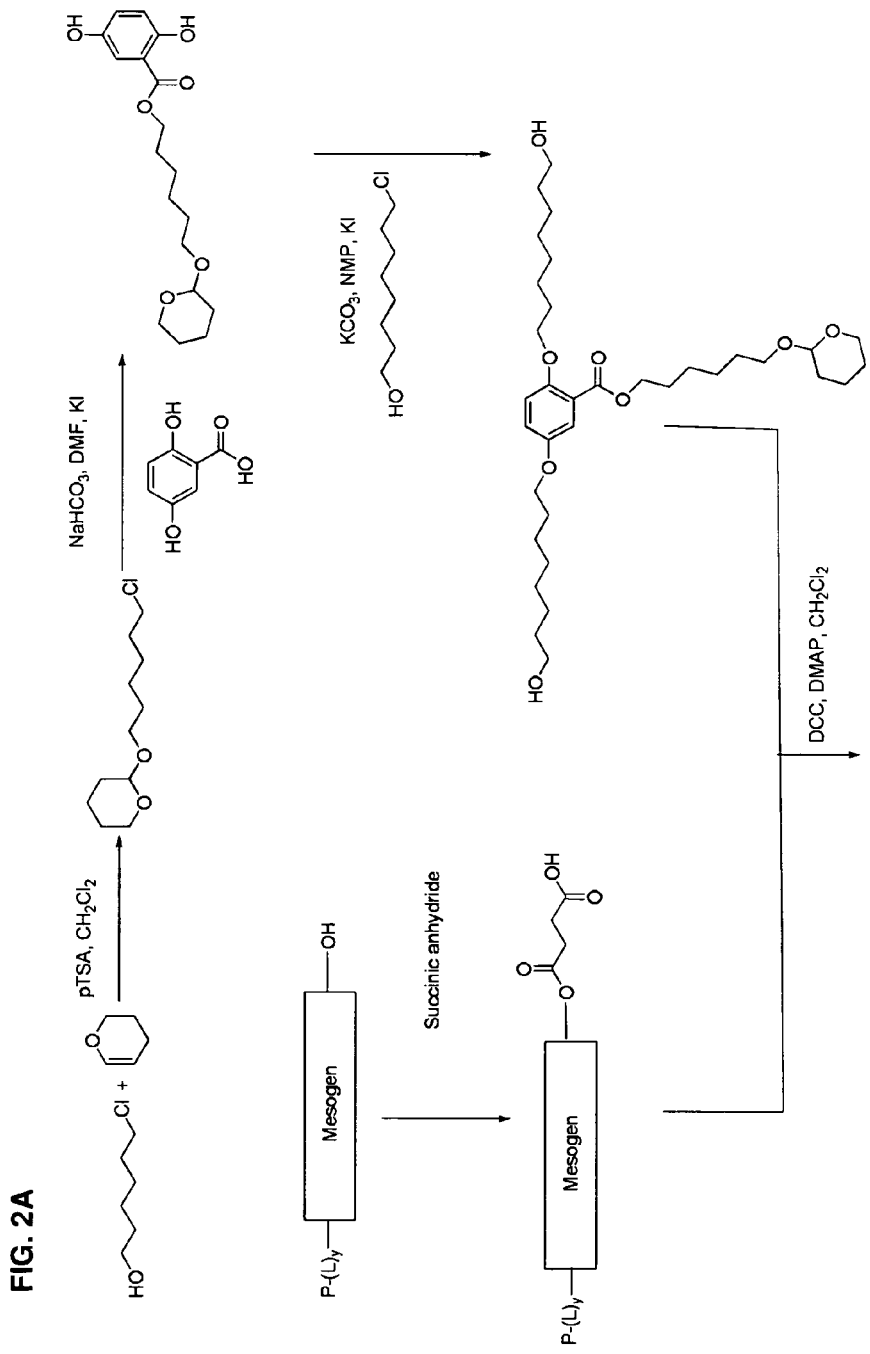
FIGS. 2A and 2B illustrate a process for synthesizing a bi-mesogen containing compound having a structure according to Formula V.
Figure 2B:
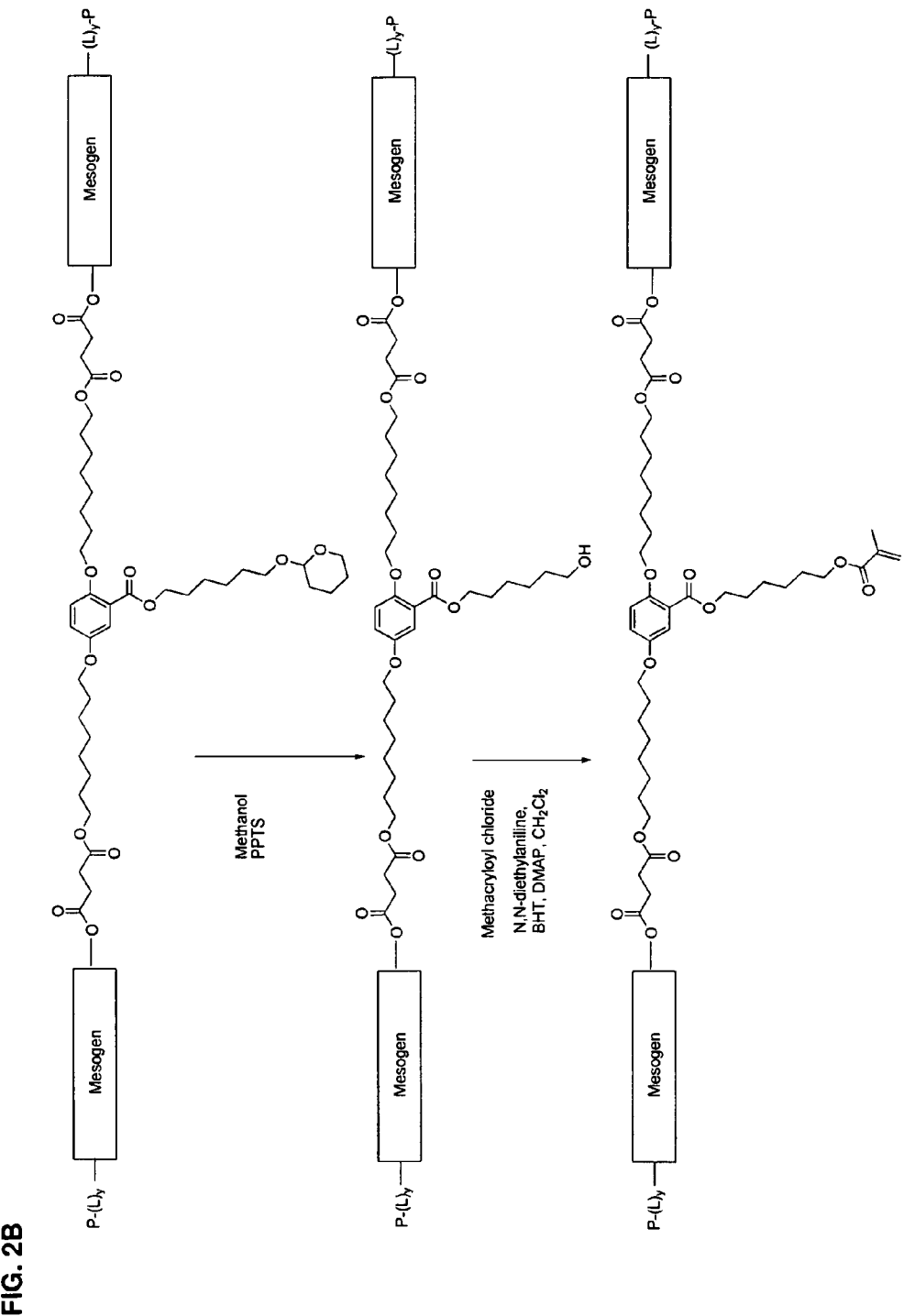
Figure 3:
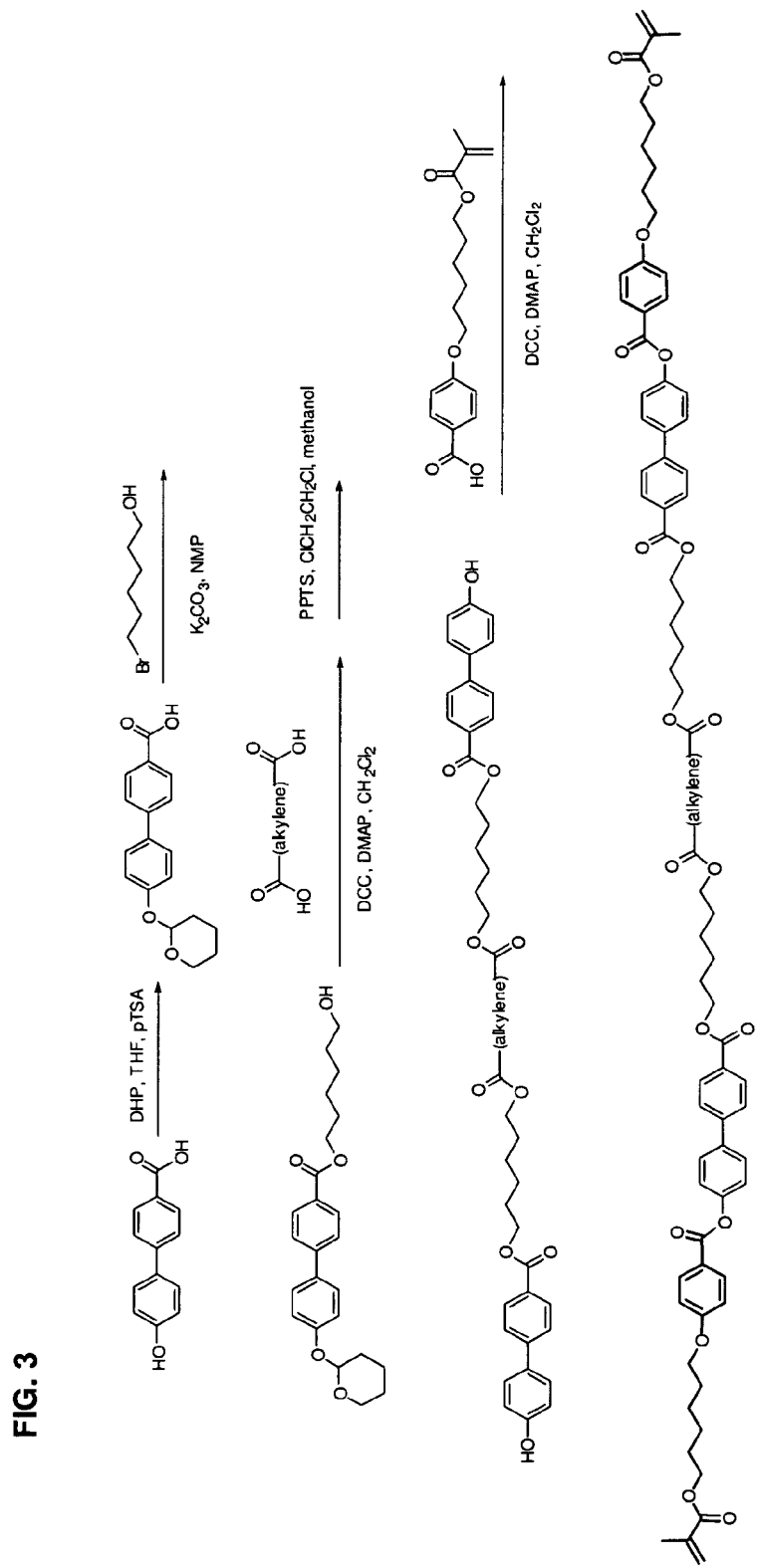
Figure 4:
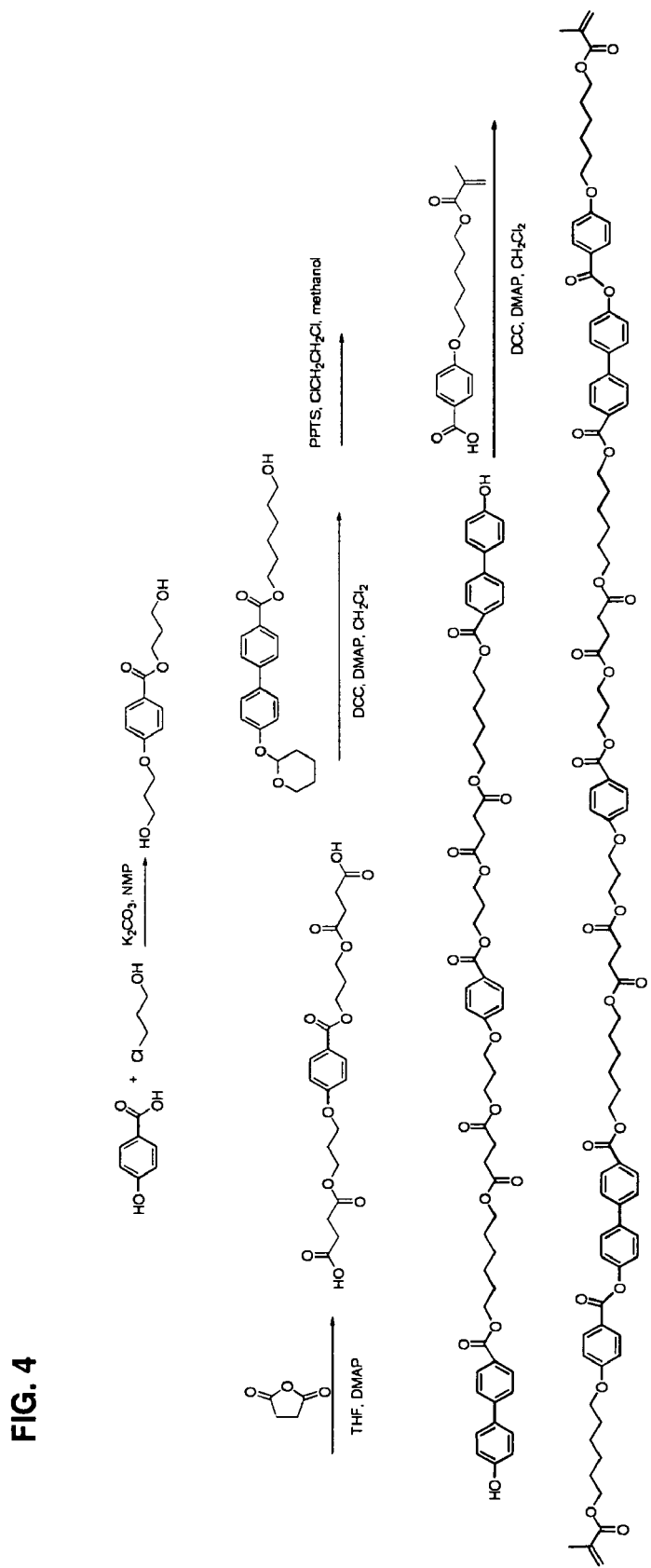
Figure 5:
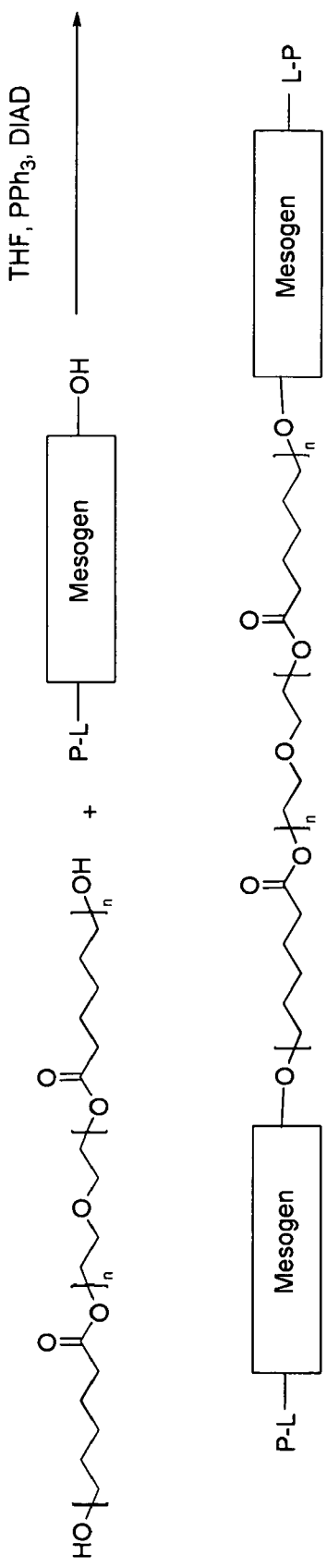

In another embodiment, a synthesis for a bi-mesogen containing compound having a structure corresponding to Formula V is set forth in FIGS. 2A and 2B. According to this representative synthesis, a structure having a reactive group P, wherein P is hydroxyl or (meth)acrylate may be readily synthesized from 6-chlorohexanol. Referring to FIGS. 3 and 4, bi-mesogen containing compounds having structures corresponding to Formula IV may be synthesized from starting hydroxy carboxylic acids that are either commercially available or readily prepared in the lab. According to these Figures, the bi-mesogen portion of the compound is incorporated in the latter portion of the synthetic route. FIG. 5 illustrates one approach to bond formation between free hydroxyl groups on the linker portion to a hydroxy substituted mesogen scaffold to form a structure according to Formula IV. This approach utilizes a Mitsunobu-type coupling process to form ether linkages in the mesogen containing structure.

Figure 6:
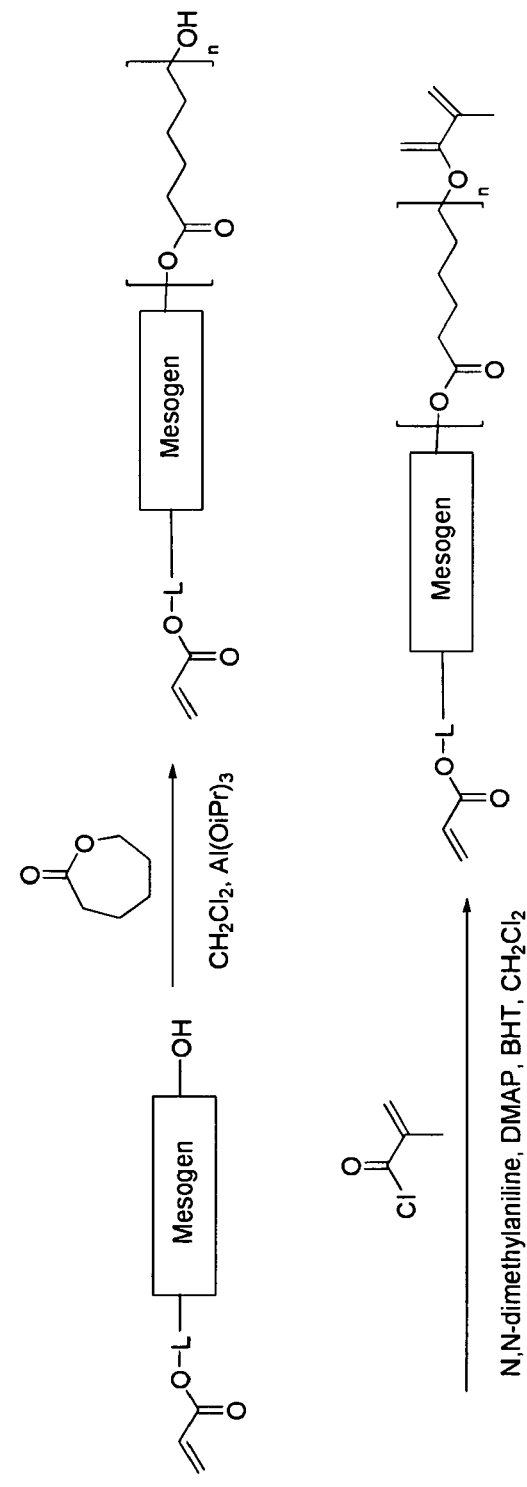
Figure 7:
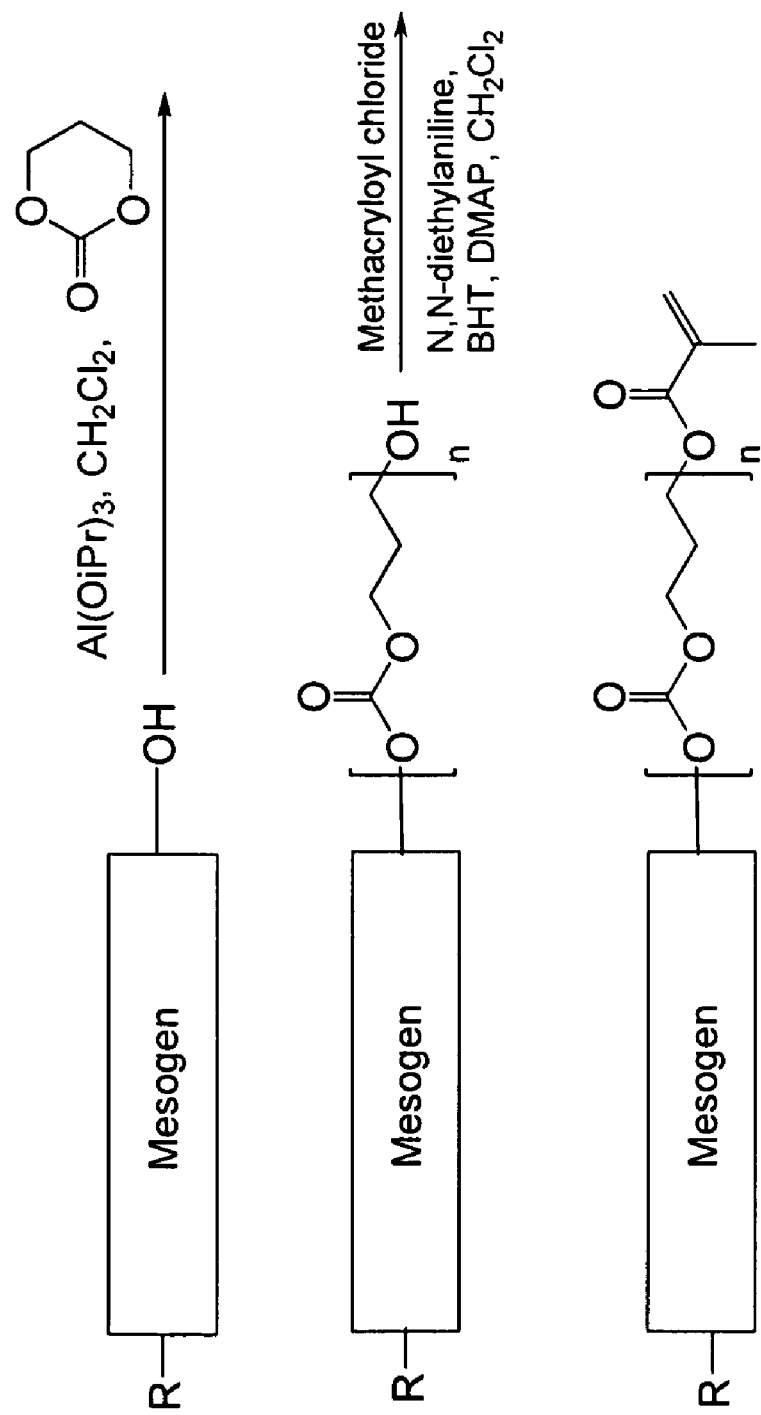

Referring now to FIG. 6, a synthetic approach to a mesogen containing compound represented by the structure of Formula VI or VII. According to this synthetic approach, an acrylate substituted hydroxymesogen may be functionalized with a soft linker side chain using either Lewis acid catalysis or base catalysis (see, FIG. 1) and caprolactone. The resulting hydroxyl end group may correspond to group P or Q or may be further functionalized by conversion to a reactive ester functionality, for example, an acrylate or methacrylate ester. In another approach to soft linker chains illustrated in FIG. 7, a polycarbonate linker may be synthesized under Lewis acid catalysis using excess 1,3-dioxan-2-one. The resulting hydroxy terminated linker may then be further functionalized by conversion of a reactive ester functionality, for example, an acrylate or methacrylate ester.

Figure 8:
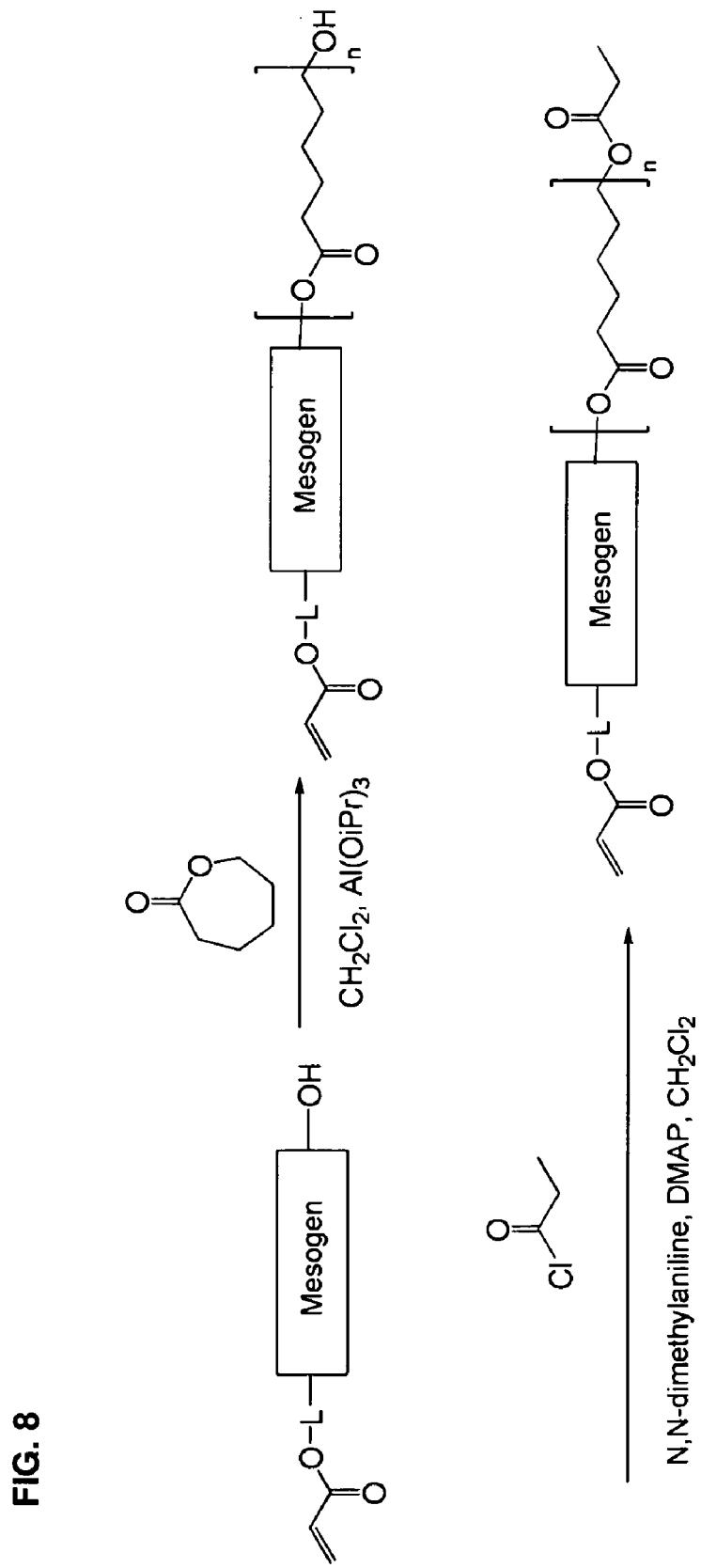
Figure 9:
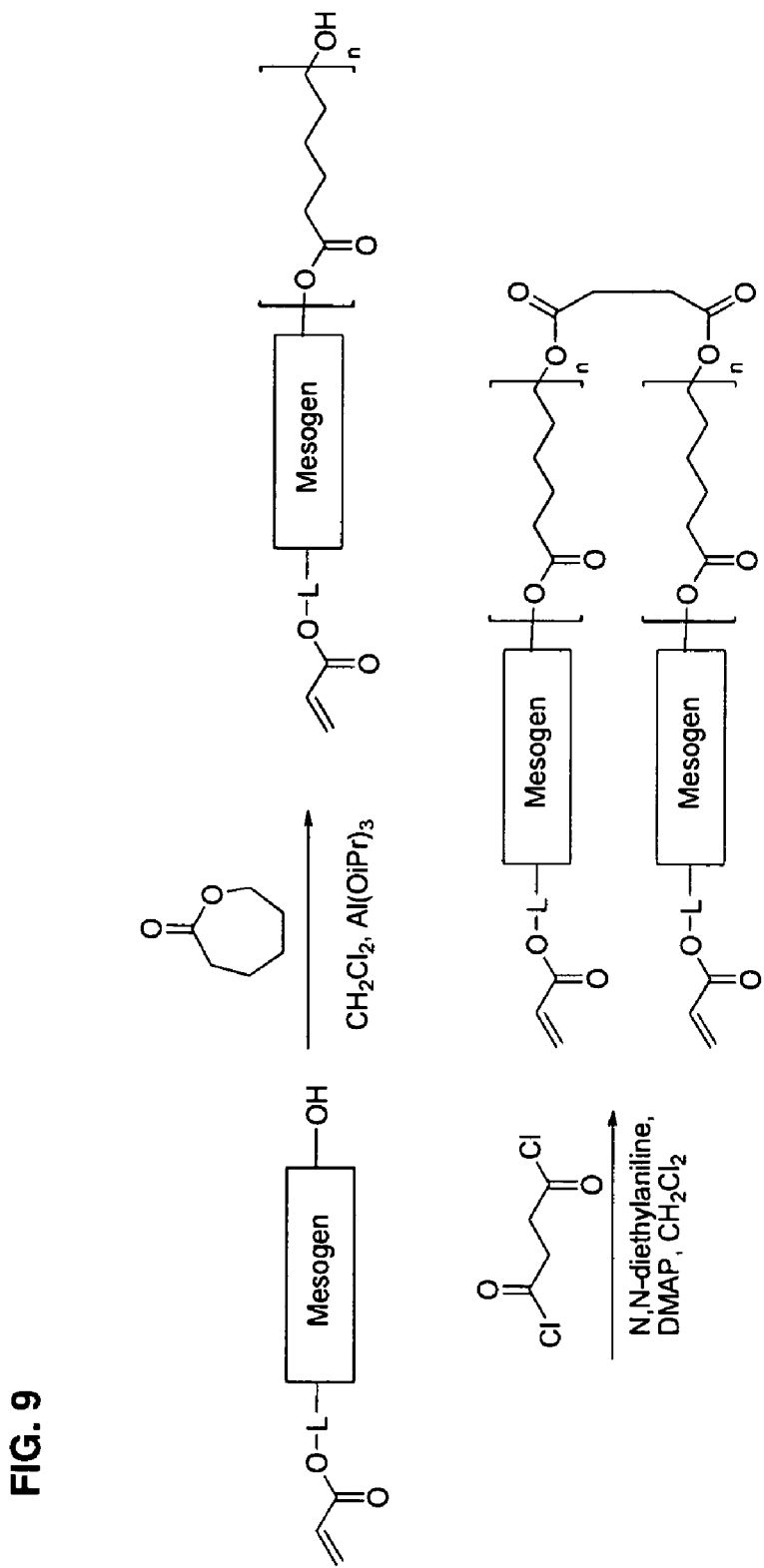

FIG. 8 illustrates one approach to a mesogen containing compound having a structure represented by Formula III. According to this approach, a mesogen containing compound having a reactive functional group P on the mesogen side and a non-reactive group R on the soft linker group side is synthesized using a caprolactone based linker. Referring now to FIG. 9, one approach to the synthesis of a mesogen containing compound represented by Formula IV, wherein soft caprolactone derived linker groups are attached by a succinate diester.

Figure 10:
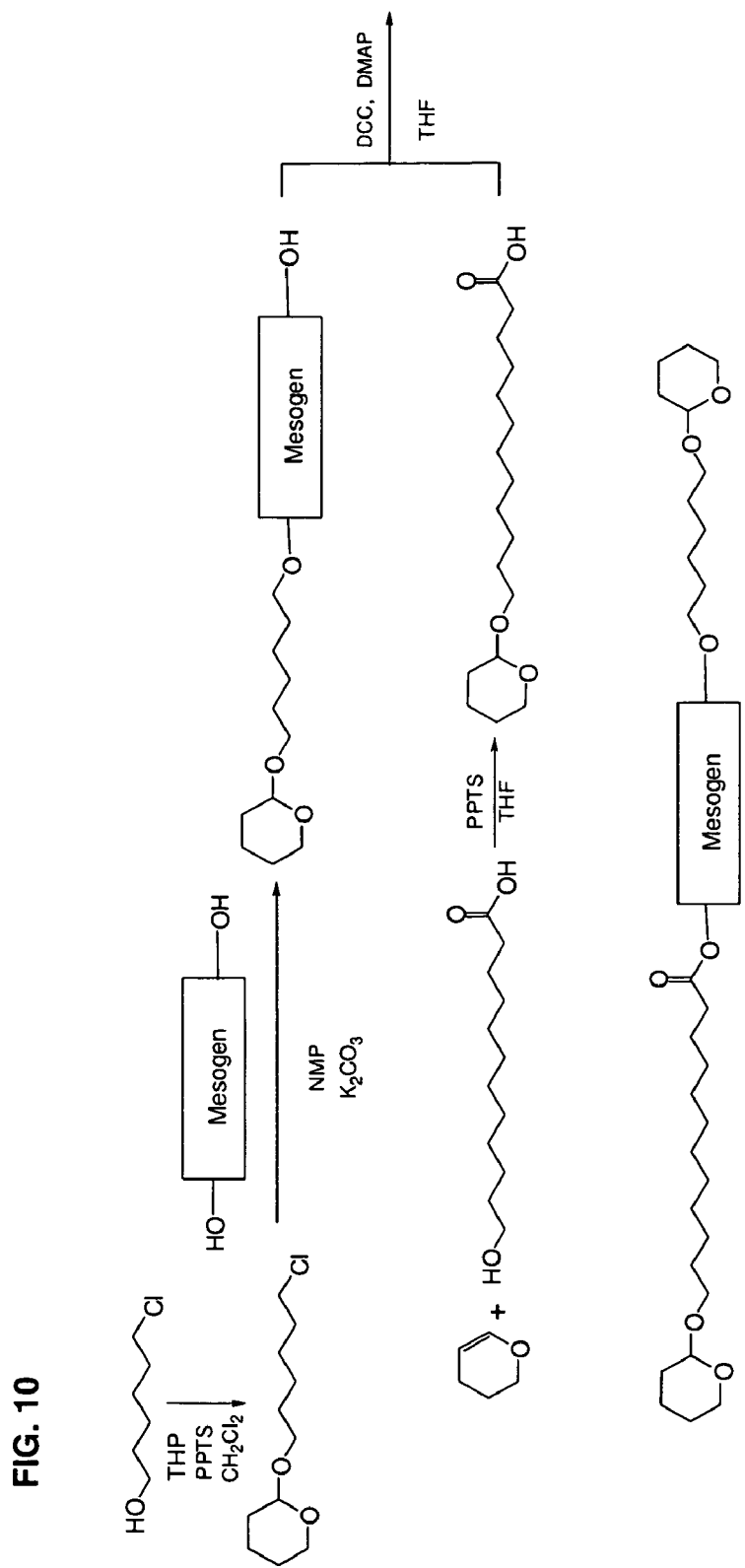
Figure 11:
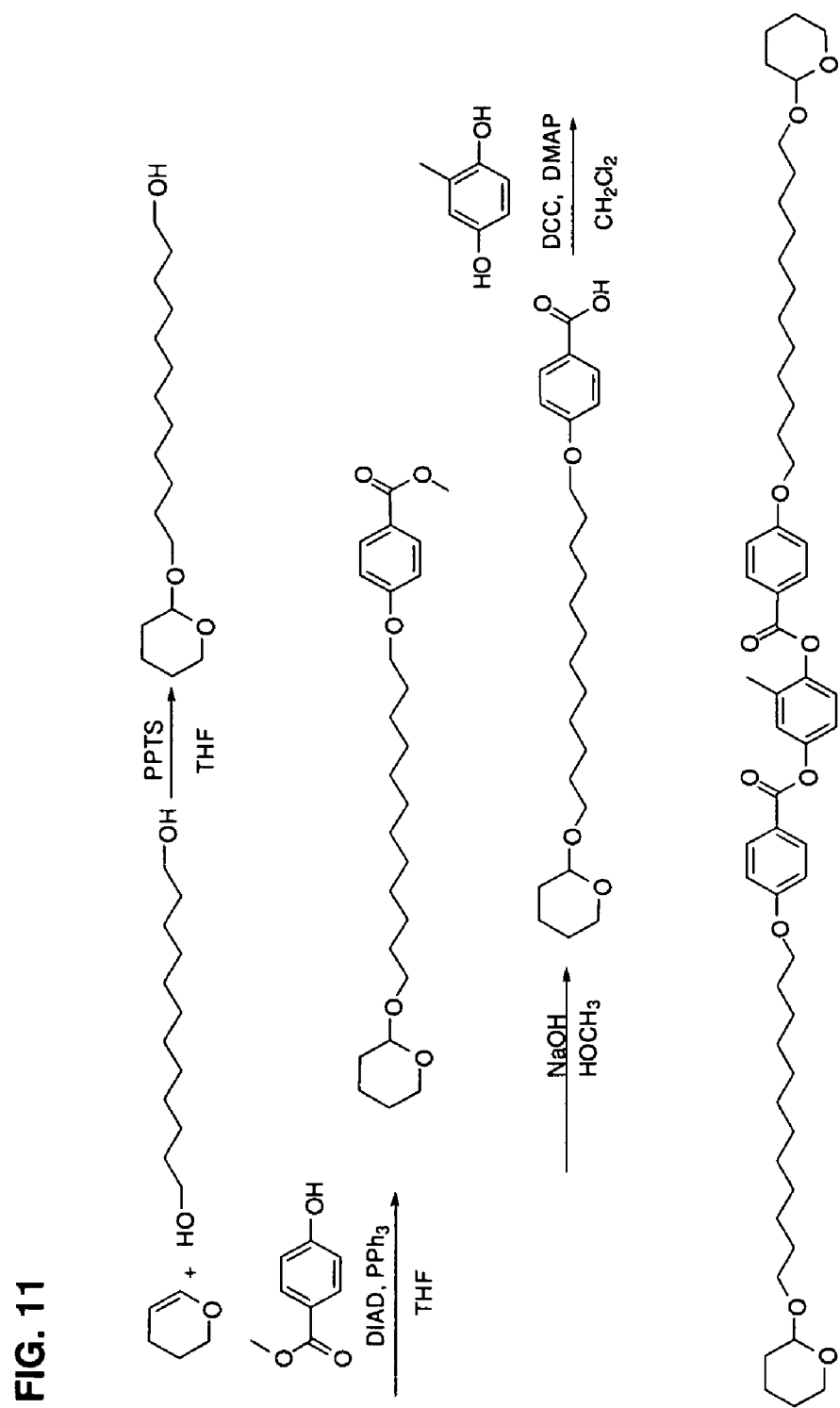
Figure 12:
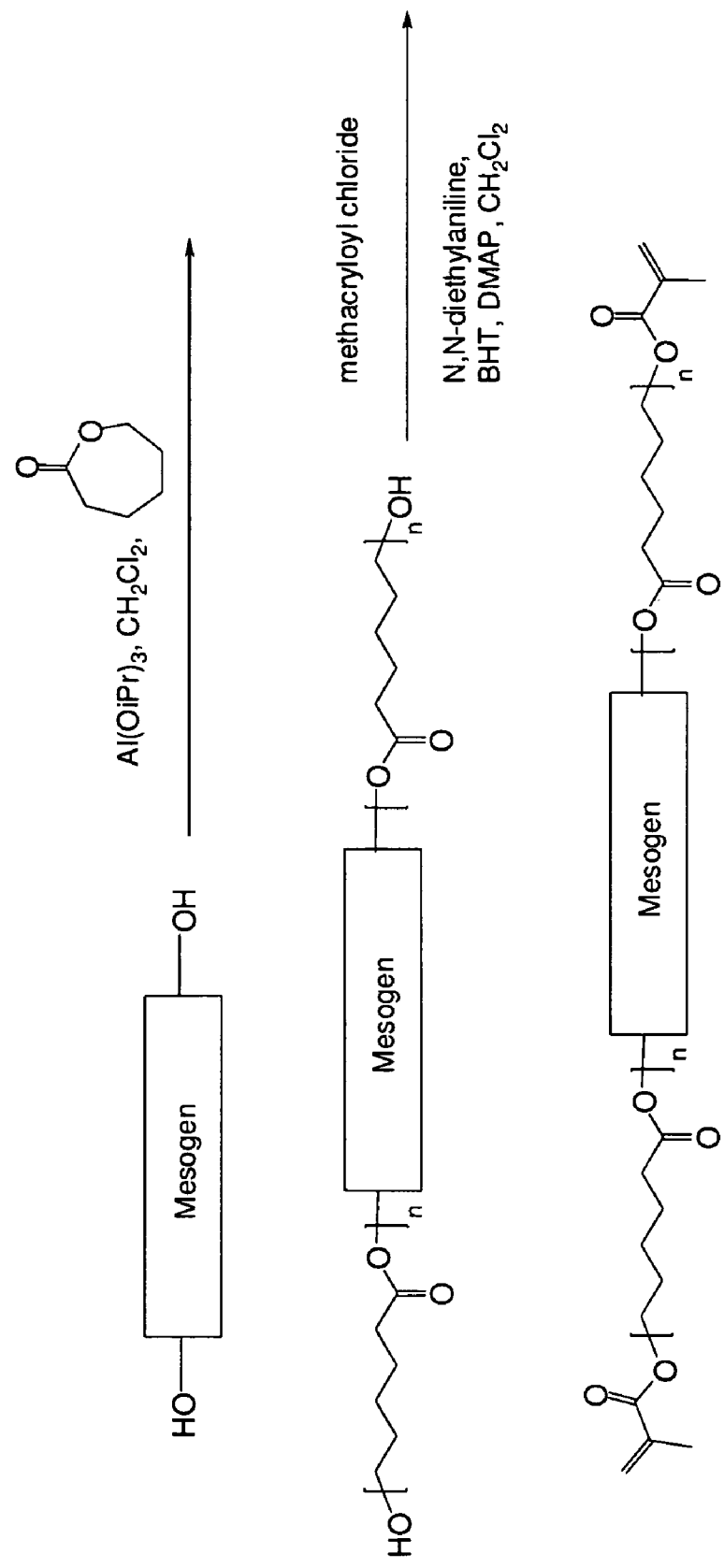
Figure 13:
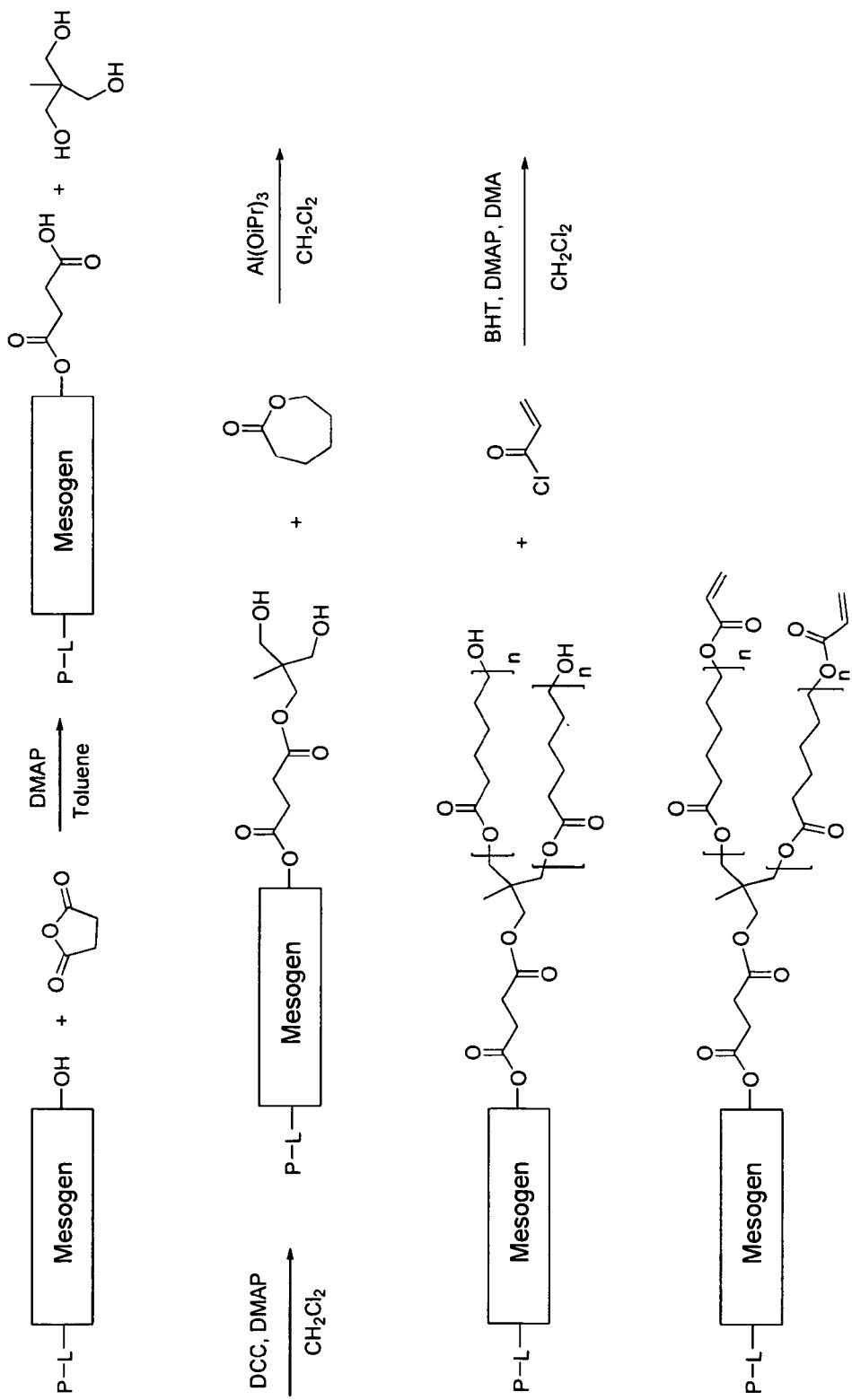

Referring now to FIGS. 10 and 11, mesogen containing compounds having structures according to Formula VI may be synthesized with hydroxyl end groups protected as the tetrahydro-2H-pyranyl ethers. According to these synthetic strategies, the mesogen is incorporated into the structure as the final step in the synthesis. Referring to FIG. 12, a approach to mesogen containing compounds represented by Formula VI or VII, wherein the mesogen structure is flanked by two soft caprolactone based linkers with a reactive group P or Q are synthesized. According to FIG. 12, when the reactive group P or Q is hydroxyl, it may be further functionalized by esterification of the hydroxyl group with (meth)acryloyl chloride to form a reactive ester functionality. Referring to FIG. 13, a mesogen containing structure having multiple reactive groups P, as represented by Formula VIII is synthesized. According to this approach, a polyhydroxy compound is used to establish a branching point in the structure. It should be noted that the synthetic schemes presented in FIGS. 1-13 are presented for illustration purposes only and are not meant to imply any preferred approach to the synthesis of mesogen containing compounds represented by Formulae I-VIII. One having ordinary skill in the art of organic synthesis would recognize that numerous other synthetic approaches are possible based on the structure of the target mesogen containing compound. Such alternate synthetic approaches are within the scope of the present disclosure.

In specific embodiments, the polymer may be a block or non-block copolymer comprising the residue of the mesogen containing compound incorporated into the copolymer. For example, in certain embodiments, the polymer may be a block copolymer comprising the residue of the mesogen containing compound incorporated into the copolymer, for example as a residue incorporated into the main chain of the copolymer or as a side-chain off the main chain of the copolymer. In certain embodiments, the block copolymer may comprise hard blocks and soft blocks. According to these embodiments, the mesogen containing compound may be incorporated into the hard block, the soft block, or both the hard block and soft block. In other embodiments, the mesogen containing compound may be dissolved (but not incorporated) into one of the blocks of the block copolymer, such as, for example, the hard block or the soft block. In other embodiments, the polymer may be a non-block copolymer (i.e., a copolymer that does not have large blocks of specific monomer residues), such as a random copolymer, an alternating copolymer, periodic copolymers, and statistical copolymers. For example, one or both of the co-monomer residues of the copolymer may be the mesogen containing compound, as described herein. The present disclosure is also intended to cover copolymers of more than two different types of co-monomer residues.

According to particular embodiments, the cured LCP may be a "soft" or a "hard" polymer, as defined herein. For example, in certain embodiments of the LCP may have a Fischer microhardness of less than from 0 to 200 Newtons/mm$^2$. In other embodiments, the LCP may have an average number of at least 20 bonds between adjacent intra- or inter-strand cross-links on a polymer backbone. That is, in a linear sequence of bonds on a polymer backbone, there is at least a linear sequence of 20 bonds between one cross-link and the next adjacent cross-link. While not wishing to be limited by any interpretation, it is believed that when the intra- or inter-strand cross-links on the backbone of a polymer, such as a cured LCP described herein, are far apart, for example, at least 20 bonds, the resulting polymer strands are more flexible and the resulting polymer has "softer" characteristics. As described herein, a polymer with "soft" characteristics may be desirable in certain applications, such as to ophthalmic applications, for example, photochromic applications.

In certain embodiments of the LC compositions of the present disclosure, the LC compositions may further comprise in addition to the at least one of photochromic compound, the dichroic compound or the photochromic-dichroic compound; a photosensitive material, a non-photosensitive material, and one or more additives. According to these embodiments, the one or more additives may be a liquid crystal, a liquid crystal property control additive, a non-linear optical material, a dye, an alignment promoter, a kinetic enhancer, a photoinitiator, a thermal initiator, a surfactant, a polymerization inhibitor, a solvent, a light stabilizer, a thermal stabilizer, a mold release agent, a rheology control agent, a gelator, a leveling agent, a free radical scavenger, a coupling agent, a tilt control additive, a block or non-block polymeric material, or an adhesion promoter. As used herein, the term "photochromic compounds" includes thermally reversible photochromic materials and non-thermally reversible photochromic materials, which are generally capable of converting from a first state, for example a "clear state," to a second state, for example a "colored state," in response to actinic radiation, and reverting back to the first state in response to thermal energy and actinic radiation, respectively. As used herein the term "photochromic" means having an absorption spectrum for at least visible radiation that varies in response to at least actinic radiation. As used herein "actinic radiation" means electromagnetic radiation, such as ultraviolet and visible radiation that is capable of causing a response. As used herein the term "dichroic" means capable of absorbing one of two orthogonal plane polarized components of at least transmitted radiation more strongly than the other. As used herein, the term "photosensitive material" includes materials that physically or chemically respond to electromagnetic radiation, such as, for example, phosphorescent materials or fluorescent materials. As used herein, the term "non-photosensitive materials" includes materials that do not respond to electromagnetic radiation, such as fixed tint dyes or thermochromic materials.

According to some embodiments the photochromic compound may comprise a photochromic group chosen from a thermally or non-thermally reversible pyran, a thermally or non-thermally reversible oxazine, or a thermally or non-thermally reversible fulgide. Also included are inorganic photochromic materials. As used herein, the term "non-thermally reversible" means adapted to switch from a first state to a second state in response to actinic radiation, and to revert back to the first state in response to actinic radiation.

Examples of thermally reversible photochromic pyrans from which photochromic compound may be chosen and that may be used in conjunction with various embodiments disclosed herein include benzopyrans, naphthopyrans, e.g., naphtho[1,2-b]pyrans, naphtho[2,1-b]pyrans, indeno-fused naphthopyrans, such as those disclosed in U.S. Pat. No. 5,645,767 at col. 2, line 16 to col. 12, line 57;, and heterocyclic-fused naphthopyrans, such as those disclosed in U.S. Pat. No. 5,723,072 at col. 2, line 27 to col. 15, line 55;, U.S. Pat. No. 5,698,141 at col. 2, line 11 to col. 19, line 45;, U.S. Pat. No. 6,153,126 at col. 2, line 26 to col. 8, line 60;, and U.S. Pat. No. 6,022,497 at col. 2, line 21 to col. 11, line 46; spiro-9-fluoreno[1,2-b]pyrans; phenanthropyrans; quinopyrans; fluoroanthenopyrans; spiropyrans, e.g., spiro(benzindoline) naphthopyrans, spiro(indoline)benzopyrans, spiro(indoline) naphthopyrans, spiro(indoline)quinopyrans and spiro(indoline)pyrans. More specific examples of naphthopyrans and the complementary organic photochromic substances are described in U.S. Pat. No. 5,658,501 at col. 1, line 64 to col. 13, line 17. Spiro(indoline)pyrans are also described in the text, *Techniques in Chemistry*, Volume III, "Photochromism", Chapter 3, Glenn H. Brown, Editor, John Wiley and Sons, Inc., New York, 1971.

Examples of thermally reversible photochromic oxazines from which the photochromic compounds may be chosen and that may be used in conjunction with various embodiments disclosed herein include benzoxazines, naphthoxazines, and spiro-oxazines, e.g., spiro(indoline)naphthoxazines, spiro (indoline)pyridobenzoxazines, spiro(benzindoline)pyridobenzoxazines, spiro(benzindoline)naphthoxazines, spiro(indoline)benzoxazines, spiro(indoline)fluoranthenoxazine, and spiro(indoline)quinoxazine.

Examples of thermally reversible photochromic fulgides from which the photochromic compounds may be chosen and that may be used in conjunction with various embodiments disclosed herein include: fulgimides, and the 3-furyl and 3-thienyl fulgides and fulgimides, which are disclosed in U.S. Pat. No. 4,931,220 at column 2, line 51 to column 10, line 7, and mixtures of any of the aforementioned photochromic materials/compounds. Examples of non-thermally reversible photochromic compounds from which the photochromic compounds may be chosen and that may be used in conjunction with various embodiments disclosed herein include the photochromic compounds disclosed in US Patent Application Publication 2005/0004361 at paragraphs [0314] to [0317].

In certain embodiments, the photochromic compound may be an inorganic photochromic compound. Examples of suitable include crystallites of silver halide, cadmium halide and/or copper halide. Other Examples of inorganic photochromic materials may be prepared by the addition of europium(II) and/or cerium(II) to a mineral glass, such as a soda-silica glass. According to one embodiment, the inorganic photochromic materials may be added to molten glass and formed into particles that are incorporated into the compositions of the present disclosure to form microparticles comprising such particulates. The glass particulates may be formed by any of a number of various methods known in the art. Suitable inorganic photochromic materials are further described in Kirk Othmer, Encyclopedia of Chemical Technology, 4th ed., volume 6, pages 322-325.

Other embodiments of the compositions may comprise a photosensitive material, including luminescent dyes, such as a phosphorescent dye or a fluorescent dye. As known to those skilled in the art, after activation the phosphorescent dyes and fluorescent dyes emit visible radiation when an atom or molecule passes from a higher to a lower electronic state. One difference between the two dye types is that the emission of luminescence after exposure to radiation from the fluorescent dye occurs sooner than that from a phosphorescent dye.

Fluorescent dyes known to those skilled in the art may be used as photosensitive materials in various embodiments of the present disclosure. For a listing of various fluorescent dyes, see, Haugland, R. P., *Molecular Probes Handbook for Fluorescent Probes and Research Chemicals*, 6th ed., 1996. Examples of fluorescent dyes include anthracenes tetracenes, pentacenes, rhodamines, benzophenones, coumarins, fluoresceins, perylenes, and mixtures thereof.

Phosphorescent dyes known to those skilled in the art may be used as photosensitive materials in various embodiments of the present disclosure. Suitable examples of phosphorescent dyes include, metal-ligand complexes such as tris(2-phenylpyridine)iridium [Ir(ppy)$_3$] and 2,3,7,8,12,13,17,18-octaethyl-21H,23H-porphyrin platinum(II) [PtOEP]; and organic dyes such as eosin (2',4',5',7'-tetrabromofluorescein), 2,2'-bipyridine and erthrosin (2',4',5',7'-tetraiodofluorescein).

Examples of non-photosensitive materials suitable for use in the compositions of the present disclosure include fixed-tint dyes. Examples of suitable fixed-tint dyes may include nitrobenzene dyes, azo dyes, anthraquinone dyes, naphthoquinone dyes, benzoquinone dyes, phenothiazine dyes, indigoid dyes, xanthene dyes, pheanthridine dyes, phthalocyanin dyes and dyes derived from triarylmethane. These fixed-tint dyes may be used alone or as mixtures with other fixed-tint dyes or other chromophoric compounds (such as photochromic compounds).

Suitable examples of dyes used with suitable other chemicals to make thermochromic materials include substituted phenylmethanes and fluorans, such as 3,3'-dimethoxyfluoran (yellow); 3-chloro-6-phenylaminofluoran (orange); 3-diethylamino-6-methyl-7-chlorofluoran (vermilion); 3-diethyl-7,8-benzofluoran (pink); Crystal Violet lactone (blue); 3,3',3"-tris(p-dimethylaminophenyl)phthalide (purplish blue); Malachite Green lactone (green); 3,3;-bis(pdimethylaminophenyl)phthalide (green); 3-diethylmaino-6-methyl-7-phenylaminofluoran (black), indolyl phthalides, spiropyrans, coumarins, fulgides, etc. Further, thermochromic materials may also include cholesteric liquid crystals and mixtures of cholesteric liquid crystals and nematic liquid crystals.

According to one specific, embodiment, the photochromic compound may comprise at least two photochromic groups, wherein the photochromic groups are linked to one another via linking group substituents on the individual photochromic groups. For example, the photochromic groups can be polymerizable photochromic groups or photochromic groups that are adapted to be compatible with a host material ("compatibilized photochromic group"). Examples of polymerizable photochromic groups which can be chosen and that are useful in conjunction with various embodiments disclosed herein are disclosed in U.S. Pat. No. 6,113,814 at column 2, line 24 to column 22, line 7. Examples of compatiblized photochromic groups which can be chosen and that are useful in conjunction with various embodiments disclosed herein are disclosed in U.S. Pat. No. 6,555,028 at column 2, line 40 to column 24, line 56.

Other suitable photochromic groups and complementary photochromic groups are described in U.S. Pat. No. 6,080,338 at column 2, line 21 to column 14, line 43; U.S. Pat. No. 6,136,968 at column 2, line 43 to column 20, line 67; U.S. Pat. No. 6,296,785 at column 2, line 47 to column 31, line 5; U.S. Pat. No. 6,348,604 at column 3, line 26 to column 17, line 15; U.S. Pat. No. 6,353,102 at column 1, line 62 to column 11, line 64; and U.S. Pat. No. 6,630,597 at column 2, line 16 to column 16, line 23.

As set forth above, in certain embodiments the photochromic compound may be a photochromic pyran. According to these embodiments, the photochromic compound may be represented by Formula IX:

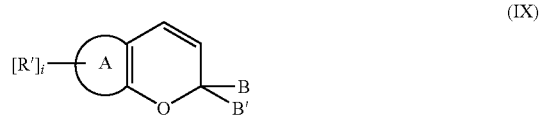

(IX)

With reference to Formula IX, A is a substituted or unsubstituted aromatic ring or a substituted or unsubstituted fused aromatic ring chosen from: naphtho, benzo, phenanthro, fluorantheno, antheno, quinolino, thieno, furo, indolo, indolino, indeno, benzofuro, benzothieno, thiopheno, indeno-fused naphtho, heterocyclic-fused naphtho, and heterocyclic-fused benzo. According to these embodiments, the possible substituents on the aromatic or fused aromatic ring are disclosed in U.S. Pat. Nos. 5,458,814; 5,466,398; 5,514,817; 5,573,712; 5,578,252; 5,637,262; 5,650,098; 5,651,923; 5,698,141; 5,723,072; 5,891,368; 6,022,495; 6,022,497; 6,106,744; 6,149,841; 6,248,264; 6,348,604; 6,736998; 7,094,368, 7,262,295 and 7,320,826. According to Formula IX, "i" may be the number of substituent(s) R' attached to ring A, and may range from 0 to 10. Further, with reference to Formula IX, B and B' may each independently represent a group chosen from:

a metallocenyl group (such as those described in U.S. Patent Application Publication 2007/0278460 at paragraph [0008] to [0036]);

an aryl group that is mono-substituted with a reactive substituent or a compatiblizing substituent (such as those discussed in U.S. Patent Application Publication 2007/0278460 at paragraph [0037] to [0059]);

9-julolidinyl, an unsubstituted, mono-, di- or tri-substituted aryl group chosen from phenyl and naphthyl, an unsubstituted, mono- or di-substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl and fluorenyl, wherein the aryl and heteroaromatic substituents are each independently:

hydroxy, aryl, mono- or di-($C_1$-$C_{12}$)alkoxyaryl, mono- or di-($C_1$-$C_{12}$)alkylaryl, haloaryl, $C_3$-$C_7$ cycloalkylaryl, $C_3$-$C_7$ cycloalkyl, $C_3$-$C_7$ cycloalkyloxy, $C_3$-$C_7$ cycloalkyloxy($C_1$-$C_{12}$)alkyl, $C_3$-$C_7$ cycloalkyloxy($C_1$-$C_{12}$)alkoxy, aryl($C_1$-$C_{12}$)alkyl, aryl($C_1$-$C_{12}$)alkoxy, aryloxy, aryloxy($C_1$-$C_{12}$)alkyl, aryloxy($C_1$-$C_{12}$)alkoxy, mono- or di-($C_1$-$C_{12}$)alkylaryl($C_1$-$C_{12}$)alkyl, mono- or di-($C_1$-$C_{12}$)alkoxyaryl($C_1$-$C_{12}$)alkyl, mono- or di-($C_1$-$C_{12}$)alkylaryl($C_1$-$C_{12}$)alkoxy, mono- or di-($C_1$-$C_{12}$) alkoxyaryl($C_1$-$C_{12}$)alkoxy, amino, mono- or di-($C_1$-$C_{12}$)alkylamino, diarylamino, piperazino, N-($C_1$-$C_{12}$)

alkylpiperazino, N-arylpiperazino, aziridino, indolino, piperidino, morpholino, thiomorpholino, tetrahydroquinolino, tetrahydroisoquinolino, pyrrolidino, $C_1$-$C_{12}$ alkyl, $C_1$-$C_{12}$ haloalkyl, $C_1$-$C_{12}$ alkoxy, mono ($C_1$-$C_{12}$)alkoxy($C_1$-$C_{12}$)alkyl, acryloxy, methacryloxy, halogen or —C(=O)$R^1$, wherein $R^1$ represents a group, such as, —$OR^2$, —N($R^3$)$R^4$, piperidino or morpholino, wherein $R^2$ represents a group, such as, allyl, $C_1$-$C_6$ alkyl, phenyl, mono($C_1$-$C_6$)alkyl substituted phenyl, mono($C_1$-$C_6$)alkoxy substituted phenyl, phenyl($C_1$-$C_3$) alkyl, mono($C_1$-$C_6$)alkyl substituted phenyl($C_1$-$C_3$) alkyl, mono($C_1$-$C_6$)alkoxy substituted phenyl($C_1$-$C_3$) alkyl, $C_1$-$C_6$ alkoxy($C_2$-$C_4$)alkyl or $C_1$-$C_6$ haloalkyl, and $R^3$ and $R^4$ each independently represents a group, such as, $C_1$-$C_6$ alkyl, $C_5$-$C_7$ cycloalkyl or a substituted or an unsubstituted phenyl, wherein said phenyl substituents are each independently $C_1$-$C_6$ alkyl or $C_1$-$C_6$ alkoxy;

an unsubstituted or mono-substituted group chosen from pyrazolyl, imidazolyl, pyrazolinyl, imidazolinyl, pyrrolidino, phenothiazinyl, phenoxazinyl, phenazinyl and acridinyl, wherein said substituents are each independently $C_1$-$C_{12}$ alkyl, $C_1$-$C_{12}$ alkoxy, phenyl or halogen;

a 4-substituted phenyl, the substituent being a dicarboxylic acid residue or derivative thereof, a diamine residue or derivative thereof, an amino alcohol residue or derivative thereof, a polyol residue or derivative thereof, —(CH$_2$)—, —(CH$_2$)$_k$— or —[O—(CH$_2$)$_k$]$_q$—, wherein "k" represents an integer ranging from 2 to 6 and "q" represents an integer ranging from 1 to 50, and wherein the substituent is connected to an aryl group of another photochromic material;

a group represented by:

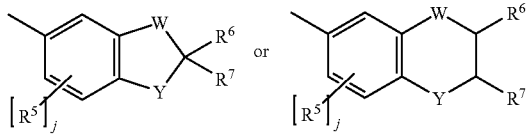

wherein W represents a group, such as, —CH$_2$— or oxygen; Y represents a group, such as, oxygen or substituted nitrogen, provided that when Y represents substituted nitrogen, W represents —CH$_2$—, the substituted nitrogen substituents being hydrogen, $C_1$-$C_{12}$ alkyl or $C_1$-$C_{12}$ acyl; each $R^5$ independently represents a group, such as, $C_1$-$C_{12}$ alkyl, $C_1$-$C_{12}$ alkoxy, hydroxy or halogen; $R^6$ and $R^7$ each independently represent a group, such as, hydrogen or $C_1$-$C_{12}$ alkyl; and "j" represents an integer ranging from 0 to 2; or a group represented by:

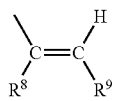

wherein $R^8$ represents a group, such as, hydrogen or $C_1$-$C_{12}$ alkyl, and $R^9$ represents a group, such as, an unsubstituted, mono- or di-substituted naphthyl, phenyl, furanyl or thienyl, wherein said naphthyl, phenyl, furanyl and thienyl substituents are each independently $C_1$-$C_{12}$ alkyl, $C_1$-$C_{12}$ alkoxy or halogen. Alternatively, B and B' may represent groups that together form a fluoren-9-ylidene or mono- or di-substituted fluoren-9-ylidene, each of said fluoren-9-ylidene substituents independently being $C_1$-$C_{12}$ alkyl, $C_1$-$C_{12}$ alkoxy or halogen.

Further, with reference to Formula IX, R' may be a substituent on a ring in Formula IX, wherein if R' is a substituent on an sp$^3$ hybridized carbon, each R' may be independently selected from: a metallocenyl group; a reactive substituent or a compatiblizing substituent; perhalo($C_1$-$C_{10}$)alkyl, a perhalo ($C_2$-$C_{10}$)alkenyl, a perhalo($C_3$-$C_{10}$)alkynyl, a perhalo($C_1$-$C_{10}$)alkoxy or a perhalo($C_3$-$C_{10}$)cycloalkyl; a group represented by —O(CH$_2$)$_a$(CJ$_2$)$_b$CK$_3$, wherein K is a halogen, J is hydrogen or halogen, "a" is an integer ranging from 1 to 10, and "b" is an integer ranging from 1 to 10; a silicon-containing group represented by one of

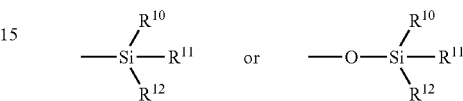

wherein $R^{10}$, $R^{11}$, and $R^{12}$ are each independently $C_1$-$C_{10}$ alkyl, $C_1$-$C_{10}$ alkoxy or phenyl; hydrogen, hydroxy, $C_1$-$C_6$ alkyl, chloro, fluoro, $C_3$-$C_7$ cycloalkyl, allyl or $C_1$-$C_8$ haloalkyl; morpholino, piperidino, pyrrolidino, an unsubstituted, mono- or di-substituted amino, wherein said amino substituents are each independently $C_1$-$C_6$ alkyl, phenyl, benzyl or naphthyl; an unsubstituted, mono-, di- or tri-substituted aryl group chosen from phenyl, naphthyl, benzyl, phenanthryl, pyrenyl, quinolyl, isoquinolyl, benzofuranyl, thienyl, benzothienyl, dibenzofuranyl, dibenzothienyl, carbazolyl or indolyl, wherein the aryl group substituents are each independently halogen, $C_1$-$C_6$ alkyl or $C_1$-$C_6$ alkoxy; —C(=O)$R^{13}$, wherein $R^{13}$ is hydrogen, hydroxy, $C_1$-$C_6$ alkyl, $C_1$-$C_6$ alkoxy, amino, mono- or di-($C_1$-$C_6$)alkylamino, morpholino, piperidino, pyrrolidino, an unsubstituted, mono- or di-substituted phenyl or naphthyl, an unsubstituted, mono- or di-substituted phenoxy, an unsubstituted, mono- or di-substituted phenylamino, wherein said phenyl, naphthyl, phenoxy, and phenylamino substituents are each independently $C_1$-$C_6$ alkyl or $C_1$-$C_6$ alkoxy; —$OR^{14}$, wherein $R^{14}$ is $C_1$-$C_6$ alkyl, phenyl ($C_1$-$C_3$)alkyl, mono($C_1$-$C_6$)alkyl substituted phenyl($C_1$-$C_3$) alkyl, mono($C_1$-$C_6$)alkoxy substituted phenyl($C_1$-$C_3$)alkyl, $C_1$-$C_6$ alkoxy($C_2$-$C_4$)alkyl, $C_3$-$C_7$ cycloalkyl, mono($C_1$-$C_4$) alkyl substituted $C_3$-$C_7$ cycloalkyl, $C_1$-$C_8$ chloroalkyl, $C_1$-$C_8$ fluoroalkyl, allyl or $C_1$-$C_6$ acyl; —CH($R^{15}$)$R^{16}$, wherein $R^{15}$ is hydrogen or $C_1$-$C_3$ alkyl, and $R^{16}$ is —CN, —CF$_3$ or —COOR$^{17}$, wherein $R^{17}$ is hydrogen or $C_1$-$C_3$ alkyl, or —C(=O)$R^{18}$, wherein $R^{18}$ is hydrogen, $C_1$-$C_6$ alkyl, $C_1$-$C_6$ alkoxy, amino, mono- or di-($C_1$-$C_6$)alkylamino, an unsubstituted, mono- or di-substituted phenyl or naphthyl, an unsubstituted, mono- or di-substituted phenoxy or an unsubstituted, mono- or di-substituted phenylamino, wherein said phenyl, naphthyl, phenoxy and phenylamino substituents are each independently $C_1$-$C_6$ alkyl or $C_1$-$C_6$ alkoxy; a 4-substituted phenyl, the substituent being a dicarboxylic acid residue or derivative thereof, a diamine residue or derivative thereof, an amino alcohol residue or derivative thereof, a polyol residue or derivative thereof, —(CH$_2$)—, —(CH$_2$)$_k$— or —[O—(CH$_2$)$_k$]$_q$—, wherein "k" is an integer ranging from 2 to 6 and "q" is an integer ranging from 1 to 50, and wherein the substituent is connected to an aryl group on another photochromic material; —CH($R^{19}$)$_2$, wherein $R^{19}$ is —CN or —COOR$^{20}$, wherein $R^{20}$ is hydrogen, $C_1$-$C_6$ alkyl, $C_3$-$C_7$ cycloalkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl or an unsubstituted, mono- or di-substituted phenyl or naphthyl, wherein said phenyl and naphthyl substituents are each independently $C_1$-$C_6$ alkyl or $C_1$-$C_6$ alkoxy; —CH($R^{21}$)$R^{22}$, wherein $R^{21}$ is hydrogen, $C_1$-$C_6$ alkyl or an unsubstituted, mono- or di-substituted phenyl or naphthyl, wherein said phenyl and naphthyl substituents are each independently $C_1$-$C_6$ alkyl or $C_1$-$C_6$ alkoxy, and $R^{22}$ is —C(=O)O$R^{23}$, —C(=O)$R^{24}$ or —CH$_2$O$R^{25}$, wherein $R^{23}$ is hydrogen, $C_1$-$C_6$ alkyl, $C_3$-$C_7$ cycloalkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl or an unsubstituted, mono- or di-substituted phenyl or naphthyl, wherein said phenyl and naphthyl substituents are each independently $C_1$-$C_6$ alkyl or $C_1$-$C_6$ alkoxy, $R^{24}$ is hydrogen, $C_1$-$C_6$ alkyl, amino, mono($C_1$-$C_6$)alkylamino, di($C_1$-$C_6$)alkylamino, phenylamino, diphenylamino, (mono- or di-($C_1$-$C_6$)alkyl substituted phenyl)amino, (mono- or di-($C_1$-$C_6$)alkoxy substituted phenyl)amino, di(mono- or di-($C_1$-$C_6$)alkyl substituted phenyl)amino, di(mono- or di-($C_1$-$C_6$)alkoxy substituted phenyl)amino, morpholino, piperidino or an unsubstituted, mono- or di-substituted phenyl or naphthyl, wherein said phenyl or naphthyl substituents are each independently $C_1$-$C_6$ alkyl or $C_1$-$C_6$ alkoxy, and $R^{25}$ is hydrogen, —C(=O)$R^{23}$, $C_1$-$C_6$ alkyl, $C_1$-$C_3$ alkoxy ($C_1$$C_6$)alkyl, phenyl($C_1$-$C_6$)alkyl, mono-alkoxy substituted phenyl($C_1$-$C_6$)alkyl or an unsubstituted, mono- or di-substituted phenyl or naphthyl, wherein said phenyl or naphthyl substituents are each independently $C_1$-$C_6$ alkyl or $C_1$-$C_6$ alkoxy; or two R' groups on the same atom together form an oxo group, a spiro-carbocyclic group containing 3 to 6 carbon atoms or a spiro-heterocyclic group containing 1 to 2 oxygen atoms and 3 to 6 carbon atoms including the spirocarbon atom, said spiro-carbocyclic and spiro-heterocyclic groups being annellated with 0, 1 or 2 benzene rings; or when R' is a substituent on an sp$^2$ hybridized carbon, each R' may be independently: hydrogen; $C_1$-$C_6$ alkyl; chloro; fluoro; bromo; $C_3$-$C_7$ cycloalkyl; an unsubstituted, mono- or di-substituted phenyl, wherein said phenyl substituents are each independently $C_1$-$C_6$ alkyl or $C_1$-$C_6$ alkoxy; —O$R^{26}$ or —OC(=O)$R^{26}$ wherein $R^{26}$ is hydrogen, amine, alkylene glycol, polyalkylene glycol, $C_1$-$C_6$ alkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, ($C_1$-$C_6$)alkoxy($C_2$-$C_4$)alkyl, $C_3$-$C_7$ cycloalkyl, mono($C_1$-$C_4$)alkyl substituted $C_3$-$C_7$ cycloalkyl or an unsubstituted, mono- or di-substituted phenyl, wherein said phenyl substituents are each independently $C_1$-$C_6$ alkyl or $C_1$-$C_6$ alkoxy; a reactive substituent or a compatiblizing substituent; a 4-substituted phenyl, said phenyl substituent being a dicarboxylic acid residue or derivative thereof, a diamine residue or derivative thereof, an amino alcohol residue or derivative thereof, a polyol residue or derivative thereof, —(CH$_2$)—, —(CH$_2$)$_k$— or —[O—(CH$_2$)$_k$]$_q$—, wherein "k" is an integer ranging from 2 to 6, and "q" is an integer ranging from 1 to 50, and wherein the substituent is connected to an aryl group on another photochromic material; —N($R^{27}$)$R^{28}$, wherein $R^{27}$ and $R^{28}$ are each independently hydrogen, $C_1$-$C_8$ alkyl, phenyl, naphthyl, furanyl, benzofuran-2-yl, benzofuran-3-yl, thienyl, benzothien-2-yl, benzothien-3-yl, dibenzofuranyl, dibenzothienyl, benzopyridyl, fluorenyl, $C_1$-$C_8$ alkylaryl, $C_3$-$C_8$ cycloalkyl, $C_4$-$C_{16}$ bicycloalkyl, $C_5$-$C_{20}$ tricycloalkyl or $C_1$-$C_{20}$ alkoxy($C_1$-$C_6$)alkyl, or $R^{27}$ and $R^{28}$ come together with the nitrogen atom to form a $C_3$-$C_{20}$ hetero-bicycloalkyl ring or a $C_4$-$C_{20}$ hetero-tricycloalkyl ring; a nitrogen containing ring represented by:

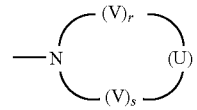

wherein each —V— is independently chosen for each occurrence from —CH$_2$—, —CH($R^{29}$)—, —C($R^{29}$)$_2$—, —CH(aryl)-, —C(aryl)$_2$-and —C($R^{29}$)(aryl)-, wherein each $R^{29}$ is independently $C_1$-$C_6$ alkyl and each aryl is independently phenyl or naphthyl; —U— is —V—, —O—, —S—, —S(O)—, —SO$_2$—, —NH—, —N($R^{29}$)— or —N(aryl)-; "s" is an integer ranging from 1 to 3; and "r" is an integer ranging from 0 to 3, provided that if "r" is 0 then —U— is the same as —V—; a group represented by:

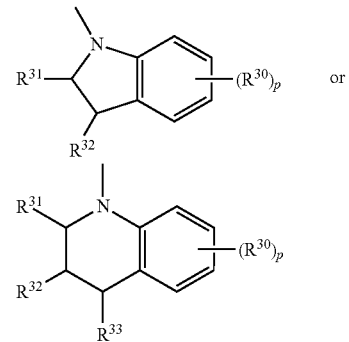

wherein each $R^{30}$ is independently $C_1$-$C_6$ alkyl, $C_1$-$C_6$ alkoxy, fluoro or chloro; $R^{31}$, $R^{32}$ and $R^{33}$ are each independently hydrogen, $C_1$-$C_6$ alkyl, phenyl or naphthyl, or $R^{31}$ and $R^{32}$ together form a ring of 5 to 8 carbon atoms; and "p" is an integer ranging from 0 to 3; or a substituted or an unsubstituted $C_4$-$C_{18}$ spirobicyclic amine or a substituted or an unsubstituted $C_4$-$C_{18}$ spirotricyclic amine, wherein said substituents are each independently aryl, $C_1$-$C_6$ alkyl, $C_1$-$C_6$ alkoxy or phenyl($C_1$-$C_6$)alkyl;

or R' may be a metallocenyl group; perfluoroalkyl or perfluoroalkoxy; —C(=O)$R^{34}$ or —SO$_2$$R^{34}$, wherein each $R^{34}$ is independently hydrogen, $C_1$-$C_6$ alkyl, —O$R^{35}$ or —N$R^{36}$$R^{37}$, wherein $R^{35}$, $R^{36}$ and $R^{37}$ are each independently hydrogen, $C_1$-$C_6$ alkyl, $C_5$-$C_7$ cycloalkyl, alkylene glycol, polyalkylene glycol or an unsubstituted, mono- or di-substituted phenyl, wherein said phenyl substituents are each independently $C_1$-$C_6$ alkyl or $C_1$-$C_6$ alkoxy; —C(=C($R^{38}$)$_2$)$R^{39}$, wherein each $R^{38}$ is independently —C(=O)$R^{34}$, —O$R^{35}$, —OC(=O)$R^{35}$, —N$R^{36}$$R^{37}$, hydrogen, halogen, cyano, $C_1$-$C_6$ alkyl, $C_5$-$C_7$ cycloalkyl, alkylene glycol, polyalkylene glycol or an unsubstituted, mono- or di-substituted phenyl, wherein said phenyl substituents are each independently $C_1$-$C_6$ alkyl or $C_1$-$C_6$ alkoxy, and $R^{39}$ is hydrogen, $C_1$-$C_6$ alkyl, $C_5$-$C_7$ cycloalkyl, alkylene glycol, polyalkylene glycol or an unsubstituted, mono- or di-substituted phenyl, wherein said phenyl substituents are each independently $C_1$-$C_6$ alkyl or $C_1$-$C_6$ alkoxy; or —C≡C$R^{40}$ or —C≡N wherein $R^{40}$ is —C(=O)$R^{34}$, hydrogen, $C_1$-$C_6$ alkyl, $C_5$-$C_7$ cycloalkyl or an unsubstituted, mono- or di-substituted phenyl, wherein said phenyl substituents are each independently $C_1$-$C_6$ alkyl or $C_1$-$C_6$ alkoxy; or a least one pair of adjacent R' groups together form a group represented by:

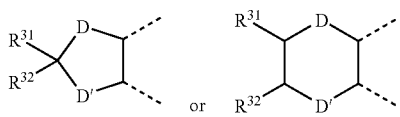

wherein D and D' are each independently oxygen or the group —NR$^{27}$—; or two R' groups on adjacent atoms come together form an aromatic or heteroaromatic fused group, said fused group being benzo, indeno, dihydronaphthalene, indole, benzofuran, benzopyran or thianaphthene.

In other embodiments, the LC compositions of the present disclosure may comprise a dichroic compound. Suitable dichroic compounds are described in detail in U.S. Pat. No. 7,097,303 at column 7, lines 6 to 60. Other examples of suitable conventional dichroic compounds include azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, iodine and iodates. In another embodiment, the dichroic material can be a polymerizable dichroic compound. That is, according to this embodiment, the dichroic material can comprise at least one group that is capable of being polymerized (i.e., a "polymerizable group" or "reactive group"). For example in one embodiment the at least one dichroic compound can have at least one alkoxy, polyalkoxy, alkyl, or polyalkyl substituent terminated with at least one polymerizable group. As used herein the term "dichroic" means capable absorbing one of two orthogonal plane polarized components of at least transmitted radiation more strongly than the other. As used herein, the terms "linearly polarize" or "linearly polarization" mean to confine the vibrations of the electric vector of light waves to one direction. Accordingly, dichroic dyes are capable of absorbing one of two orthogonal plane polarized components of transmitted radiation more strongly than the other, thereby resulting in linear polarization of the transmitted radiation. However, while dichroic dyes are capable of preferentially absorbing one of two orthogonal plane polarized components of transmitted radiation, if the molecules of the dichroic dye are not aligned, no net linear polarization of transmitted radiation will be achieved. That is, due to the random positioning of the molecules of the dichroic dye, selective absorption by the individual molecules can cancel each other such that no net or overall linear polarizing effect is achieved. Thus, it is generally necessary to align the molecules of the dichroic dye in order to achieve a net linear polarization. An alignment facility such as described in U.S. Patent Application Publication 2005/0003107 at paragraphs [0008] to [0126], may be used to facilitate the positioning of an optically anisotropic dye, such as a dichroic dye, thereby achieving a desired optical property or effect.

Still other embodiments of the LC compositions herein may comprise a photochromic-dichroic compound. As used herein the term "photochromic-dichroic" means displaying both photochromic and dichroic (i.e., linearly polarizing) properties under certain conditions, which properties are at least detectible by instrumentation. Accordingly, "photochromic-dichroic compounds" are compounds displaying both photochromic and dichroic (i.e., linearly polarizing) properties under certain conditions, which properties are at least detectible by instrumentation. Thus, photochromic-dichroic compounds have an absorption spectrum for at least visible radiation that varies in response to at least actinic radiation and are capable of absorbing one of two orthogonal plane polarized components of at least transmitted radiation more strongly than the other. Additionally, as with conventional photochromic compounds discussed above, the photochromic-dichroic compounds disclosed herein can be thermally reversible. That is, the photochromic-dichroic compounds can switch from a first state to a second state in response to actinic radiation and revert back to the first state in response to thermal energy.

Further, according to various embodiments disclosed herein, the mesogen containing material can be adapted to allow the at least one photochromic compound, dichroic compound, or photochromic-dichroic compound to switch from a first state to the second state at a desired rate. Generally speaking conventional photochromic/dichroic compounds can undergo a transformation from one isomeric form to another in response to actinic radiation, with each isomeric form having a characteristic absorption spectrum and/or polarization characteristic. The photochromic compound, dichroic compound, or photochromic-dichroic compounds according to various embodiments disclosed herein undergo a similar isomeric transformation. The rate or speed at which this isomeric transformation (and the reverse transformation) occurs depends, in part, upon the properties of the cured layer comprising the mesogen containing compound surrounding the photochromic compound, dichroic compound, or photochromic-dichroic compound (that is, the "host"). It is believed by the inventors the rate of transformation of the photochromic/dichroic compound(s) will depend, in part, upon the flexibility of the chain segments of the host, that is, the mobility or viscosity of the chain segments of the host. In particular it is believed that the rate of transformation of the photochromic compound, dichroic compound, or photochromic-dichroic compound will generally be faster in hosts having flexible chain segments than in hosts having stiff or rigid chain segments. Therefore, according to certain embodiments disclosed herein, wherein the at least partial layer comprising a composition comprising the mesogen containing compound is a host, the composition can be adapted to allow the photochromic compound, dichroic compound, or photochromic-dichroic compound to transform between various isomeric states at desired rates. For example, the composition can be adapted by adjusting one or more of the molecular weight and the cross-link density of the mesogen containing compound or residue thereof.

For example, according to various embodiments disclosed herein, the at least one photochromic-dichroic compound can have a first state having a first absorption spectrum, a second state having a second absorption spectrum that is different from the first absorption spectrum, and can be adapted to switch from the first state to the second state in response to at least actinic radiation and to revert back to the first state in response to thermal energy. Further, the photochromic-dichroic compound can be dichroic (i.e., linearly polarizing) in one or both of the first state and the second state. For example, although not required, the photochromic-dichroic compound can be linearly polarizing in an activated state and non-polarizing in the bleached or faded (i.e., not activated) state. As used herein, the term "activated state" refers to the photochromic-dichroic compound when exposed to sufficient actinic radiation to cause the at least a portion of the photochromic-dichroic compound to switch from a first state to a second state. Further, although not required, the photochromic-dichroic compound can be dichroic in both the first and second states. For example, the photochromic-dichroic compound can linearly polarize visible radiation in both the activated state and the bleached state. Further, the photochromic-dichroic compound can linearly polarize visible radiation in an activated state, and can linearly polarize UV radiation in the bleached state. Examples of suitable photochromic-dichroic compounds that may be included in the LC compositions described herein include those disclosed in U.S. Patent Application Publication 2005/0012998 at paragraphs [0089] to [0339]. In addition, a general structure for certain photochromic dichroic compounds is presented in U.S. Pat. No. 7,342, 112 at column 5, line 35 to column 31, line 3 and Table V spanning columns 97-102.

For example, it is contemplated that the photochromic compounds and/or photochromic-dichroic compounds disclosed herein can be used alone or in conjunction with another conventional organic photochromic compound (as discussed above), in amounts or ratios such that the LC compositions into which the photochromic or photochromic-dichroic compounds are incorporated, or onto which the LC compositions are applied (for example, the substrate), can exhibit a desired color or colors, either in an activated or a "bleached" state. Thus the amount of the photochromic or photochromic-dichroic compounds used is not critical provided that a sufficient amount is present to produce a desired photochromic effect. As used herein, the term "photochromic amount" refers to the amount of the photochromic or photochromic-dichroic compound necessary to produce the desired photochromic effect.

The LC compositions and other articles according to various embodiments disclosed herein can comprise any amount of the photochromic compound, dichroic compound and/or photochromic-dichroic necessary to achieve the desired optical properties photochromic properties and dichroic properties.

According to specific embodiments of the LC compositions, the compositions may further comprise an additive selected from a liquid crystal, a liquid crystal property control agent, a non-linear optical material, a dye, an alignment promoter, a kinetic enhancer, a photoinitiator, a thermal initiator, a surfactant, a polymerization inhibitor, a solvent, a light stabilizer (such as ultraviolet light absorbers and light stabilizers such as hindered amine light stabilizers (HALS)), a thermal stabilizer, a mold release agent, a rheology control agent, a gelator, a leveling agent (such as a surfactant), a free radical scavenger, or an adhesion promoter (such as hexane diol diacrylate and coupling agents).

Liquid crystal materials used herein may be chosen from liquid crystal polymers, liquid crystal pre-polymers, and liquid crystal monomers. As used herein the term "pre-polymer" means partially polymerized materials.

Liquid crystal monomers that are suitable for use in conjunction with various embodiments disclosed herein include mono-functional as well as multi-functional liquid crystal monomers. Further, according to various embodiments disclosed herein, the liquid crystal monomer can be a cross-linkable liquid crystal monomer, and can further be a photocross-linkable liquid crystal monomer. As used herein the term "photocross-linkable" means a material, such as a monomer, a pre-polymer or a polymer, that can be cross-linked on exposure to actinic radiation.

Examples of cross-linkable liquid crystal monomers suitable for use according to various embodiments disclosed herein include liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers and blends thereof. Examples of photocross-linkable liquid crystal monomers suitable for use according to various embodiments disclosed herein include liquid crystal monomers having functional groups chosen from acrylates, methacrylates, alkynes, epoxides, thiols, and blends thereof. Other suitable cross-linking functional groups will be known to those with ordinary skill in the art.

Liquid crystal polymers and pre-polymers that are suitable for use in conjunction with various embodiments disclosed herein include thermotropic liquid crystal polymers and pre-polymers, and lyotropic liquid crystal polymers and pre-polymers. Further, the liquid crystal polymers and pre-polymers can be main-chain polymers and pre-polymers or side-chain polymers and pre-polymers. Additionally, according to various embodiments disclosed herein, the liquid crystal polymer or pre-polymer can be cross-linkable, and further can be photocross-linkable.

Examples of suitable liquid crystal polymers and pre-polymers that are suitable for use according to various embodiments disclosed herein include main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Examples of photocross-linkable liquid crystal polymers and pre-polymers that are suitable for use according to various embodiments disclosed herein include those polymers and pre-polymers having functional groups chosen from acrylates, methacrylates, alkynes, epoxides, thiols, and blends thereof.

In certain embodiments, one or more surfactants may be used. Surfactants include materials otherwise known as wetting agents, anti-foaming agents, emulsifiers, dispersing agents, leveling agents etc. Surfactants can be anionic, cationic and nonionic, and many surfactants of each type are available commercially. Examples of nonionic surfactants that may be used include ethoxylated alkyl phenols, such as the IGEPAL® DM surfactants or octyl-phenoxypolyethoxyethanol sold as TRITON® X-100, an acetylenic diol such as 2,4,7,9-tetramethyl-5-decyne-4,7-diol sold as SURFYNOL® 104, ethoxylated acetylenic diols, such as the SURFYNOL® 400 surfactant series, fluoro-surfactants, such as the FLUORAD® fluorochemical surfactant series, and capped nonionics such as the benzyl capped octyl phenol ethoxylates sold as TRITON® CF87, the propylene oxide capped alkyl ethoxylates, which are available as the PLURAFAC® RA series of surfactants, octylphenoxyhexadecylethoxy benzyl ether, polyether modified dimethylpolysiloxane copolymer in solvent sold as BYK®-306 additive by Byk Chemie and mixtures of such recited surfactants.

Embodiments of non-linear optical (NLO) materials may include substantially any organic material that exhibits non-linear optical properties and forms crystals, which are currently available or may be synthesized in the future. Examples include the following organic compounds: N-(4-nitrophenyl)-(L)-prolinol (NPP); 4-N,N-dimethylamino-4'-N'-methyl-stilbazolium tosylate (DAST); 2-methyl-4-nitroaniline (MNA); 2-amino-5-nitropyridine (2A5NP); p-chlorophenylurea (PCPU); and 4-(N,N-dimethylamino)-3-acetamidonitrobenzene (DAN). Further examples of suitable NLO materials are disclosed in U.S. Pat. No. 6,941,051 at column 4, lines 4-37.

Examples of thermal stabilizers may include a basic nitrogen-containing compound for example, biurea, allantoin or a metal salt thereof, a carboxylic acid hydrazide, e.g., an aliphatic or aromatic carboxylic acid hydrazide, a metal salt of an organic carboxylic acid, an alkali or alkaline earth metal compound, a hydrotalcite, a zeolite and an acidic compound (e.g., a boric acid compound, a nitrogen-containing cyclic compound having a hydroxyl group, a carboxyl group-containing compound, a (poly)phenol, butylated hydroxytoluene, and an aminocarboxylic acid) or mixtures thereof.

Examples of mold release agents include esters of long-chain aliphatic acids and alcohols such as pentaerythritol, guerbet alcohols, long-chain ketones, siloxanes, alpha.-olefin polymers, long-chain alkanes and hydrocarbons having 15 to 600 carbon atoms.

Rheology control agents are thickeners that are typically powders that may be inorganic, such as silica, organic such as microcrystalline cellulose or particulate polymeric materials. Gelators or gelling agents are often organic materials that can also affect the thixotropy of the material in which they are added. Examples of suitable gelators or gelling agents include natural gums, starches, pectins, agar-agar, and gelatins. Gelators or gelling agents may often be based on polysaccharides or proteins.

Free radical scavengers include synthetic pseudopeptides resistant to hydrolysis such as Carcinine hydrochloride; lipoamino acids such as L-lysine lauroylmethionine; plant extracts containing multi-enzymes; natural tocopherol and related compounds as well as compounds containing an active hydrogen such as —OH, —SH, or —NRH group. Further examples of free radical scavengers are chosen from the group of sterically hindered amines (HALS=hindered amine light stabilizer) which, unlike customary light protection agents, are not based on the absorption of the irradiated light or on the quenching of the absorbed light, but essentially on the ability to scavenge or to replace free radicals and hydroperoxides formed during the photodegradation of polymeric materials and antioxidants.

Adhesion promoters include adhesion promoting organosilane materials, such as aminoorganosilane materials, silane coupling agents, organic titanate coupling agents and organic zirconate coupling agents described in U.S. Patent Application Publication 2004/0207809 at paragraphs [0033] to [0042]. Further examples of adhesion promoters include zirco-aluminate adhesion promoting compounds that are commercially available from Rhone-Poulenc. Preparation of aluminum-zirconium complexes is described in the U.S. Pat. Nos. 4,539,048 and 4,539,049. These patents describe zircoaluminate complex reaction products corresponding to the empirical formula: $(Al_2(OR_1O)_a A_b B_c)_x(OC(R_2)O)_Y(ZrA_d B_e)_Z$ wherein X, Y, and Z are at least 1, $R_2$ is an alkyl, alkenyl, aminoalkyl, carboxyalkyl, mercaptoalkyl, or epoxyalkyl group, having from 2 to 17 carbon atoms, and the ratio of X:Z is from about 2:1 to about 5:1. Additional zircoaluminate complexes are described in U.S. Pat. No. 4,650,526.

Examples of dyes that can be present in the at least partial coating according to various embodiments disclosed herein include organic dyes that are capable of imparting a desired color or other optical property to the at least partial coating.

As used herein, the term "alignment promoter" means an additive that can facilitate at least one of the rate and uniformity of the alignment of a material to which it is added. Examples of alignment promoters that can be present in the at least partial coatings according to various embodiments disclosed herein include those described in U.S. Pat. No. 6,338,808 and U.S. Patent Publication No. 2002/0039627.

Examples of kinetic enhancing additives that can be present in the at least partial coating according to various embodiments disclosed herein include epoxy-containing compounds, organic polyols, and/or plasticizers. More specific examples of such kinetic enhancing additives are disclosed in U.S. Pat. No. 6,433,043 and U.S. Patent Publication No. 2003/0045612.

Examples of photoinitiators that can be present in the at least partial coating according to various embodiments disclosed herein include cleavage-type photoinitiators and abstraction-type photoinitiators. Examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Examples of abstraction-type photoinitiators include benzophenone, Michler's ketone, thioxanthone, anthraquinone, camphorquinone, fluorone, ketocoumarin or mixtures of such initiators.

Another example of a photoinitiator that can be present in the LC compositions according to various embodiments disclosed herein is a visible light photoinitiator. Examples of suitable visible light photoinitiators are set forth at column 12, line 11 to column 13, line 21 of U.S. Pat. No. 6,602,603.

Examples of thermal initiators include organic peroxy compounds and azobis(organonitrile) compounds. Specific examples of organic peroxy compounds that are useful as thermal initiators include peroxymonocarbonate esters, such as tertiarybutylperoxy isopropyl carbonate; peroxydicarbonate esters, such as di(2-ethylhexyl)peroxydicarbonate, di(secondary butyl)peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one embodiment the thermal initiators used are those that do not discolor the resulting polymerizate. Examples of azobis(organonitrile) compounds that can be used as thermal initiators include azobis(isobutyronitrile), azobis(2,4-dimethylvaleronitrile) or a mixture thereof.

Examples of polymerization inhibitors include: nitrobenzene, 1,3,5,-trinitrobenzene, p-benzoquinone, chloranil, DPPH, $FeCl_3$, $CuCl_2$, oxygen, sulfur, aniline, phenol, p-dihydroxybenzene, 1,2,3-trihydroxybenzene, and 2,4,6-trimethylphenol.

Examples of solvents that can be present in the LC compositions according to various embodiments disclosed herein include those that will dissolve solid components of the LC compositions, that are compatible with the LC compositions and the elements and substrates, and/or can ensure uniform coverage of a surface(s) to which the LC composition is applied. Potential solvents include the following: propylene glycol monomethyl ether acetate and their derivates (sold as DOWANOL® industrial solvents), acetone, amyl propionate, anisole, benzene, butyl acetate, cyclohexane, dialkyl ethers of ethylene glycol, e.g., diethylene glycol dimethyl ether and their derivates (sold as CELLOSOLVE® industrial solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydrofuran, toluene, xylene, 2-methoxyethyl ether, 3-propylene glycol methyl ether, and mixtures thereof.

In certain embodiments, the LC compositions of the present disclosure may further comprise at least one additional polymeric material. Suitable examples of additional polymeric materials that may be used in conjunction with various embodiments disclosed herein include, for example, homopolymers and copolymers, prepared from the monomers and mixtures of monomers disclosed in U.S. Pat. No.

5,962,617 and in U.S. Pat. No. 5,658,501 from column 15, line 28 to column 16, line 17. For example, such polymeric materials can be thermoplastic or thermoset polymeric materials, can be transparent or optically clear, and can have any refractive index required. Examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly (ethylene glycol)bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co-and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

According to one specific embodiment, the additional polymeric material is chosen from polyacrylates, polymethacrylates, poly($C_1$-$C_{12}$)alkyl methacrylates, polyoxy(alkylene methacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), poly(vinylpyrrolidone), poly((meth)acrylamide), poly(dimethyl acrylamide), poly(hydroxyethyl methacrylate), poly((meth)acrylic acid), thermoplastic polycarbonates, polyesters, polyurethanes, polythiourethanes, poly(ethylene terephthalate), polystyrene, poly(alpha methylstyrene), copoly(styrene-methylmethacrylate), copoly(styrene-acrylonitrile), polyvinylbutyral and polymers of members of the group consisting of polyol(allyl carbonate)monomers, mono-functional acrylate monomers, mono-functional methacrylate monomers, polyfunctional acrylate monomers, polyfunctional methacrylate monomers, diethylene glycol dimethacrylate monomers, diisopropenyl benzene monomers, alkoxylated polyhydric alcohol monomers and diallylidene pentaerythritol monomers.

According to another specific embodiment, the at least one additional polymeric material may be a homopolymer or copolymer of monomer(s) chosen from acrylates, methacrylates, methyl methacrylate, ethylene glycol bis methacrylate, ethoxylated bisphenol A dimethacrylate, vinyl acetate, vinylbutyral, urethane, thiourethane, diethylene glycol bis(allyl carbonate), diethylene glycol dimethacrylate, diisopropenyl benzene, and ethoxylated trimethylol propane triacrylate.

Still other embodiments of the present disclosure provide for optical elements. The optical elements comprise a substrate and an at least partial layer of the LC compositions according to the various embodiments described herein on at least a portion of the substrate. As used herein the term "optical" means pertaining to or associated with light and/or vision. For example according to various embodiments, the optical element or device can be chosen from ophthalmic elements and devices, display elements and devices, windows, mirrors, and active and passive liquid crystal cell elements and devices.

As used herein, the term "liquid crystal cell" refers to a structure containing a liquid crystal material that is capable of being ordered. Active liquid crystal cells are cells wherein the liquid crystal material is capable of being switched between ordered and disordered states or between two ordered states by the application of an external force, such as electric or magnetic fields. Passive liquid crystal cells are cells wherein the liquid crystal material maintains an ordered state. One example of an active liquid crystal cell element or device is a liquid crystal display.

As used herein the term "ophthalmic" means pertaining to or associated with the eye and vision. Examples of ophthalmic elements include corrective and non-corrective lenses, including single vision or multi-vision lenses, which may be either segmented or non-segmented multi-vision lenses (such as bifocal lenses, trifocal lenses and progressive lenses), as well as other elements used to correct, protect, or enhance (cosmetically or otherwise) vision, including contact lenses, intra-ocular lenses, magnifying lenses, and protective lenses or visors; and may also include partially formed lenses and lens blanks. As used herein the term "display" means the visible or machine-readable representation of information in words, numbers, symbols, designs or drawings. Examples of display elements and devices include screens, monitors, and security elements security marks and authentication marks. As used herein the term "window" means an aperture adapted to permit the transmission of radiation therethrough. Examples of windows include automotive and aircraft transparencies, filters, shutters, and optical switches. As used herein the term "mirror" means a surface that specularly reflects a large fraction of incident light.

While dichroic compounds are capable of preferentially absorbing one of two orthogonal components of plane polarized light, it is generally necessary to suitably position or arrange the molecules of a dichroic compound in order to achieve a net linear polarization effect. Similarly, it is generally necessary to suitably position or arrange the molecules of a dichroic or photochromic-dichroic compound to achieve a net linear polarization effect. That is, it is generally necessary to align the molecules of the dichroic or photochromic-dichroic compound such that the long axes of the molecules of the dichroic or photochromic-dichroic compound in an activated state are generally parallel to each other. Therefore, according to various embodiments disclosed herein, the at least one dichroic or photochromic-dichroic compound is at least partially aligned. Further, if the activated state of the dichroic or photochromic-dichroic compound corresponds to a dichroic state of the material, the at least one dichroic or photochromic-dichroic compound can be at least partially aligned such that the long axis of the molecules of the dichroic or photochromic-dichroic compound in the activated state are aligned. As used herein the term "align" means to bring into suitable arrangement or position by interaction with another material, compound or structure.

In certain embodiments, the dichroic compound and/or the photochromic-dichroic compound or other anisotropic material (such as certain embodiments of the mesogen containing compounds described herein) may be at least partially aligned. At least partial alignment of compositions, such as those comprising a dichroic compound, a photochromic-dichroic compound or other anisotropic material, may be effected by at least one of exposing the at least a portion of the composition to a magnetic field, exposing the at least a portion of the composition to a shear force, exposing the at least a portion of the composition to an electric field, exposing the at least a portion of the composition to plane-polarized ultraviolet radiation, exposing the at least a portion of the composition to infrared radiation, drying the at least a portion of the composition, etching the at least a portion of the composition, rubbing the at least a portion of the composition, and aligning the at least a portion of the composition with another structure or material, such as an at least partially ordered alignment medium. It is also possible to align the dichroic compound and/or the photochromic-dichroic compound or other anisotropic material (such as certain embodiments of the mesogen containing compounds described herein) with an oriented surface. That is, liquid crystal molecules can be applied to a surface that has been oriented, for example by rubbing, grooving, or photo-alignment methods, and subsequently aligned such that the long axis of each of the liquid crystal molecules takes on an orientation that is generally parallel to the general direction of orientation of the surface. Examples of liquid crystal materials suitable for use as alignment media according to various embodiments disclosed herein include the mesogen containing compounds or residues thereof, liquid crystal polymers, liquid crystal pre-polymers, liquid crystal monomers, and liquid crystal mesogens. As used herein the term "pre-polymer" means partially polymerized materials.

For example, according to embodiments where the optical element comprises a cured layer which comprises a photochromic compound, or a photochromic-dichroic compound, the coating may be adapted to switch from a first state to a second state in response to at least actinic radiation and further be able to revert back to the first state in response to thermal energy. In other embodiments, the coating may be adapted to linearly polarize at least transmitted radiation in at least one of the first state and the second state. In certain embodiments, the coating may linearly polarize at least transmitted radiation in both the first state and the second state.

As discussed above, one embodiment provides, in part, an optical element comprising an at least partial layer or coating having a first state and a second state connected to at least a portion of at least one surface of a substrate. As used herein the term "coating" means a supported film derived from a flowable composition, which may or may not have a uniform thickness, and specifically excludes polymeric sheets. The layer or coating may be cured after application to the surface of the optical element to form a cured layer or coating. As used herein the term "sheet" means a pre-formed film having a generally uniform thickness and capable of self-support. Further, as used herein the term "connected to" means in direct contact with an object or indirect contact with an object through one or more other structures or materials, at least one of which is in direct contact with the object. Thus, according to various embodiments disclosed herein, the at least partial coating can be in direct contact with at least a portion of the substrate or it can be in indirect contact with at least a portion of the substrate through one or more other structures or materials. For example the at least partial coating can be in contact with one or more other at least partial coatings, polymer sheets or combinations thereof, at least one of which is in direct contact with at least a portion of the substrate.

According to certain embodiments, the at least partial layer may be at least partially aligned. Suitable methods for at least partially aligning the at least partial layer include at least one of exposing the at least a portion of the composition to a magnetic field, exposing the at least a portion of the composition to a shear force, exposing the at least a portion of the composition to an electric field, exposing the at least a portion of the composition to plane-polarized ultraviolet radiation, exposing the at least a portion of the composition to infrared radiation, drying the at least a portion of the composition, etching the at least a portion of the composition, rubbing the at least a portion of the composition, and aligning the at least a portion of the composition with another structure or material, such as an at least partially ordered alignment medium. Suitable alignment methods for layers are described in greater detail in U.S. Pat. No. 7,097,303, at column 27, line 17 to column 28, line 45.

According to certain embodiments of the optical elements described herein, the at least partial layer may be adapted to switch from a first state to a second state in response to at least actinic radiation and to revert back to the first state in response to thermal energy. For example, the at least partial layer comprising a photochromic compound or a photochromic-dichroic compound, may be adapted to switch from a first non-colored or clear state to a second colored state in response to at least actinic radiation and to revert back to the first clear state in response to thermal energy. In other embodiments where the at least partial layer may be adapted to linearly polarize at least transmitted radiation in at least one of the first state and the second state. For example, the at least partial layer may transmit linearly polarized radiation in certain embodiments which comprise a dichroic compound or photochromic-dichroic compound.

According to specific embodiments of the optical elements of the present disclosure, the at least partial layer may comprise a polymer or copolymer comprising the residue of one or more mesogen containing compounds described herein. The at least partial layer comprising a polymer or copolymer comprising the residue of a mesogen containing compound may be a cured at least partial layer. In other embodiments, the at least partial layer may comprise a liquid crystal phase. The liquid crystal phase may be a nematic phase, a smectic phase, a chiral nematic phase, or a discotic phase.

As used herein to modify the term "state," the terms "first" and "second" are not intended to refer to any particular order or chronology, but instead refer to two different conditions or properties. For example the first state and the second state of the coating may differ with respect to at least one optical property, such as the absorption or linearly polarization of visible and/or UV radiation. According to certain embodiments of the ophthalmic elements described herein, the at least partial layer may be adapted to switch from a first state to a second state in response to at least actinic radiation and to revert back to the first state in response to thermal energy. For example, in those embodiments where the at least partial layer comprises a photochromic compound or a photochromic-dichroic compound, the at least partial layer may be adapted to switch from a first non-colored or clear state to a second colored state in response to at least actinic radiation and to revert back to the first clear state in response to thermal energy. Alternatively, the at least partial coating can be adapted to have a first color in the first state and a second color in the second state. In other embodiments where the at least partial layer may be adapted to linearly polarize at least transmitted radiation in at least one of the first state and the second state. For example, the at least partial layer may transmit linearly polarized radiation in certain embodiments which comprise a dichroic compound or photochromic-dichroic compound. In other embodiments, the at least partial layer may comprise a liquid crystal phase. The liquid crystal phase may be a nematic phase, a smectic phase, a chiral nematic phase, or a discotic phase. According to still other embodiments, the at least partial coating having a first state and a second state can be adapted to have a first absorption spectrum in the first state, a second absorption spectrum in the second state, and to be linearly polarizing in both the first and second states.

Still other embodiments of the present disclosure provide for a liquid crystal cell. According to these embodiments, the liquid crystal cell may comprising a first substrate having a first surface; a second substrate having a second surface; and a liquid crystal composition as described herein. Referring still to the liquid crystal cell, the second surface of the second substrate may be opposite and spaced apart from the first surface of the first substrate so as to define a region. The liquid crystal composition may be placed in the region between the first substrate and second substrate. Alternatively, the liquid crystal composition may be incorporated into an at least partial layer on at least one of the first surface of the first substrate, the second surface of the second substrate, or both the first and second surfaces. The liquid crystal cell may be utilized as, for example display elements, including screens, monitors, or security elements.

In other embodiments, the liquid crystal cells may further comprise an at least partial layer connected to at least a portion of a surface of at least one of the first substrate and the second substrate, such as the first surface and/or second surface. The at least partial layer may be a linearly polarizing layer, a circularly polarizing layer, an elliptically polarizing layer, a photochromic layer, a reflective layer, a tinted layer, a retarder layer, and a wide-angle view layer.

According to certain embodiments, the liquid crystal cell may be a pixelated cell. As used herein, the term "pixelated" means that an article, such as a display element or liquid crystal cell may be broken down into a plurality of individual pixels (i.e., single point occupying a specific location within a display, image or cell. In certain embodiments, the liquid crystal cell may be a pixelated cell comprising a plurality of regions or compartments (i.e., pixels). The characteristics of the individual pixels, such as color, polarization and the like, may be controlled relative to the other pixels in the display element, liquid crystal, or article.

According to still other embodiments, the present disclosure provides for articles of manufacture comprising a liquid crystal composition as described herein. Specific articles of manufacture include molded articles, assembled articles and cast articles.

Additionally, the present disclosure also provides methods for forming liquid crystal compositions, optical elements, ophthalmic elements, liquid crystal cells and articles of manufacture, such as those described herein.

For example, according to one embodiment, the present disclosure provides methods for forming an optical element, including an ophthalmic element. The methods comprise the step of formulating a liquid crystal composition; coating at least a portion of a substrate with the liquid crystal composition; at least partially aligning at least a portion of the liquid crystal composition in the coating layer; and curing the liquid crystal coating layer.

Methods of at least partially aligning the at least a portion of the liquid crystal composition in the coating are described herein and in U.S. Pat. No. 7,097,303, at column 27, line 17 to column 28, line 45.

Curing the liquid crystal coating layer may include at least partially polymerizing the liquid crystal composition. Methods for at least partially polymerizing a liquid crystal composition include exposing at least a portion of the liquid crystal composition to at least one of thermal energy (for example to activate a thermal initiator); infrared radiation, ultraviolet radiation, visible radiation, gamma radiation, microwave radiation, electron radiation or combinations thereof so as to initiate the polymerization reaction of the polymerizable components or cross-linking with or without a catalyst or initiator. If desired or required, this can be followed by a heating step. According to certain embodiments, the liquid crystal coating layer may be cured to a specific hardness. For example, in certain embodiments, the liquid crystal coating layer may be cured to have a Fischer microhardness ranging from 0 to 150 Newtons/mm$^2$ that also exhibits good photochromic and/or dichroic response characteristics. In another embodiment, the liquid crystal composition may be cured to a Fischer microhardness less than 60 Newtons/mm$^2$, e.g. from 0 to 59.9 Newtons/mm$^2$, or alternatively from 5 to 25 N/mm$^2$. In still other embodiments, the liquid crystal coating layer may be cured to have a Fischer microhardness ranging from 150 N/mm$^2$ to 250 N/mm$^2$ or alternatively from 150 N/mm$^2$ to 200 N/mm$^2$.

According to specific embodiments, the at least one additive may be adapted to affect a property of the liquid crystal composition, such as adjusting the liquid crystal clear temperature of the liquid crystal composition, lowering a viscosity of the liquid crystal composition, widening a phase temperature for a nematic phase of the liquid crystal composition, stabilizing a phase of the liquid crystal composition or controlling the tilt of the liquid crystal composition.

Specific methods for forming optical elements, such as ophthalmic elements which comprise at least a partial layer comprising a liquid crystal composition as described herein, on at least a portion of a surface of a substrate, are described in detail in U.S. Pat. No. 7,342,112 at column 83, line 16 of column 84, line 10. These disclosed methods include imbibing, coating, overmolding, spin coating, spray coating, spray and spin coating, curtain coating, flow coating, dip coating, injection molding, casting, roll coating, and wire coating.

Generally speaking, substrates that are suitable for use in conjunction with various embodiments disclosed herein include substrates formed from organic materials, inorganic materials, or combinations thereof (for example, composite materials). Specific examples of organic materials that may be used to form the substrates disclosed herein include polymeric materials, such as those discussed in detail above.

Other examples of organic materials suitable for use in forming the substrates according to various embodiments disclosed herein include both synthetic and natural organic materials, including: opaque or translucent polymeric materials, natural and synthetic textiles, and cellulosic materials such as, paper and wood.

Examples of inorganic materials suitable for use in forming the substrates according to various embodiments disclosed herein include glasses, minerals, ceramics, and metals. For example, in one embodiment the substrate can comprise glass. In other embodiments, the substrate can have a reflective surface, for example, a polished ceramic substrate, metal substrate, or mineral substrate. In other embodiments, a reflective coating or layer can be deposited or otherwise applied to a surface of an inorganic or an organic substrate to make it reflective or to enhance its reflectivity.

Further, according to certain embodiments disclosed herein, the substrates may have a protective coating, such as an abrasion-resistant coating, such as a "hard coat," on their exterior surfaces. For example, commercially available thermoplastic polycarbonate ophthalmic lens substrates are often sold with an abrasion-resistant coating already applied to its exterior surfaces because these surfaces tend to be readily scratched, abraded or scuffed. An example of such a lens substrate is the GENTEX™ polycarbonate lens (available from Gentex Optics). Therefore, as used herein the term "substrate" includes a substrate having a protective coating, such as an abrasion-resistant coating, on its surface(s).

Still further, the substrates according to various embodiments disclosed herein can be untinted, tinted, linearly polarizing, circularly polarizing, elliptically polarizing, photochromic, or tinted-photochromic substrates. As used herein with reference to substrates the term "untinted" means substrates that are essentially free of coloring agent additions (such asconventional dyes) and have an absorption spectrum for visible radiation that does not vary significantly in response to actinic radiation. Further, with reference to substrates the term "tinted" means substrates that have a coloring agent addition (such as dyes) and an absorption spectrum for visible radiation that does not vary significantly in response to actinic radiation.

As used herein, the term "linearly polarizing" with reference to substrates refers to substrates that are adapted to linearly polarize radiation (i.e., confine the vibrations of the electric vector of light waves to one direction). As used herein, the term "circularly polarizing" with reference to substrates refers to substrates that are adapted to circularly polarize radiation. As used herein, the term "elliptically polarizing" with reference to substrates refers to substrates that are adapted to elliptically polarize radiation. Further, as used herein, with reference to substrates, the term "tinted-photochromic" means substrates containing a coloring agent addition as well as a photochromic material, and having an absorption spectrum for visible radiation that varies in response to at least actinic radiation. Thus, for example the tinted-photochromic substrate can have a first color characteristic of the coloring agent and a second color characteristic of the combination of the coloring agent the photochromic material when exposed to actinic radiation.

As described herein, in certain embodiments the optical element may be a security element. Examples of security elements include security marks and authentication marks that are connected to at least a portion of a substrate, such as: access cards and passes, e.g., tickets, badges, identification or membership cards, debit cards etc.; negotiable instruments and non-negotiable instruments e.g., drafts, checks, bonds, notes, certificates of deposit, stock certificates, etc.; government documents, e.g., currency, licenses, identification cards, benefit cards, visas, passports, official certificates, deeds etc.; consumer goods, e.g., software, compact discs ("CDs"), digital-video discs ("DVDs"), appliances, consumer electronics, sporting goods, cars, etc.; credit cards; and merchandise tags, labels and packaging.

The security element can be connected to at least a portion of a substrate chosen from a transparent substrate and a reflective substrate. Alternatively, according to certain embodiments wherein a reflective substrate is required, if the substrate is not reflective or sufficiently reflective for the intended application, a reflective material can be first applied to at least a portion of the substrate before the security mark is applied thereto. For example, a reflective aluminum coating can be applied to the at least a portion of the substrate prior to forming the security element thereon. Still further, security element can be connected to at least a portion of a substrate chosen from untinted substrates, tinted substrates, photochromic substrates, tinted-photochromic substrates, linearly polarizing, circularly polarizing substrates, and elliptically polarizing substrates.

Furthermore, security element according to the aforementioned embodiment can further comprise one or more other coatings or sheets to form a multi-layer reflective security element with viewing angle dependent characteristics as described in U.S. Pat. No. 6,641,874.

The optical elements according to various embodiments disclosed herein can further comprise at least one additional at least partial coating that can facilitate bonding, adhering, or wetting of any of the various coatings connected to the substrate of the optical element. For example the optical element can comprise an at least partial primer coating between the at least partial coating having the first state and the second state and a portion of the substrate. Further, the primer coating can serve as a barrier coating to prevent interaction of the coating ingredients with the element or substrate surface and vice versa.

Examples of primer coatings that can be used in conjunction with various embodiments disclosed herein include coatings comprising coupling agents, at least partial hydrolysates of coupling agents, and mixtures thereof. As used herein "coupling agent" means a material having at least one group capable of reacting, binding and/or associating with a group on at least one surface. In one embodiment, a coupling agent can serve as a molecular bridge at the interface of at least two surfaces that can be similar or dissimilar surfaces. Coupling agents, in another embodiment, can be monomers, oligomers, pre-polymers and/or polymers. Such materials include organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed. In addition to coupling agents and/or hydrolysates of coupling agents, the primer coatings can comprise other adhesion enhancing ingredients. For example the primer coating can further comprise an adhesion-enhancing amount of an epoxy-containing material. Adhesion-enhancing amounts of an epoxy-containing material when added to the coupling agent containing coating composition can improve the adhesion of a subsequently applied coating as compared to a coupling agent containing coating composition that is essentially free of the epoxy-containing material. Other examples of primer coatings that are suitable for use in conjunction with the various embodiments disclosed herein include those described U.S. Pat. No. 6,602,603 and U.S. Pat. No. 6,150,430.

The optical elements according to various embodiments disclosed herein can further comprise at least one additional at least partial coating chosen from conventional photochromic coatings, anti-reflective coatings, linearly polarizing coatings, circularly polarizing coatings, elliptically polarizing coatings, transitional coatings, primer coatings (such as those discussed above), and protective coatings connected to at least a portion of the substrate. For example the at least one additional at least partial coating can be over at least a portion of the at least partial coating having the first state and the second state, i.e., as an overcoating; or under at least a portion of the at least partial coating, i.e., as an undercoating. Additionally or alternatively, the at least partial coating having the first state and the second state can be connected at least a portion of a first surface of the substrate and the at least one additional at least partial coating can be connected to at least a portion of a second surface of the substrate, wherein the first surface is opposite the second surface.

Examples of conventional photochromic coatings include coatings comprising any of the conventional photochromic compounds that are discussed in detail below. For example the photochromic coatings can be photochromic polyurethane coatings, such as those described in U.S. Pat. No. 6,187,444; photochromic aminoplast resin coatings, such as those described in U.S. Pat. Nos. 4,756,973, 6,432,544 and 6,506,488; photochromic polysilane coatings, such as those described in U.S. Pat. No. 4,556,605; photochromic poly(meth)acrylate coatings, such as those described in U.S. Pat. Nos. 6,602,603, 6,150,430 and 6,025,026, and WIPO Publication WO 01/02449; polyanhydride photochromic coatings, such as those described in U.S. Pat. No. 6,436,525; photochromic polyacrylamide coatings such as those described in U.S. Pat. No. 6,060,001; photochromic epoxy resin coatings, such as those described in U.S. Pat. Nos. 4,756,973 and 6,268,055; and photochromic poly(urea-urethane) coatings, such as those described in U.S. Pat. No. 6,531,076.

Examples of linearly polarizing coatings include coatings comprising conventional dichroic compounds such as those discussed above.

As used herein the term "transitional coating" means a coating that aids in creating a gradient in properties between two coatings. For example a transitional coating can aid in creating a gradient in hardness between a relatively hard coating and a relatively soft coating. Examples of transitional coatings include radiation-cured acrylate-based thin films.

Examples of protective coatings include abrasion-resistant coatings comprising organo silanes, abrasion-resistant coatings comprising radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. For example the protective coating can comprise a first coating of a radiation-cured acrylate-based thin film and a second coating comprising an organo-silane. Examples of commercial protective coatings products include SILVUE® 124 and HI-GARD® coatings, available from SDC Coatings, Inc. and PPG Industries, Inc., respectively.

According to specific embodiments, the present disclosure provides for mesogen containing compounds having the following structures as disclosed in Table 1.

TABLE 1

Structure of Specific Mesogen Containing Compounds

Structure and name

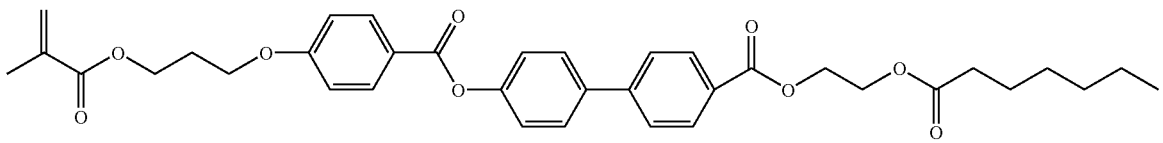

1,12-bis{2-(4-(4-(4-(3-(methacryloyloxy)propyloxy)benzoyloxy)phenyl)benzoyloxy)ethyloxy}
dodecyl-1,12-dione

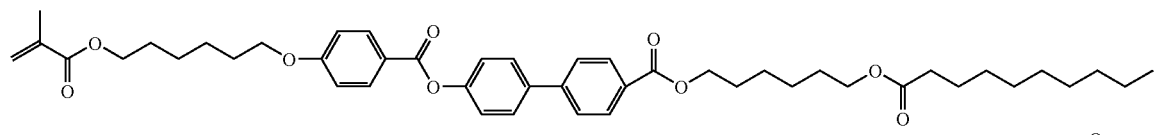

1,12-bis(6-(4-(4-(4-(6-(methacryloyloxy)hexyloxy)benzoyloxy)phenyl)benzoyloxy)hexyloxy)
dodecyl-1,12-dione

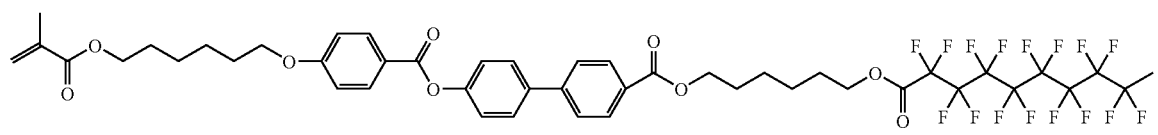

1,10-bis(6-(4-(4-(4-(6-(methacryloyloxy)hexyloxy)benzoyloxy)phenyl)benzoyloxy)hexyloxy)

TABLE 1-continued

Structure of Specific Mesogen Containing Compounds

Structure and name 2,2,3,3,4,4,5,5,6,6,7,7,8,8,9,9-hexadecafluorodecyl-1,10-dione 1,12-bis{6-(4-(4-(6-methacryloyloxyhexyloxy)benzoyloxy)benzoyloxy)hexyloxy)dodecyl-1,12-dione 1-{3-(4-(3-(4-(6-(4(4-(4-(6-methacryloyloxyhexyloxy)benzoyloxy)phenyl)benzoyloxy)hexyloxy)-4-oxobutoyloxy)propyloxy)benzoyloxy)propyloxy}-4-{(6-(4(4-(4-(6-methacryloyloxyhexyloxy)benzoyloxy)phenyl)benzoyloxy)hexyloxy)}butane-1,4-dione 1-{3-(4-(3-(4-(6-(4-(4-(trans-4-propylcyclohexyl)phenoxycarbonyl)phenoxy)hexyloxy)-4-oxobutanoyloxy)propyloxy)benzoyloxy)propyloxy}-4-{6-(4-(4-(trans-4-propylcyclohexyl)phenoxycarbonyl)phenoxy)hexyloxy)butane-1,4-dione n ~ 2.2
2,2'-bis (6-(6-(4-(4-(trans-4-propylcyclohexyl)phenoxycarbonyl)phenoxy)hexanoyloxy)-6-hexanoyloxy)diethylether TABLE 1-continued Structure of Specific Mesogen Containing Compounds Structure and name Mn = 860, n ~ 6

1-{6-(6-(6-(6-(6-(6-(6-(4-(6-(4-(4-(4-nonylbenzoyloxy)phenoxycarbonyl)phenoxy)hexyloxy)-4-oxobutanoyloxy)hexyloxy)-6-carbonyloxyhexyloxy)-6-carbonyloxyhexyloxy)-6-carbonyloxyhexyloxy)-6-carbonyloxyhexyloxy)-6-carbonyloxyhexyloxy}-4-{6-(4-(6-(4-(4-nonylbenzoyloxy)phenoxycarbonyl)phenoxy) hexyloxy}butane-1,4-dione 2,5-bis(4-(12-hydroxydodecyloxy)benzoyloxy))toluene 2,5-bis(4-(12-tetrahydro-2H-pyran-2-yloxydodecyloxy)benzoyloxy)toluene 2-(6-(4-(4-(6-(tetrahydro-2H-pyran-2-yloxy)hexyloxy)benzoyloxy)phenoxy)hexyloxy)tetrahydro-2H-pyran (1R,4R)-bis(4-(6-(tetrahydro-2H-pyran-2-yloxy)hexyloxy)phenyl) cyclohexane-1,4-dicarboxylate 2-(6-(4-(4-(6-(tetrahydro-2H-pyran-2-yloxy)dodecyloxy)benzoyloxy)phenoxy)hexyloxy)tetrahydro-2H-pyran

TABLE 1-continued

Structure of Specific Mesogen Containing Compounds

Structure and name 6-(4-(4-(12-hydroxydodecyloxy)benzoyloxy)phenoxy)hexan-1-ol 2-(5-(trans-4-(4-(6-(tetrahydro-2H-pyran-2-yloxy)hexyloxy)cyclohexyl)benzyloxy)pentyloxy)
tetrahydro-2H-pyran 6-(tetrahydro-2H-pyran-2-yloxy)hexyl 2,5-bis(6-(3-(6-(4-(4-(trans-4-pentylcyclohexyl)
phenoxycarbonyl)phenoxy)hexyloxycarbonyl)propionoyloxy)hexyloxy)benzoate 2,5-bis{6-(4-(6-(4-(trans-4-propylcyclohexyl)phenoxy)hexyloxy)-4-oxobutoyloxy)hexyloxy}-1-(6-
(tetrahydro-2H-pyran-2-yloxy)hexyl)benzoate TABLE 1-continued
Structure of Specific Mesogen Containing Compounds
Structure and name
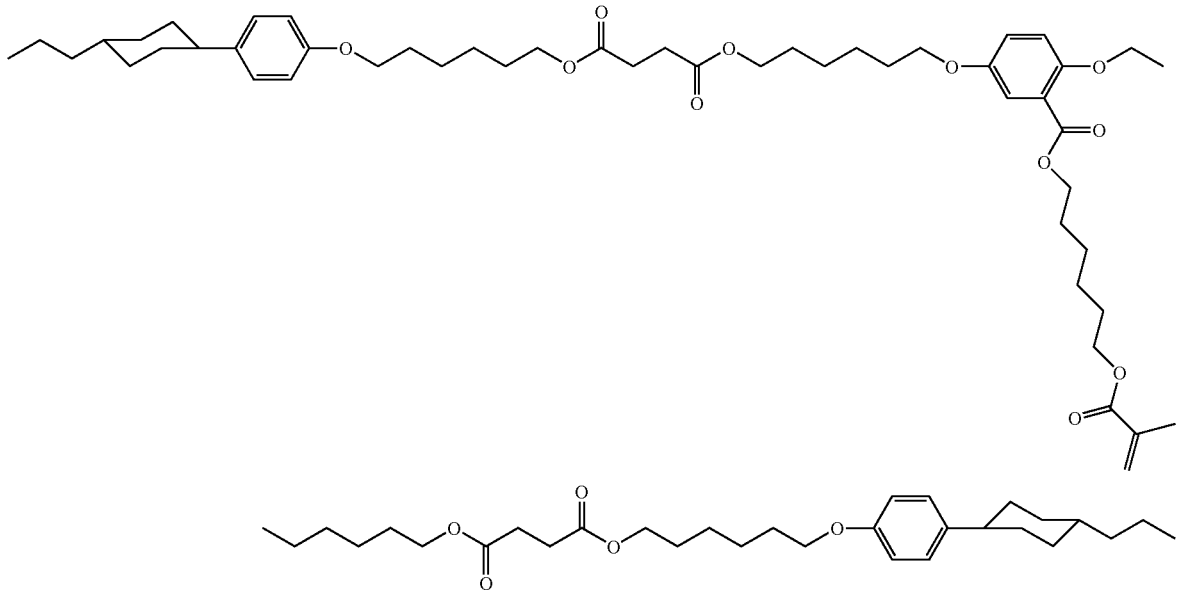
2,5-bis{6-(4-(6-(4-(trans-4-propylcyclohexyl)phenoxy)hexyloxy)-4-oxobutoyloxy)hexyloxy}-1-(6-methacryloyloxyhexyl)benzoate
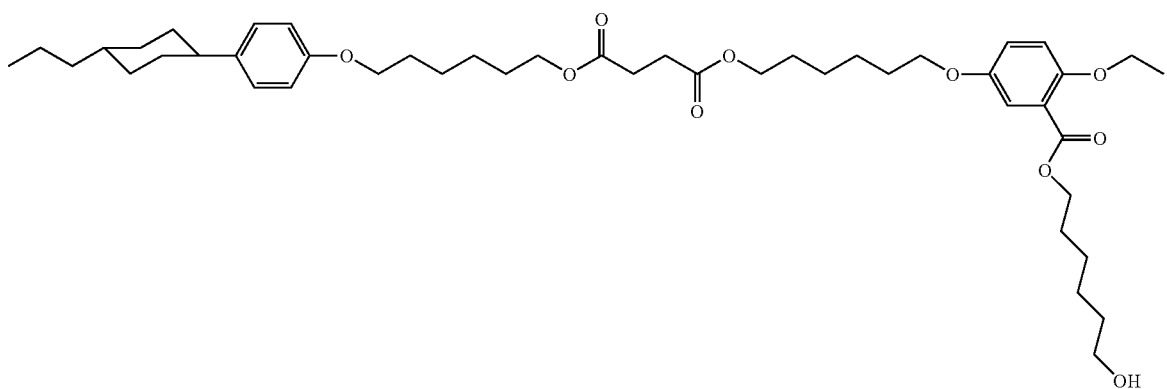
2,5-bis{6-(4-(6-(4-(trans-4-propylcyclohexyl)phenoxy)hexyloxy)-4-oxobutoyloxy)hexyloxy}-1-(6-hydroxyhexyl)benzoate
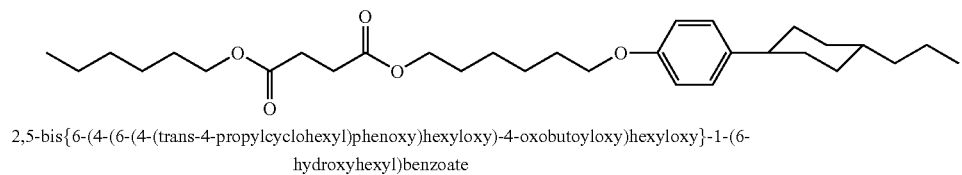
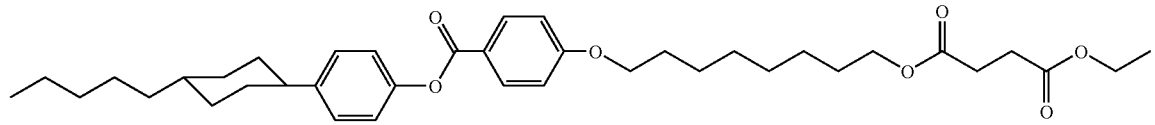

TABLE 1-continued

Structure of Specific Mesogen Containing Compounds

Structure and name 6-(tetrahydro-2H-pyran-2-yloxy)hexyl 2,5-bis(8-(3-(8-(4-(4-(trans-4-pentylcyclohexyl)
phenoxylcarbonyl)phenoxy)octyloxycarbonyl)propionyloxy)octyloxy)benzoate 6-hydroxyhexyl 2,5-bis(8-(3-(8-(4-(4-(trans-4-pentylcyclohexyl)phenoxylcarbonyl)phenoxy)
octyloxycarbonyl)propionyloxy)octyloxy)benzoate TABLE 1-continued Structure of Specific Mesogen Containing Compounds Structure and name

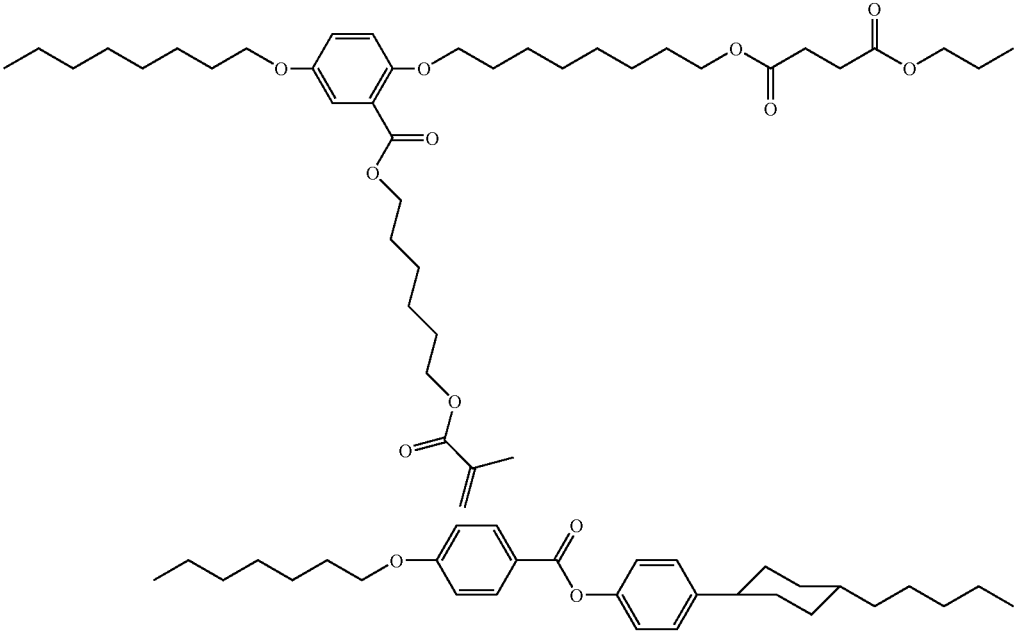

6-methacryloyloxyhexyl 2,5-bis(8-(3-(8-(4-(4-(trans-4-pentylcyclohexyl)phenoxylcarbonyl)
phenoxy)octyloxycarbonyl)propionyloxy)octyloxy)benzoate

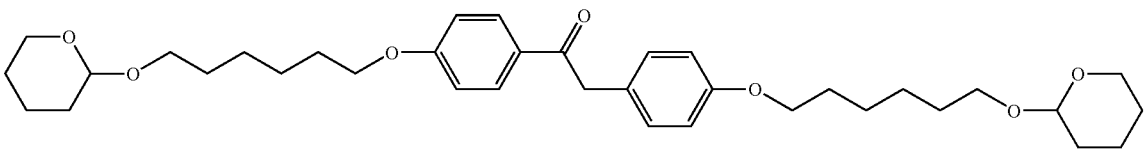

1,2-bis(4-(6-(tetrahydro-2H-pyran-2-yloxy)hexyloxy)phenyl)ethanone

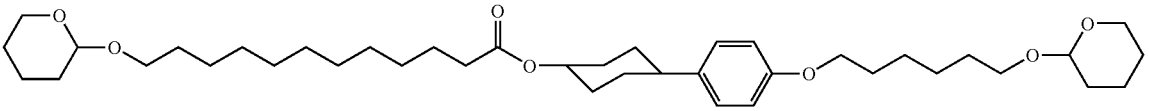

2-(6-(4-(trans-4-(12-(1-tetrahydro-2H-pyran-2-yloxy)dodecanoyloxy)cyclohexyl)phenoxy)
hexyloxy)tetrahydro-2H-pyran

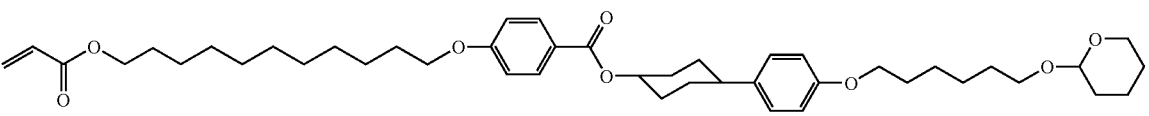

1-(11-(4-(trans-4-(4-(6-(1-(tetrahydro-2H-pyran-2-yloxy)hexyloxy)phenyl)
cyclohexyloxycarbonyl)phenoxy)undecanoxy)prop-2-en-1-one

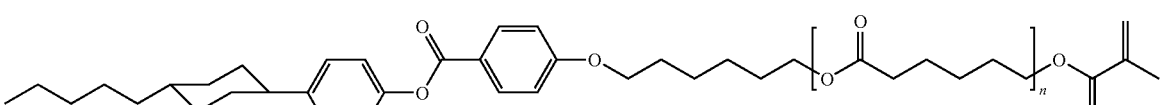

n ~ 6.5
1-(6-(6-(6-(6-(6-(6-(4-(trans-4-pentylcyclohexyl)phenoxycarbonyl)phenoxy)hexyloxy)-6-
oxohexyloxy)-6-oxohexyloxy)-6-oxohexyloxy)-6-oxohexyloxy)-6-oxohexyloxy)-6-oxohexyloxy)-2-
methylprop-2-en-1-one TABLE 1-continued Structure of Specific Mesogen Containing Compounds Structure and name n ~ 3.1
1-(6-(6-(6-(6-(4-(4-(trans-4-pentylcyclohexyl)phenoxy)hexyloxy)-6-oxohexyloxy)-6-oxohexyloxy)-6-
oxohexyloxy)-2-methylprop-2-en-1-one n ~ 23.1
1-(6-(6-(6-(6-(6-(6-(6-(6-(6-(6-(6-(6-(6-(6-(6-(6-(6-(6-(6-(6-(6-(6-(4-(4-(trans-4-
pentylcyclohexyl)phenoxycarbonyl)phenoxy)hexyloxy)-6-oxohexyloxy)-6-oxohexyloxy)-6-
oxohexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-6-oxohexanol 1,2-bis(4-(6-(tetrahydro-2H-pyran-2-yloxy)hexyloxy)phenyl)ethane 2-(6-(trans-4-(4-(12-(tetrahydro-2H-pyran-2-yloxy)dodecanoyloxy)cyclohexyl)phenoxy)-12-
oxododecanoxy)tetrahydro-2H-pyran n ~ 7.5
1-(6-(6-(6-(6-(6-(6-(6-(6-(4-(4-(trans-4-pentylcyclohexyl)phenoxycarbonyl)phenoxy)hexyloxy)-6-
oxohexyloxy)-6-oxohexyloxy)-6-oxohexyloxy)-6-oxohexyloxy)-6-oxohexyloxy)-6-oxohexyloxy)-6-
oxohexyloxy)-2-methylprop-2-en-1-one n ~ 4.5
1-(5-(5-(5-(5-(6-(4-(4-(trans-4-pentylcyclohexyl)phenoxycarbonyl)phenoxy)hexyloxy)-5-
oxopentyloxy)-5-oxopentyloxy)-5-oxopentyloxy)-5-oxopentyloxy)-2-methylprop-2-en-1-one n ~ 2.3
1-(6-(6-(6-(6-(4-(4-(trans-4-pentylcyclohexyl)phenoxycarbonyl)phenoxy)hexyloxy)-6-oxohexyloxy)-
6-oxohexyloxy)-6-oxohexyloxy)-2-methylprop-2-en-1-one TABLE 1-continued Structure of Specific Mesogen Containing Compounds Structure and name n ~ 11.0

1-(6-(6-(6-(6-(6-(6-(6-(6-(6-(6-(6-(4-(4-(trans-4-pentylcyclohexyl)phenoxycarbonyl)phenoxy)
hexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexyloxy)-6-oxohexyloxy)-2-
methylprop-2-en-1-one n ~ 15.0

1-(6-(6-(6-(6-(6-(6-(6-(6-(6-(6-(6-(6-(6-(6-(6-(4-(4-(trans-4-pentylcyclohexyl)phenoxycarbonyl)
phenoxy)hexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexyloxy)-6-oxohexyloxy)-2-methylprop-2-en-
1-one m + n ~ 8.0

1-(6-(5-(5-(6-(5-(6-(5-(6-(6-(4-(4-(trans-4-pentylcyclohexyl)phenoxycarbonyl)phenoxy)hexyloxy)-6-
oxohexyloxy)-5-oxopentyloxy)-6-oxohexyloxy)-5-oxopentyloxy)-6-oxohexyloxy)-5-oxopentyloxy)-5-
oxopentyloxy)-6-oxohexyloxy)-2-methylprop-2-en-1-one m + n ~ 3

1-(6-(5-(6-(6-(4-(4-(trans-4-pentylcyclohexyl)phenoxycarbonyl)phenoxy)hexyloxy)-6-oxohexyloxy)-
5-oxopentyloxy)-6-oxohexyloxy)-2-methylprop-2-en-1-one n ~ 3.0

1-(6-(6-(6-(6-(4-(4-(trans-4-pentylcyclohexyl)phenoxycarbonyl)phenoxy)hexyloxy)-6-oxohexyloxy)-
6-oxohexyloxy)-6-oxohexyloxy)-2-methylprop-2-en-1-one n ~ 8

1-(6-(6-(6-(6-(6-(6-(6-(6-(6-(6-(4-(4-(trans-4-pentylcyclohexyl)phenyl)phenoxy)hexyloxy)-6-
oxohexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-2-methylprop-2-en-1-one TABLE 1-continued Structure of Specific Mesogen Containing Compounds Structure and name n ~ 8

1-(6-(6-(6-(6-(6-(6-(6-(6-(6-(6-(4-(4-(trans-4-pentylcyclohexyl)phenyloxycarbonyl)phenoxy)
hexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-2-methylprop-2-en-1-one n ~ 8

1-(6-(6-(6-(6-(6-(6-(6-(6-(6-(6-(4-(4-(trans-4-propylcyclohexyl)phenyloxy)hexanoyl)hexanoyl)
hexanoyl)hexanoyl)hexanoyl)hexanoyl)hexanoyloxy)-prop-2-ene 1-{3-(3-methacryloyloxy-2,2-dimethylpropyloxy)-3-oxo-2-methylpropyl}-3-{(8-(4-(trans-4-(trans-4-
pentylcyclohexyl)cyclohexyloxycarbonyl)phenoxy)octyloxycarbonyl) ethyl)}-
hexamethylenetrisiloxane 2,5-bis(4-(8-hydroxyoctyloxy)benzoyloxy)toluene 2,5-bis(4-(8-(6-hydroxyhexyloyloxy)octyloxy)benzoyloxy)toluene n ~ 7

1-(6-(6-(6-(6-(6-(6-(6-(8-(4-(4-(4-hexyloxybenzoyloxy)phenoxycarbonyl)phenoxy)octyloxy)-6-
oxohexyloxy)-6-oxohexyloxy)-6-oxohexyloxy)-6-oxohexyloxy)-6-oxohexyloxy)-6-oxohexyloxy)-6-
oxohexyloxy)-2-methylprop-2-en-1-one TABLE 1-continued Structure of Specific Mesogen Containing Compounds Structure and name n ~ 3.0
1-(6-(6-(6-(8-(4-(4-(4-hexyloxybenzoyloxy)phenoxycarbonyl)phenoxy)octyloxy)-6-oxohexyloxy)-6-
oxohexyloxy)-6-oxohexyloxy)-2-methylprop-2-en-1-one n ~ 1.5
4-{4-(6-(6-(6-hydroxyhexanoyloxy)hexanoyloxy)hexyloxy)benzoyloxy}-3-methoxy-1-ethyl
cinnamate n ~ 9.0
1-(6-(6-(6-(6-(6-(6-(6-(6-(6-(6-(4-(4-(trans-4-pentylcyclohexyl)phenyloxycarbonyl)phenoxy)
hexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexyloxy)-2-methylprop-2-en-1-one n ~ 1.8
1-(6-(6-(6-(4-(4-(trans-4-pentylcyclohexyl)phenyloxycarbonyl)phenoxy)hexyloxy)-6-oxohexyloxy)-
6-oxohexyloxy)-2-methylprop-2-en-1-one n ~ 9.6
1-(6-(6-(6-(6-(6-(6-(6-(6-(6-(6-(6-(trans-4-(4-(4-hexyloxybenzoyloxy) phenoxycarbonyl)
cyclohexyloxy)hexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexyloxy)-6-oxohexyloxy)-2-
methylprop-2-en-1-one n ~ 3.2
1-(6-(6-(6-(6-(trans-4-(4-(4-hexyloxybenzoyloxy)phenoxycarbonyl)cyclohexyloxy)hexyloxy)-6-
oxohexyloxy)-6-oxohexyloxy)-6-oxohexyloxy)-2-methylprop-2-en-1-one TABLE 1-continued Structure of Specific Mesogen Containing Compounds Structure and name

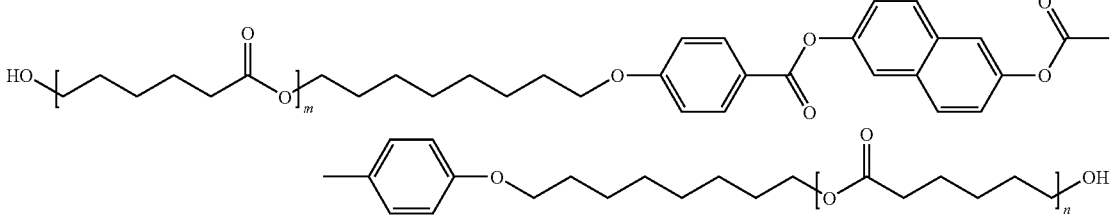

m + n ~ 5.0
2,8-di{4-(6-(6-(6-(6-(6-hydroxyhexanoyloxy)hexanoyloxy)hexanoyloxy)hexanoyloxy)
hexanoyloxy)benzoyloxy}naphthalene

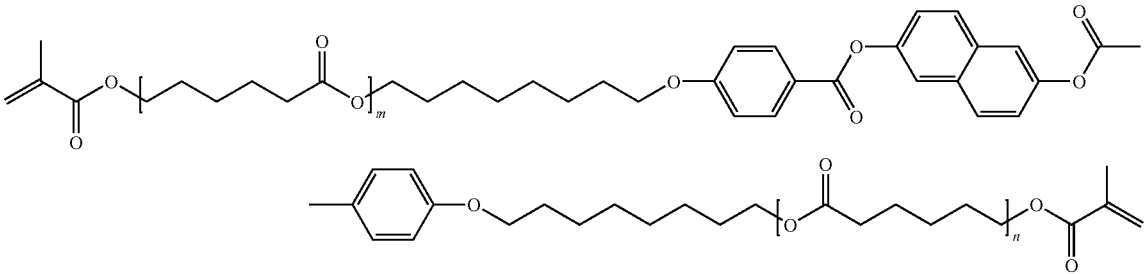

m + n ~ 5.0
2,8-di{4-(6-(6-(6-(6-(6-(methacryloyloxy)hexanoyloxy)hexanoyloxy)hexanoyloxy)hexanoyloxy)
hexanoyloxy)benzoyloxy}naphthalene

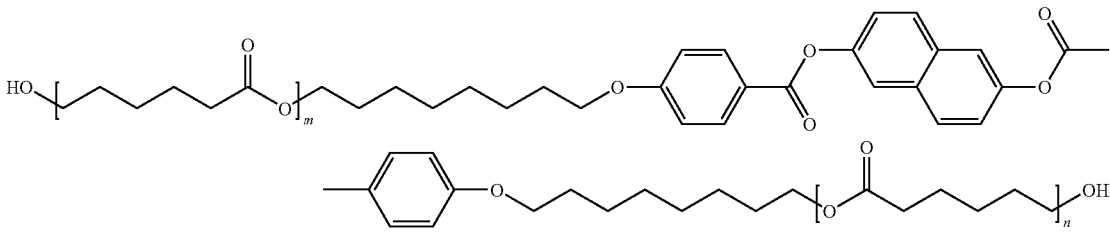

m + n ~ 3.0
2,8-di{4-(6-(6-(6-(6-hydroxyhexanoyloxy)hexanoyloxy)hexanoyloxy)hexanoyloxy)
benzoyloxy}naphthalene

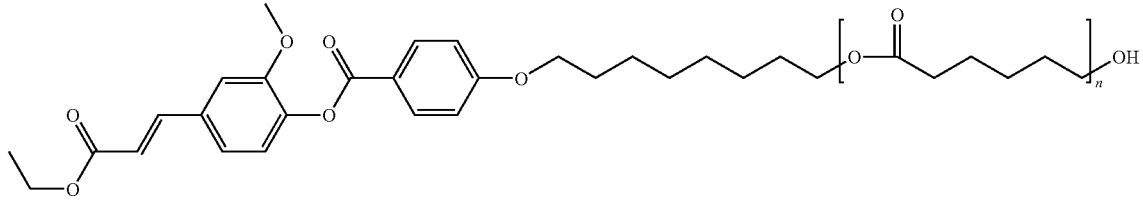

n ~ 1.5
4-{4-(6-(6-(6-hydroxyhexanoyloxy)hexanoyloxyl)octyloxy)benzoyloxy}-3-methoxy-1-ethyl
cinnamate

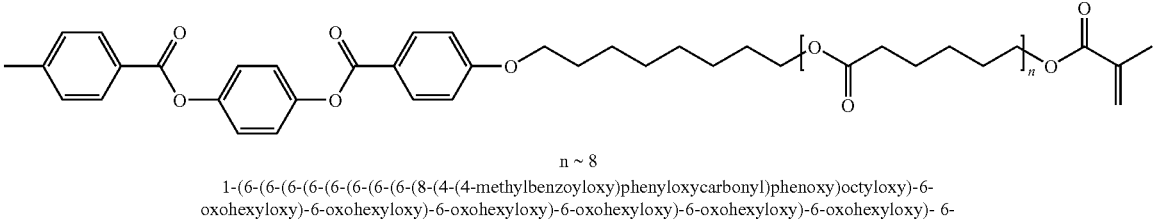

n ~ 8
1-(6-(6-(6-(6-(6-(6-(6-(8-(4-(4-methylbenzoyloxy)phenyloxycarbonyl)phenoxy)octyloxy)-6-
oxohexyloxy)-6-oxohexyloxy)-6-oxohexyloxy)-6-oxohexyloxy)-6-oxohexyloxy)-6-oxohexyloxy)- 6-
oxohexyloxy)-6-oxohexyloxy)-2-methylprop-2-en-1-one TABLE 1-continued Structure of Specific Mesogen Containing Compounds Structure and name n ~ 3
1-(6-(6-(6-(6-(8-(4-(4-methylbenzoyloxy)phenyloxycarbonyl)phenoxy)octyloxy)-6-oxohexyloxy)-6-oxohexyloxy)-6-oxohexyloxy)-2-methylprop-2-en-1-one 4,4'-bis(4-(8-(tetrahydro-2H-pyran-2-yloxy)octyloxy)benzoyloxy)biphenyl 1-(6-(4-(4-(trans-4-(6-hydroxyhexyloxy)cyclohexyl)phenyloxycarbonyl)phenyloxy)hexyloxy) prop-2-en-1-one n ~ 3.3
1-(6-(6-(6-(6-(trans-4-(4-(4-methylbenzoyloxy) phenyl)cyclohexyloxy)hexyloxy)-6-oxohexyloxy)-6-oxohexyloxy)-6-oxohexyloxy)-2-methylprop-2-en-1-one.

4,4'-bis(4-(8-hydroxyoctyloxy)benzoyloxy)biphenyl n ~ 3.5
1-(6-(6-(6-(6-(trans-4-(4-(4-(6-acryloyloxyhexyloxy)benzoyloxy)phenyl)cyclohexyloxy) hexyloxy)-6-oxohexyloxy)-6-oxohexyloxy)-6-oxohexyloxy)-2-methylprop-2-en-1-one n ~ 5.0
1-(6-(6-(6-(6-(6-(trans-4-(4-(4-(6-acryloyloxyhexyloxy)benzoyloxy)phenyl)cyclohexyloxy) hexyloxy)-6-oxohexyloxy)-6-oxohexyloxy)-6-oxohexyloxy)-6-oxohexyloxy)-6-oxohexyloxy) pentan-1-one 2-(8-(4-(4-(4-(6-acryloyloxy)hexyloxy)benzoyloxy)phenyl)phenyloxycarbonyl)phenoxy)octyloxy)tetrahydro-2H-pyran TABLE 1-continued Structure of Specific Mesogen Containing Compounds Structure and name 8-(4-(4-(4-(4-(6-acryloyloxy)hexyloxy)benzoyloxy)phenyl)phenyloxycarbonyl)phenoxy)octan-1-ol m + n ~ 9.7
1,4-bis{(6-(6-(6-(6-(6-(6-(trans-4-(4-(6-acryloyloxyhexyloxy)benzoyloxy)phenyl)cyclohexyloxy)
hexyloxy)-6-oxohexyloxy)-6-oxohexyloxy)-6-oxohexyloxy)-6-oxohexyloxy)-6-oxohexyloxy}butan-
1,4-diane n ~ 2.1
1-(6-(6-(6-(4-(4-(4-(6-acryloyloxyhexyloxy)benzoyloxy)phenyl)phenyloxy)octyloxy)-6-
oxohexyloxy)-6-oxohexyloxy)-2-methylprop-2-en-1-one m + n ~ 7.2
1,4-bis{(6-(6-(6-(6-(4-(4-(4-(6-acryloyloxyhexyloxy)benzoyloxy)phenyl)
phenyloxycarbonyl)phenyloxy)hexyloxy)-6-oxohexyloxy)-6-oxohexyloxy)-6-oxohexyloxy)-6-
oxohexyloxy}butan-1,4-dione each n ~ 1
1-(6-(8-(4-(4-(4-(8-(6-methacryloyloxy)hexyloyloxy)octyloxy)benzoyloxy)phenyl)
phenyloxycarbonyl)phenyloxy)octyloxy)-6-oxohexyloxy)-2-methylprop-2-en-1-one TABLE 1-continued Structure of Specific Mesogen Containing Compounds Structure and name n ~ 8.15
1-(6-(6-(6-(6-(6-(6-(6-(6-(6-(4-(4-(trans-4-pentylcyclohexyl)phenyloxycarbonyl)phenoxy)
hexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-2-methylprop-2-en-1-one n ~ 3.15
1-(6-(6-(6-(6-(4-(4-(trans-4-pentylcyclohexyl)phenyloxycarbonyl)phenoxy)hexyloxy)-6-
oxohexyloxy)-6-oxohexyloxy)-6-oxohexyloxy)-2-methylprop-2-en-1-one n ~ 11
1-(6-(6-(6-(6-(6-(6-(6-(6-(6-(6-(6-(6-(4-(4-(trans-4-pentylcyclohexyl)phenyloxycarbonyl)
phenoxy)hexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexyloxy)-6-oxohexyloxy)-6-
oxohexyloxy)-2-methylprop-2-en-1-one n ~ 6
1-(6-(6-(6-(6-(6-(6-(6-(4-(4-(trans-4-pentylcyclohexyl)phenyloxycarbonyl)phenoxy)hexyloxy)-6-
oxohexyloxy)-6-oxohexyloxy)-6-oxohexyloxy)-6-oxohexyloxy)-6-oxohexyloxy)-6-oxohexyloxy)-2-
methylprop-2-en-1-one n ~ 1.28
1-(6-(6-(8-(4-(4-methylbenzoyloxy)phenyloxycarbonyl)phenoxy)octyloxy)-6-oxohexyloxy)-2-
methylprop-2-en-1-one.

n ~ 6.4
1-(5-(5-(5-(5-(5-(5-(6-(4-(4-(trans-4-propylcyclohexyl)phenyloxycarbonyl)phenoxy)hexyloxy)-5-
oxopentyloxy)-5-oxopentyloxy)-5-oxopentyloxy)-5-oxopentyloxy)-5-oxopentyloxy)-5-oxopentyloxy)-
2-methylprop-2-en-1-one

TABLE 1-continued

Structure of Specific Mesogen Containing Compounds

Structure and name m + n ~ 7.1

1-(5-(5-(6-(5-(6-(5-(6-(6-(4-(4-(trans-4-propylcyclohexyl)phenoxycarbonyl)phenoxy)hexyloxy)-6-oxohexyloxy)-5-oxopentyloxy)-6-oxohexyloxy)-5-oxopentyloxy)-6-oxohexyloxy)-5-oxopentyloxy)-5-oxopentyloxy)-2-methylprop-2-en-1-one each n ~ 1.0

1-(6-(8-(4-(4-(4-(8-(6-methacryloyloxy)hexyloyloxy)octyloxy)benzoyloxy)phenyl)phenyloxycarbonyl)phenyloxy)octyloxy)-6-oxohexyloxy)-2-methylprop-2-en-1-one 1-(11-(4-(4-(4-(6-(11-(tetrahydro-2H-pyran-2-yloxy)undecanyloxy)benzoyloxy)phenoxycarbonyl)phenoxy)hexyloxy)prop-2-en-1-one 1,4-bis(4-(11-(tetrahydro-2H-pyran-2-yloxy)undecanyloxy)benzoyloxy)benzene n ~ 2.1

1-(6-(6-(6-(4-(trans-4-pentylcyclohexyl)phenoxycarbonyl)phenoxy)hexyloxy)-6-oxohexyloxy)-6-oxohexyloxy)-2-methylprop-2-en-1-one n ~ 1.7

1-(6-(6-(6-(4-(4-benzoyloxyphenoxycarbonyl)phenoxy)hexyloxy)-6-oxohexyloxy)-6-oxohexyloxy)prop-2-en-1-one TABLE 1-continued Structure of Specific Mesogen Containing Compounds Structure and name n ~ 7
1-(6-(6-(6-(6-(6-(6-(6-(6-(4-(4-benzoyloxyphenoxycarbonyl)phenoxy)hexyloxy)-6-oxohexyloxy)-6-
oxohexyloxy)-6-oxohexyloxy)-6-oxohexyloxy)-6-oxohexyloxy)-6-oxohexyloxy)-6-oxohexyloxy)prop-
2-en-1-one n ~ 1.7
1-(3-(3-(6-(4-(trans-4-propylcyclohexyl)phenoxycarbonyl)phenoxy)hexyloxy)-3-
carbonyloxypropyloxy)-3-carbonyloxypropyloxy)-2-methylprop-2-en-1-one n ~ 3.5
1-(3-(3-(3-(3-(6-(4-(trans-4-propylcyclohexyl)phenoxycarbonyl)phenoxy)hexyloxy)-3-
carbonyloxypropyloxy)-3-carbonyloxypropyloxy)-3-carbonyloxypropyloxy)-3-carbonyloxypropyloxy)-
2-methylprop-2-en-1-one n ~ 2.0
1-(6-(6-(6-(4-(trans-4-propylcyclohexyl)phenoxycarbonyl)phenoxy)hexyloxy)-6-oxohexyloxy)-6-
oxohexyloxo)-2-methylprop-2-en-1-one n ~ 7.7
1-(6-(6-(6-(6-(6-(6-(6-(6-(8-(4-(4-(4-methylbenzoyloxy)phenyloxycarbonyl)phenoxy)octyloxy)-6-
oxohexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-2-methylprop-2-en-1-one.

n ~ 1
1-(5-(6-(4-(trans-4-propylcyclohexyl)phenoxycarbonyl)phenoxy)hexyloxy)-5-oxopentyloxy)-2-
methylprop-2-en-1-one TABLE 1-continued Structure of Specific Mesogen Containing Compounds Structure and name n ~ 1.0
1-(5-(6-(4-(4-(4-methylbenzoyloxy)phenyloxycarbonyl)phenoxy)hexyloxy)-5-oxopentyloxy)-2-methylprop-2-en-1-one n ~ 8.1
1-(5-(5-(5-(5-(5-(5-(5-(5-(6-(4-(4-(4-methylbenzoyloxy)phenyloxycarbonyl)phenoxy)hexyloxy)-5-oxopentyloxy)-5-oxopentyloxy)-5-oxopentyloxy)-5-oxopentyloxy)-5-oxopentyloxy)-5-oxopentyloxy)-5-oxopentyloxy)-2-methylprop-2-en-1-one 2-(6-(4-(4-(4-(6-acryloyloxy)hexyloxy)benzoyloxy)phenyloxycarbonyl)phenoxy)hexan-1-ol n ~ 7
1-(6-(6-(6-(6-(6-(6-(6-(8-(4-(4-(4-methylbenzoyloxy)phenyloxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one n ~ 8.7
1-(5-(5-(5-(5-(5-(5-(5-(5-(6-(4-(4-(4-methylbenzoyloxy)phenyloxycarbonyl)phenoxy) hexyloxy)-5-oxopentyloxy)-5-oxopentyloxy)-5-oxopentyloxy)-5-oxopentyloxy)-5-oxopentyloxy)-5-oxopentyloxy)-5-oxopentyloxy)-2-methylprop-2-en-1-one n ~ 8.3
1-(6-(6-(6-(6-(6-(6-(6-(6-(8-(4-(4-(4-methylbenzoyloxy)phenyloxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-1-carbonylaminoethyloxy)-2-methylprop-2-en-1-one n ~ 8
1-(6-(6-(6-(6-(6-(6-(6-(6-(6-(4-(4-(6-acryloyloxyhexyloxy)benzoyloxy)phenyloxycarbonyl)phenyloxy)hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one TABLE 1-continued Structure of Specific Mesogen Containing Compounds Structure and name n ~ 3

1-(6-(6-(6-(6-(4-(4-(4-(6-acryloyloxyhexyloxy)benzoyloxy)phenyloxycarbonyl)phenyloxy) hexyloxy)-6-oxohexyloxy)-6-oxohexyloxy)-6-oxohexyloxy)-2-methylprop-2-en-1-one n ~ 1.3

1-(5-(5-(5-(5-(5-(6-(4-(4-(4-(6-acryloyloxyhexyloxy)benzoyloxy)phenyloxycarbonyl)phenyloxy) hexyloxy)-5-oxopentyloxy)-5-oxopentyloxy)-5-oxopentyloxy)-5-oxopentyloxy)-5-oxopentyloxy)-2-methylprop-2-en-1-one 2-(6-(4-(4-(4-(6-acryloyloxy)hexyloxy)benzoyloxy)phenyloxycarbonyl)phenoxy)undecan-1-ol n ~ 2.8

1-(6-(6-(6-(11-(4-(4-(4-(6-acryloyloxyhexyloxy)benzoyloxy)phenyl)phenyloxycarbonyl)phenyloxy)undecanyloxy)-6-oxohexyloxy)-6-oxohexyloxy)-6-oxohexyloxy)-2-methylprop-2-en-1-one n ~ 2.9

1-(6-(6-(6-(6-(6-(6-(6-(8-(4-(4-(4-methoxybenzoyloxy)phenyloxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one n ~ 10

1-(6-(6-(6-(6-(6-(6-(6-(6-(6-(6-(trans-4-(4-(4-methylbenzoyloxy) phenyl)cyclohexyloxy) hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)prop-2-en-1-one.

TABLE 1-continued

Structure of Specific Mesogen Containing Compounds

Structure and name n ~ 2
1-(6-(6-(6-(trans-4-(4-(4-methylbenzoyloxy)phenyl)cyclohexyloxy)hexyloxy)-6-oxohexyloxy)-6-oxohexyloxy)prop-2-en-1-one n ~ 20
1-(6-(6-(6-(6-(6-(6-(6-(6-(6-(6-(6-(6-(6-(6-(6-(6-(6-(6-(6-(6-(trans-4-(4-(4-methylbenzoyloxy)
phenyl)cyclohexyloxy)hexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexyloxy)prop-2-en-1-one n ~ 9.0
1-(6-(6-(6-(6-(6-(6-(6-(6-(6-(4-(4-(4-ethoxyphenoxycarbonyl)phenyloxycarbonyl)phenoxy)
hexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexyloxy)-2-methylprop-2-en-1-one n ~ 3
1-(6-(6-(6-(6-(4-(4-(4-ethoxyphenoxycarbonyl)phenyloxycarbonyl)phenoxy)hexyloxy)-6-
oxohexyloxy)-6-oxohexyloxy)-6-oxohexyloxy)-2-methylprop-2-en-1-one n ~ 10
1-(6-(6-(6-(6-(6-(6-(6-(6-(6-(6-(4-(4-phenylphenoxycarbonyl)phenoxy)hexyloxy)-6-oxohexyloxy)-
6-oxohexyloxy)-6-oxohexyloxy)-6-oxohexyloxy)-6-oxohexyloxy)-6-oxohexyloxy)-6-oxohexyloxy)-6-
oxohexyloxy)-6-oxohexyloxy)-6-oxohexyloxy)prop-2-en-1-one n ~ 2
1-(6-(6-(6-(4-(4-phenylphenoxycarbonyl)phenoxy)hexyloxy)-6-oxohexyloxy)-6-oxohexyloxy)prop-2-
en-1-one

TABLE 1-continued

Structure of Specific Mesogen Containing Compounds

Structure and name n ~ 2

1-(6-(6-(6-(trans-4-(4-(4-phenylphenoxycarbonyl)phenyl)cyclohexyloxy)hexyloxy)-6-oxohexyloxy)-6-oxohexyloxy)prop-2-en-1-one n ~ 10

1-(6-(6-(6-(6-(6-(6-(6-(6-(6-(6-(trans-4-(4-(4-phenylphenoxycarbonyl)phenyl)cyclohexyloxy)hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)prop-2-en-1-one n ~ 8

1-(6-(6-(6-(6-(6-(6-(6-(6-(4-(4-(4-(6-acryloyloxyhexyloxy)benzoyloxy)phenyloxycarbonyl)phenoxy)hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexanol 8-(4-(4-(4-(2,3-diacryloyloxypropyloxy)benzoyloxy)phenoxycarbonyl)phenoxy) octanol n ~ 17

6-(6-(6-(6-(6-(6-(6-(6-(6-(6-(6-(6-(6-(6-(6-(6-(8-(4-(4-(4-(2,3-diacryloyloxypropyloxy)benzoyloxy)phenoxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexan-1-ol 8-(4-(4-(4-(11-acryloyloxyundecyloxy)benzoyloxy)phenoxycarbonyl)phenoxy)octanol TABLE 1-continued Structure of Specific Mesogen Containing Compounds Structure and name n ~ 7

6-(6-(6-(6-(6-(6-(6-(6-(8-(4-(4-(4-(11-acryloyloxyundecanyloxy)benzoyloxy)phenoxycarbonyl)
phenoxy)octyloxy) 6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexan-1-ol 8-(4-(4-(4-(8-acryloyloxyoctyloxy)benzoyloxy)phenoxycarbonyl)phenoxy)octanol n ~ 8

6-(6-(6-(6-(6-(6-(6-(6-(8-(4-(4-(4-(11-acryloyloxyoctyloxy)benzoyloxy)phenoxycarbonyl)
phenoxy)octyloxy) 6-oxohexyloxy)-6-oxohexyloxy)-6-oxohexyloxy)-6-oxohexyloxy)-6-
oxohexyloxy)-6-oxohexyloxy)-6-oxohexyloxy)-6-oxohexan-1-ol n ~ 1

1-[3-(6-(acryloyloxy)hexanoyloxy)-2-((6-(acryloyloxy)hexanoyloxy)methyl)-2-methylpropyloxy]-4-[6-
(4-((4-(4-methylbenzoyloxy)phenoxy)carbonyl)phenoxy)hexyloxy]-butan-1,4-dione 1-[3-(acryloyloxy)-2,2-bis(acryloyloxymethyl)propyloxy]-4-[8-(4-((4-(4-methylbenzoyloxy)
phenoxy)carbonyl)phenoxy)octyloxy]-butan-1,4-dione TABLE 1-continued Structure of Specific Mesogen Containing Compounds Structure and name

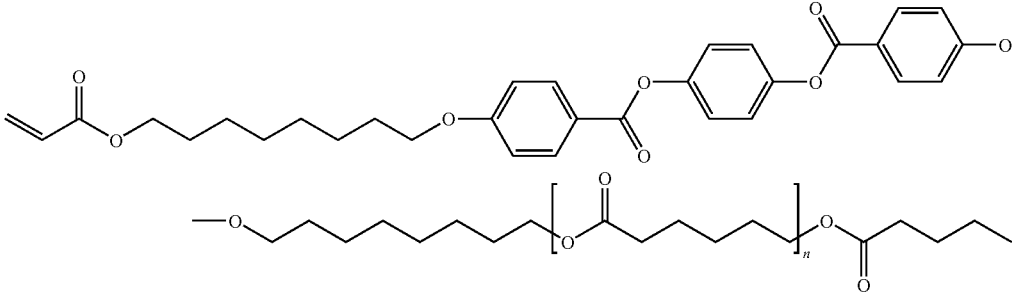

n ~ 5

1-(6-(6-(6-(6-(6-(8-(4-(4-(4-(8-acryloyloxyoctyloxy)benzoyloxy)phenyloxycarbonyl)phenoxy)
octyloxy)-6-oxohexyloxy)-6-oxohexyloxy)-6-oxohexyloxy)-6-oxohexyloxy)-6-oxohexyloxy) pentan-
1-one

EXAMPLES

Liquid Crystal Monomers (LCM) 1-7 describe the preparation of the liquid crystal monomers used in the Examples. Photochromic Compounds (PC) 1-4 describe the preparation of the photochromic compounds used in the Examples. Dichroic Dyes (DD) 1 and 2 describe the dichroic dyes used in the Examples. Examples 1-23 describe the formulations containing the LCM prepared according to the method described with Table 2. Comparative Examples 1-7 was prepared using commercially available liquid crystal monomers according to the method described with Table 4. Example 24 describes the preparation and testing of the samples coated with Examples 1-23 and Comparative Examples 1-7.

The following abbreviations were used for the chemicals listed:
Al(OiPr)$_3$—aluminum triisopropylate
DHP—3,4-dihydro-2H-pyran
DCC—dicyclohexylcarbodiimide
DIAD—diisopropyl azodicarboxylate
DMAP—4-dimethylaminopyridine
PPh$_3$—triphenyl phosphine
PPTS—pyridine p-toluenesulfonate
pTSA—p-toluenesulfonic acid
NMP—N-methyl pyrrolidone
BHT—butylated hydroxytoluene
TBD—1,5,7-triazabicyclo[4.4.0]dec-5-ene
THF—tetrahyrdofuran
DMF—dimethyl formamide
DMA—dimethyl aniline

Example 1

LCM-1

Step 1

To a reaction flask was added 4-hydroxybenzoic acid (90 grams (g), 0.65 mole (mol)), ethyl ether (1000 milliliters (mL)) and p-toluenesulfonic acid (pTSA) (2 g). The resulting suspension was stirred at room temperature. 3,4-Dihydro-2H-pyran (DHP) (66 g, 0.8 mol) was added to the mixture.

The suspension turned clear soon after the addition of DHP and a white crystalline precipitate formed. The mixture was then stirred at room temperature overnight. The resulting precipitates were collected by vacuum filtration and washed with ethyl ether. White crystals were recovered as the product (90 g, 62% yield). Nuclear Magnetic Resonance (NMR) showed that the product had a structure consistent with 4-(tetrahydro-2H-pyran-2-yloxy)benzoic acid.

Step 2

To a reaction flask was added 4-(tetrahydro-2H-pyran-2-yloxy)benzoic acid (65.5 g, 0.295 mol) from Step 1, 4-(trans-4-pentylcyclohexyl)phenol (70.3 g, 0.268 mol), dicyclohexylcarbodiimide (DCC) (66.8 g, 0.324 mol), 4-dimethylaminopyridine (DMAP) (3.3 g) and methylene chloride (1 L). The resulting mixture was mechanically stirred at 0° C. for 30 minutes, then at room temperature for 2 hours. The resulting solids were filtered off. The solution was concentrated until white crystals started to precipitate. One liter of methanol was added into the mixture with stirring. The precipitated solid crystalline product was collected by vacuum filtration and washed with methanol. White crystals (126 g) were recovered as the product. NMR showed that the product had a structure consistent with 4-(trans-4-pentylcyclohexyl)phenyl 4-(tetrahydro-2H-pyran-2-yloxy)benzoate.

Step 3

The product from Step 2, 4-(trans-4-pentylcyclohexyl) phenyl 4-(tetrahydro-2H-pyran-2-yloxy)benzoate (120 g, 0.26 mol), was dissolved in 1,2-dichloroethane (600 mL) in an appropriate reaction flask. Methanol (300 mL) and pyridine p-toluenesulfonate (PPTS) (9 g, 36 millimole (mmol)) was added. The mixture was heated to reflux and maintained at reflux for 6 hours. Upon standing at room temperature overnight, white crystals precipitated out which were collected by vacuum filtration. The mother liquid was concentrated and more white crystals precipitated out with the addition of methanol. The combined product (90 g) was washed with methanol (about 300 mL) three times and air dried. NMR showed that the product had a structure consistent with 4-(trans-4-pentylcyclohexyl)phenyl 4-hydroxybenzoate.

Step 4

To a reaction flask was added the product of Step 3, 4-(trans-4-pentylcyclohexyl)phenyl 4-hydroxybenzoate (70 g, 190 mmol), 6-chloro-1-hexanol (30 g, 220 mmol), N-methyl pyrrolidone (NMP) (300 mL), NaI (6 g), and potassium carbonate (57 g, 410 mmol). The resulting mixture was vigorously stirred at 85-90° C. for 4 hours. The resulting mixture was extracted using 1/1 volume ratio of ethyl acetate/hexanes (1 L) and water (500 mL). The separated organic layer was washed several times with water to remove NMP and then dried over anhydrous magnesium sulfate. After concentration, acetonitrile was added to precipitate the product. White crystals (76 g) were collected by vacuum filtration. NMR showed that the product had a structure consistent with 4-(trans-4-pentylcyclohexyl)phenyl 4-(6-hydroxyhexyloxy)benzoate.

Step 5

To a reaction flask was added the product of Step 4, 4-(trans-4-pentylcyclohexyl)phenyl 4-(6-hydroxyhexyloxy)benzoate (2 g, 4.3 mmol), epsilon-caprolactone (2.94 g, 26 mmol), aluminum triisopropoxide (Al(OiPr)$_3$) (0.26 g, 1.3 mmol) and methylene chloride (40 mL). The resulting mixture was stirred at room temperature for 8 hours. Butylated hydroxytoluene (BHT) (9 milligram (mg), 0.04 mmol), DMAP (0.05 g, 0.43 mmol) and N,N-diethylaniline (1.8 g, 15 mmol) was added to the mixture and the mixture was stirred for half an hour. Freshly distilled methacryloyl chloride (1.34 g, 13 mmol) was then added to the mixture. After stirring at room temperature for 8 hours, the mixture was washed with 5 weight percent NaOH aqueous solution three times, with an aqueous 1 Normal (N) HCl solution three times and then with the 5 weight percent NaOH aqueous solution one more time. Note that whenever weight percent is reported herein, it is based on the total weight of the solution. The organic layer was separated and dried over anhydrous MgSO$_4$. After concentration, a methanol washing was done by adding 100 mL of methanol to the recovered oil with stirring. After 10 minutes, the resulting cloudy mixture was left at room temperature. After the cloudiness of the mixture cleared, methanol on top of the mixture was decanted. This methanol wash was done three times. The recovered oil was re-dissolved in ethyl acetate, dried over anhydrous magnesium sulfate and concentrated. A viscous liquid (3.9 g) was recovered as the product. NMR showed that the product had a structure consistent with 1-(6-(6-(6-(6-(6-(6-(6-(4-(4-(4-pentylcyclohexyl)phenoxycarbonyl)phenoxy)hexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one with n having an average distribution of 6.5 as represented by the following graphic formula.

Example 2

LCM-2

Step 1

To a reaction flask containing a mixture of hydroquinone (110 g, 1.0 mol), pTSA (9.5 g, 0.05 mol), and 1 L of diethyl ether was added DHP (84 g, 1.0 mol) over a period of 30 min with stirring under a nitrogen atmosphere. After stirring overnight with nitrogen bubbling, the solution was extracted twice with nitrogen-purged solutions of 22.5 g of sodium hydroxide in 300 mL of water (total: 1.12 mol). The combined aqueous NaOH solutions were extracted with 300 mL of diethyl ether and cooled to 0° C. with an ice bath. Sodium bicarbonate (5.0 g) was added, and the stirred solution was slowly acidified with 64 mL of acetic acid (1.12 mol). The resulting mixture was stored at −18° C. overnight and then allowed to warm up to 0° C. The precipitated product was washed three times with 300 mL of water and dried under vacuum. The yield was 84 g (43%). NMR showed that the product had a structure consistent with 4-(tetrahydro-2H-pyran-2-yloxy)phenol.

Step 2

The procedures of Steps 2 and 3 of Example 1 were followed except that 4-(6-(acryloyloxy)hexyloxy)benzoic acid and the product of Step 1 of this Example, 4-(tetrahydro-2H-pyran-2-yloxy)phenol were used in place of 4-(tetrahydro-2H-pyran-2-yloxy)benzoic acid and 4-(trans-4-pentylcyclohexyl)phenol. The product was further purified by column chromatography eluting with hexane/ethyl acetate (7:3 volume ratio) to give the final product in a form of a white powder. NMR showed that the recovered white solid had a structure consistent with 4-hydroxyphenyl 4-(6-(acryloyloxy)hexyloxy)benzoate.

Step 3

The procedures of Steps 2 and 3 of Example 1 were followed except that 4-(6-(tetrahydro-2H-pyran-2-yloxy)hexyloxy)benzoic acid and the product of Step 2 were used in place of 4-(tetrahydro-2H-pyran-2-yloxy)benzoic acid and 4-(trans-4-pentylcyclohexyl)phenol. NMR showed that the product had a structure consistent with 4-(4-(6-(acryloyloxy)hexyloxy)benzoyloxy)phenyl 4-(6-hydroxyhexyloxy)benzoate.

Step 4

The procedure of Step 5 of Example 1 was followed except that the product of Step 3, 4-(4-(6-(acryloyloxy)hexyloxy)benzoyloxy)phenyl 4-(6-hydroxyhexyloxy)benzoate, and 8 equivalents of epsilon-caprolactone were used in place of 4-(trans-4-pentylcyclohexyl)phenyl 4-(6-hydroxyhexyloxy)benzoate and six equivalents of epsilon-caprolactone. NMR showed that the product has a structure consistent with 1-(6-(6-(6-(6-(6-(6-(6-(6-(4-(4-(4-(6-acryloyloxyhexyloxy)benzoyloxy)phenyloxycarbonyl)phenyloxy)hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-ene-1-one with n having an average distribution of 8 as represented by the following graphic formula.

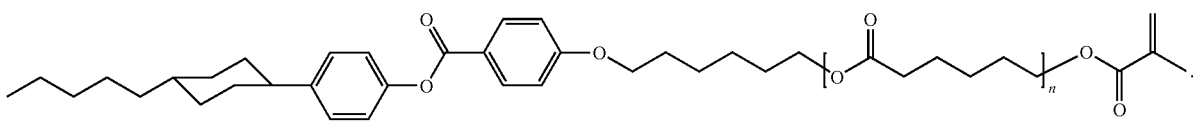

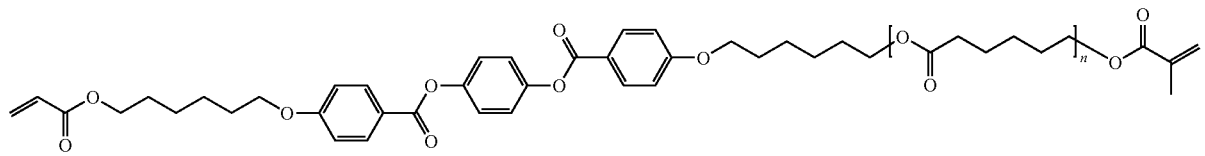

Example 3

LCM-3

Step 1

The procedure of Step 2 of Example 1 was followed except that 4-(8-acryloxyoctoxy)benzoic acid and 4-(4-trans-(6-hydroxyhexyloxy)cyclohexyl)phenol were used in place of 4-(tetrahydro-2H-pyran-2-yloxy)benzoic acid and 4-(trans-4-pentylcyclohexyl)phenol. The product was further purified by column separation. NMR showed that the product had a structure consistent with 4-(4-trans-(6-hydroxyhexyloxy)cyclohexyl)phenyl 4-(6-(acryloyloxy)hexyloxy)benzoate.

Step 2

The procedure of Step 5 of Example 1 was followed except that the product from Step 1 above, 4-(4-trans-(6-hydroxyhexyloxy)cyclohexyl)phenyl 4-(6-(acryloyloxy)hexyloxy)benzoate, four equivalents of epsilon-caprolactone and 0.5 equivalents of succinyl dichloride were used in place of 4-(trans-4-pentylcyclohexyl)phenyl 4-(6-hydroxyhexyloxy)benzoate, six equivalents of epsilon-caprolactone and methacryloyl chloride. NMR showed that the product had a structure consistent with 1,4-bis-{(6-(6-(6-(6-(6-(6-(4-(4-(6-acryloyloxy)benzoyloxy)phenyl)cyclohexyloxy)hexyloxy)-6-oxohexyloxy)-6-oxohexyloxy)-6-oxohexyloxy)-6-oxohexyloxy)-6-oxohexyloxy}butan-1,4-dione with m+n having an average distribution of 9.7 as represented by the following graphic formula.

mL), sodium bicarbonate (61.5 g, 0.732 mol) and 2,5-dihydroxybenzoic acid (28.2 g, 0.183 mol). The mixture was stirred at 100-120° C. for 6 hours. Extraction was done using 2/1 volume ratio of ethyl acetate/hexane (1 L) and water (2 L) for five times. The organic layer was separated, dried over anhydrous magnesium sulfate and concentrated. The product was used directly in the next step.

Step 3

To a reaction flask containing the product from Step 2 (50 g, ~0.15 mol) was added 6-chloro-1-hexanol (40 g, 0.3 mol), potassium carbonate (70 g, 0.5 mol), KI (1.4 g, 8 mmol) and NMP (300 mL). The mixture was stirred at 110° C. for 2 hours. Extraction was done using 1/1 ethyl acetate/hexanes (1 L) and water (2 L). The organic layer was separated, dried over anhydrous magnesium sulfate and concentrated. The recovered oil was purified by flash column separation (1/1 volume ratio of ethyl acetate/hexanes). A clear liquid (40 g) was obtained as the product. NMR showed that the product had a structure consistent with 6-(tetrahydro-2H-pyran-2-yloxy)hexyl 2,5-bis(6-hydroxyhexyloxy)benzoate.

Step 4

The procedure of Step 4 of Example 1 was followed except that 4-(4-trans-propylcyclohexyl)phenol was used in place of 4-(trans-4-pentylcyclohexyl)phenyl 4-hydroxybenzoate. White crystals were obtained as the product. NMR showed that the product had a structure consistent with 6-(4-trans-(4-propylcyclohexyl)phenoxy)hexan-1-ol.

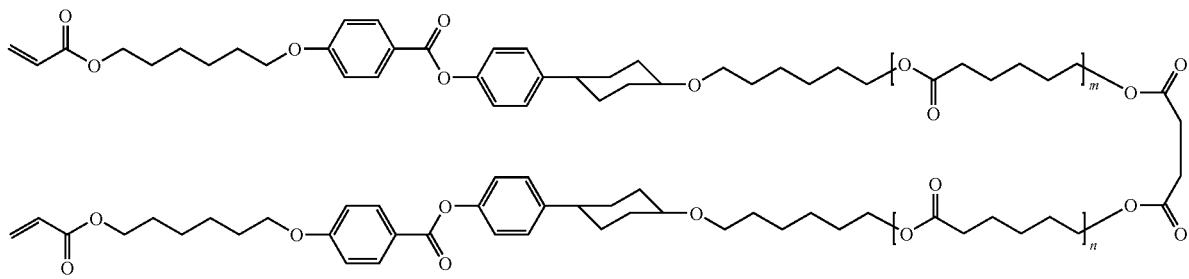

Example 4

LCM-4

Step 1

To a reaction flask was added 8-chloro-1-hexanol (25 g, 0.183 mol), DHP (15.4 g, 0.183 mol) and methylene chloride (300 mL) and stirred at 0° C. in an ice bath. Several crystals of pTSA monohydrate were added and after 10 minutes, the ice bath was removed and the mixture was stirred at room temperature for an hour. Sodium bicarbonate (2 g) was added to the mixture and then the mixture was concentrated and used directly for the next step.

Step 2

To a reaction flask containing the product from Step 1 (0.183 mol) was added dimethyl formamide (DMF) (600

Step 5

To a reaction flask was added the product from Step 4 (30 g, 87 mmol), succinic anhydride (25 g, 248 mmol g, 67 mmol), DMAP (1 g, 8 mmol) and THF (1000 mL) and was refluxed for 2 hours. Solvent was removed. Extraction was done using methylene chloride (1 L) and water (1 L). The organic layer was separated, dried over anhydrous magnesium sulfate and concentrated. The product was recrystallized from a mixture of methylene chloride and methanol. White crystals (35 g) were obtained.

Step 6

To a reaction flask was added the product from Step 5 (17.6 g, 39 mmol), 6-(tetrahydro-2H-pyran-2-yloxy)hexyl 2,5-bis (6-hydroxyhexyloxy)benzoate from Step 3 (10.6 g, 19.7 mmol), DCC (8.12 g, 39 mmol), DMAP (1 g, 8 mmol) and methylene chloride (100 mL). The resulting mixture was stirred at room temperature for 4 hours. The solid was filtered off. The filtrate was concentrated and methanol was used to precipitate out the product. After further purification using a silica gel flash column separation, clear oil (13 g) was obtained as the product. NMR showed that the product had a structure consistent with 6-(tetrahydro-2H-pyran-2-yloxy) hexyl 2,5-bis{6-(4-(6-(4-(4-(4-propylcyclohexyl)phenoxy) hexyloxy)-4-oxobutoyloxy)hexyloxy}benzoate.

Step 7

To a reaction flask was added the product of Step 6 (3 g), methanol (40 mL), PPTS (0.1 g), and 1,2-dichloroethane (40 mL). The resulting mixture was refluxed for 6 hours. The solvent was removed and a white solid was recovered. The product was purified by flash chromatography (20/1 methylene chloride/acetone). A clear liquid (2.5 g) was recovered as the product. NMR showed that the product had a structure consistent with 6-hydroxyhexyl 2,5-bis{6-(4-(6-(4-(4-(4-propylcyclohexyl)phenoxy)hexyloxy)-4-oxobutoyloxy) hexyloxy}benzoate.

Step 8

To a reaction flask was added the product of Step 7 (2.5 g, 2 mmol), N,N-diethylaniline (0.48 g, 3.2 mmol), BHT (4 mg, 0.02 mmol), DMAP (10 mg, 0.08 mmol) and methacryloyl chloride (0.32 g, 3 mmol). The resulting mixture was stirred at room temperature for 17 hours. The mixture was then diluted with methylene chloride and washed with 5% NaOH aqueous solution three times, 1 N HCl aqueous solution three times and then 5% NaOH aqueous solution one more time. The organic layer was separated and dried over anhydrous MgSO$_4$. A viscous liquid was recovered. After further purification using a silica gel flash column separation, clear oil (2.1 g) was obtained as the product. NMR showed that the product had a structure consistent with 6-methacryloyloxyhexyl 2,5-bis{6-(4-(6-(4-(4-(4-propylcyclohexyl)phenoxy) hexyloxy)-4-oxobutoyloxy)hexyloxy}benzoate.

Example 5

LCM-5

Step 1

A solution of DHP (13.9 g, 165 mmol) in 10 mL of THF was added to a reaction flask containing a solution of 1,12-dodecanediol (50.0 g, 247 mmol) and a catalytic amount of PPTS in anhydrous THF (100 mL). The reaction mixture was stirred under N$_2$ at room temperature for 24 h and then poured into sodium bicarbonate saturated water. The organic layer was separated. The aqueous layer was extracted with ethyl acetate. The combined organic solution was dried over anhydrous magnesium sulfate, concentrated and purified with flash chromatography to give 24.8 g of product.

Step 2

To a reaction flask containing a mixture of methyl 4-hydroxybenzoate (8.7 g, 57 mmol), triphenyl phosphine (PPh$_3$) (15.0 g, 57 mmol) and THF (60 mL) was added dropwise a solution of diisopropyl azodicarboxylate (DIAD) (11.5 g, 57 mmol), the product of Step 1 above (13.6 g, 25 mmol) and THF (10 mL). The mixture was stirred at room temperature overnight. The resulting precipitates were filtered off and the filtrate was concentrated. The resulting residue was purified by flash chromatography to give 18.9 g of product. NMR showed that the product had a structure consistent with methyl 4-(12-(tetrahydro-2H-pyran-2-yloxy)dodecyloxy) benzoate.

Step 3

To a reaction flask was added a solution of the product of Step 2 (18.0 g, 43 mmol) and NaOH (2.56 g, 64 mmol) in methanol (100 mL) which was refluxed for 4 hours. The resulting mixture was acidified with 2N HCl and then extracted with dichloromethane, washed with brine and water. The solvent was removed to give 18 g of product which was not further purified. NMR showed that the product had a structure consistent with 4-(12-(tetrahydo-2H-pyran-2-yloxy)dodecanyloxy)benzoic acid.

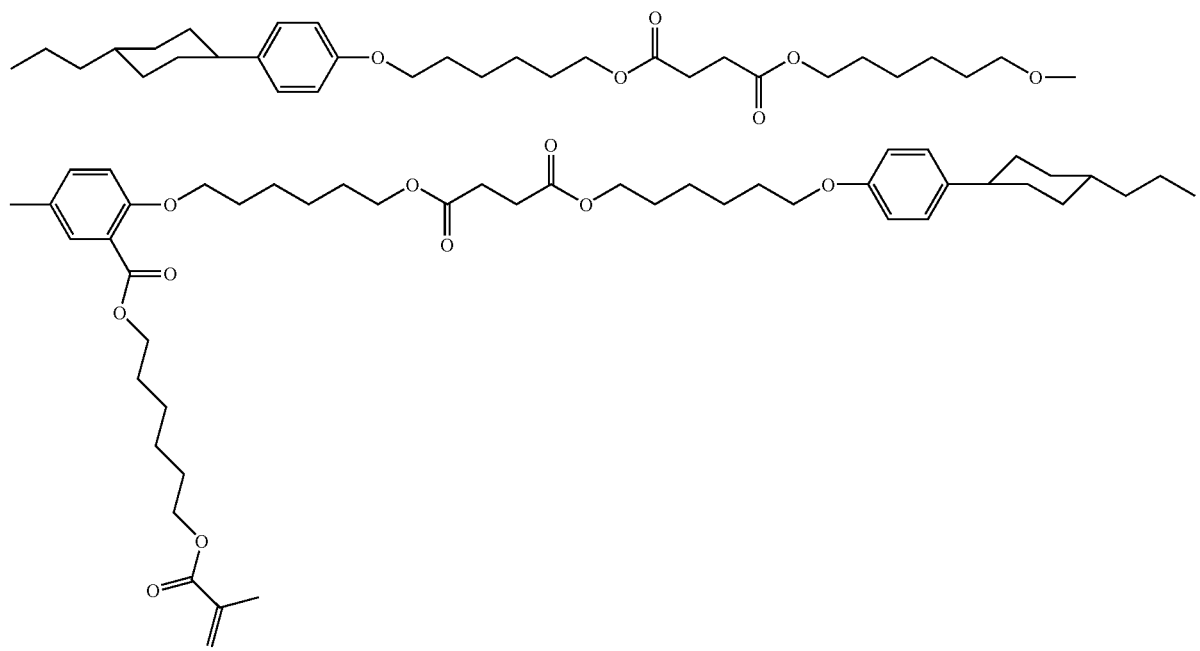

Step 4

To a reaction flask was added the product from Step 3 (7.5 g, 18 mmol), 3-methylhydroquinone (1.12 g, 11 mmol), DCC (4.0 g, 18 mmol) and DMAP (1.0 g, 8 mmol) in THF (40 mL) and stirred at room temperature for 24 h. The resulting solid was filtered out and filtrate was concentrated. The crude product was then purified with flash chromatography (hexane/ethyl acetate, 20:1 volume ratio) to give 5.2 g of product. NMR showed that the product had a structure consistent with 2,5-bis(4-(12-tetrahydro-2H-pyran-2-yloxydodecyloxy)benzoyloxy)toluene represented by the following graphic formula.

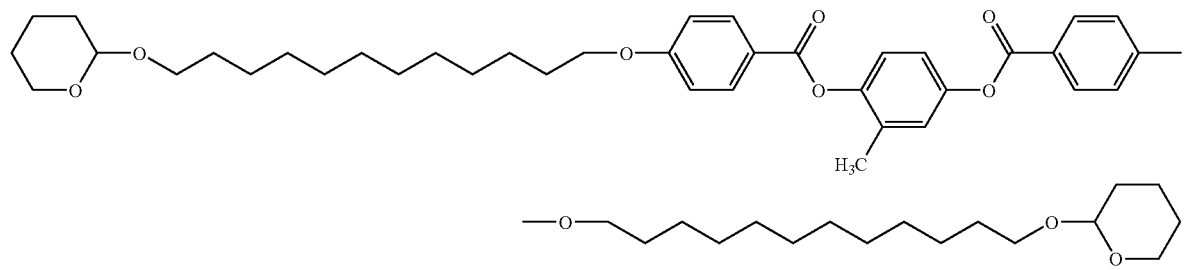

Example 6

LCM-6

Step 1

The procedure of Step 4 of Example 5 was followed except that 4-(8-hydroxyoctyloxy)benzoic acid and 2,6-dihydroxynaphthalene were used in place of 4-(12-(tetrahydo-2H-pyran-2-yloxy)dodecanyloxy)benzoic acid and 3-methyl-hydroquinone. NMR showed that the product had a structure consistent with 2,6-di(8-hydroxyoctanloxy)benzoyloxy)naphthalene.

Step 2

The procedure of Step 5 of Example 1 was followed except that the product of Step 1, 2,6-di-(8-hydroxyoctyloxy)benzoyl)oxy)naphthalene, and 5.5 equivalents of epsilon-caprolactone were used in place of 4-(trans-4-pentylcyclohexyl)phenyl 4-(6-hydroxyhexyloxy)benzoate and six equivalents of epsilon-caprolactone. NMR showed that the product has a structure consistent with 2,8-di{4-(6-(6-(6-(6-(6-(methacryloyloxy)hexanoyloxy)hexanoyloxy)hexanoyloxy)hexanoyloxy)hexanoyloxy)benzoyloxy}naphthalene with m+n having an average distribution of 5 as represented by the following graphic formula.

Example 7

LCM-7

The procedures of Example 2 were followed except that 4-(8-(acryloyloxy)octyloxy)benzoic acid was used in place of 4-(6-(acryloyloxy)hexyloxy)benzoic acid in step 2, 4-(8-(tetrahydro-2H-pyran-2-yloxy)octyloxy)benzoic acid was used in place of 4-(6-(tetrahydro-2H-pyran-2-yloxy)hexyloxy)benzoic acid in step 3 and eight equivalents of epsilon-caprolactone and pentanoyl chloride were used in place of six equivalents of epsilon-caprolactone and methacryloyl chloride in step 4. NMR showed that the product had a structure consistent with 1-(6-(6-(6-(6-(6-(8-(4-(4-(4-(8-acryloyloxyoctyloxy)benzoyloxy)phenyloxycarbonyl)phenoxy)octyloxy)-6-oxohexyloxy)-6-oxohexyloxy)-6-oxohexyloxy)-6-oxohexyloxy)-6-oxohexyloxy)pentan-1-one with n having an average distribution of 5.0 as represented by the following graphic formula.

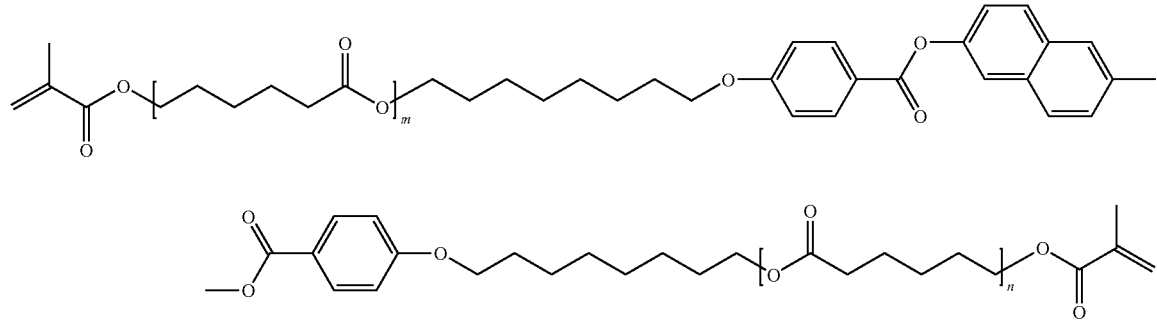

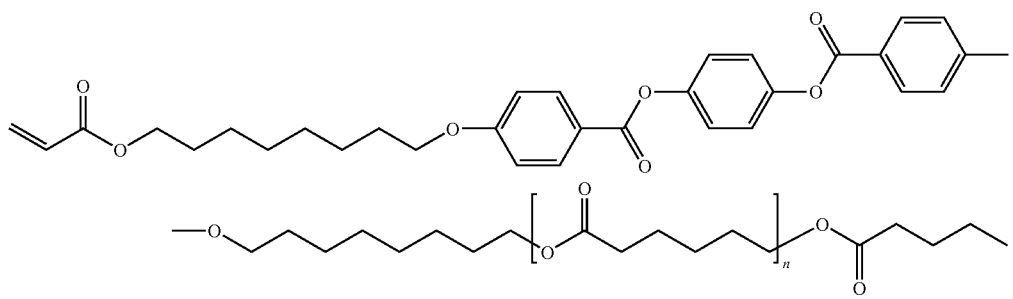

Photochromic Compounds (PC)

PC 1 and 2 were prepared following the procedures of U.S. Pat. Nos. 5,645,767 and 6,296,785 B1. NMR analysis showed the products to have structures consistent with the following names.

PC-1—3,3-di(4-methoxyphenyl)-13,13-dimethyl-3H, 13H-indeno[2',3':3,4]naphtho[1,2-b]pyran.

PC-2—3-(4-methoxyphenyl)-3-(4-morpholinophenyl)-13,13-dimethyl-3H,13H-indeno[2',3':3,4]naphtho[1,2-b]pyran.

Example PC-3

Step 1

Trimethyl orthoformate (32.6 mL, 297.5 mmol) and PPTS (3.0 g, 11.9 mmol) were added to a suspension of 7-ethyl-2, 3-dimethoxy-7H-benzo[c]fluorene-5,7-diol (20.0 g, 59.5 mmol) which diol was prepared according to the procedure of Step 1 of Example 3 described in paragraph [0448] of U.S. Patent Application Publication No. 2008/0051575, in methanol and heated to reflux for 2-3 hours (h). Upon completion of the reaction, as indicated by thin layer chromatography (TLC), the mixture was cooled to room temperature to afford precipitates. The resulting precipitates were collected by vacuum filtration and washed with a minimum amount of cold methanol. Cream colored amorphous solid was recovered as the product (20.0 g, 95% yield). NMR showed that the product had a structure consistent with 7-ethyl-2,3,7-trimethoxy-7H-benzo[c]fluorene-5-ol.

Step 2

Methyl magnesium bromide (474.2 mL, 664.0 mmol) in toluene (355 mL) and THF (355 mL) were added to a 2 L round bottom flask. The flask was purged with nitrogen and 2,6-dimethyl piperidine (55.0 mL, 398.4 mmol) was added dropwise to the solution. 7-Ethyl-2,3,7-trimethoxy-7H-benzo[c]fluorene-5-ol (46.5 g, 132.8 mmol) from Step 1, was added in several portions with vigorous stirring and the reaction mixture was heated to reflux for 5 h. Upon completion of the reaction, as indicated by TLC, the mixture was carefully poured into an aqueous solution of 10 weight percent, based on the total weight of the solution, HCl (500 mL) at 0° C. and the pH was carefully adjusted to 4 by the addition of concentrated HCl. The organic-aqueous mixture was stirred for 10-15 min, ethyl acetate was added three times using 500 mL each time and the resulting phases were separated. The combined organic extract was dried with sodium sulfate and concentrated under a vacuum to produce an oily residue. Dichloromethane was added to the residue and stirred to produce precipitates. The precipitates (43.5 g, 97%) were collected by vacuum filtration and washed with a minimum amount of cold dichloromethane. NMR showed that the product had a structure consistent with 7-ethyl-3,4-dimethoxy-7H-benzo[c]fluorene-2,5-diol.

Step 3

To a reaction flask was added 7-ethyl-3,4-dimethoxy-7H-benzo[c]fluorene-2,5-diol (43.3 g, 128.7 mmol) from Step 2, 1,1-bis(4-methoxyphenyl)-prop-2-yn-1-ol (41.4 g, 154.5 mmol), dichloromethane (300 mL), triisopropylorthoformate (30 mL, 154.5 mmol) and PPTS (3.2 g, 12.9 mmol). The resulting suspension was heated to reflux for 18 h. Upon completion of the reaction as indicated by TLC, the reaction mixture was passed through a silica plug (500 g) and the product was eluted with chloroform. Fractions containing the product were combined and concentrated under vacuum to produce an oily residue. The oily residue (83.9 g) was used directly in the next step.

Step 4

To the reaction flask containing the oily residue (83.9 g, 143.2 mmol) from Step 3 was added dichloromethane (200 mL), 4'-(tetrahydro-2H-pyran-2-yloxy)biphenyl-4-carboxylic acid, (42.7 g, 143.2 mmol), DMAP (5.2 g, 42.9 mmol) and DCC (29.5 g, 143.2 mmol). The resulting suspension was stirred at room temperature until the starting material was consumed as indicated by TLC. The mixture was filtered and the residue was washed with dichloromethane. The filtrate was concentrated to produce an oily residue. The residue was taken up in a minimum amount of dichloromethane and was added drop wise to vigorously stirred methanol (500 mL) to produce precipitates. The resulting precipitates were collected by vacuum filtration and washed with a minimum amount of $CH_3OH$. The precipitate was used directly in the next step.

Step 5

To a reaction flask containing the precipitate (47 g crude wt) from Step 4 was added 1,2-dichloroethane (300 mL), ethanol (150 mL) and PPTS (10 g). The mixture was heated to reflux for 18 h until the starting material was consumed as indicated by TLC. The solvent was removed under vacuum and the residue passed through a silica plug (500 g) and eluted with dichloromethane. Fractions containing the product were grouped and concentrated to produce an oily residue. The resulting oily residue (31.7 g) was used directly in the next step.

Step 6

To reaction flask containing the oily residue (31.7 g, 40.5 mmol) from the previous step was added dichloromethane (100 mL), DCC (10.0 g, 48.5 mmol), DMAP (2.5 g, 20.5 mmol) and 4-(4-pentylcyclohexyl)benzoic acid (13.0 g, 47.5 mmol). The reaction mixture was stirred at room temperature until the starting material was consumed as indicated by TLC. The reaction mixture was filtered and the residue was washed with dichloromethane. The filtrate was concentrated to produce an oily residue. The oily residue was purified by passing through a silica plug (500 g) and eluted with hexane:dichloromethane (1:9 volume ratio). Fractions containing the product were combined and concentrated under vacuum and produced foam. The foam was dissolved in a minimum amount of dichloromethane and was added drop wise to vigorously stirred methanol (300 mL) to produce precipitates. The precipitates (15 g) were collected by vacuum filtration and washed with a minimum amount of methanol. NMR showed that the product had a structure consistent with 3,3-di(4-methoxyphenyl)-13-ethyl-6,13-dimethoxy-7-(4-(4-(4-trans-pentylcyclohexyl)benzoyloxy)phenyl)benzoyloxy-3H,13H-indeno[2',3':3,4]naphtho[1,2-b]pyran.

Example PC-4

Step 1

To a reaction flask was added 4'-bromoacetophenone (500 g, 2.5 mol), triethylamine (500 mL) and methylene chloride (1 L). To this stirred mixture, triisopropylsilyl trifluoromethanesulfonate (784 g, 2.56 mol) was added dropwise using a dropping funnel. The reaction was exothermic so the temperature was controlled to below boiling by using an ice bath. After the addition, the reaction mixture was left stirring at room temperature for 4 hours. Hexanes (1 L) and sodium bicarbonate saturated water solution (500 ml) was then added to the mixture. The resulting organic layer was collected using a separatory funnel, washed three times with sodium bicarbonate saturated water solution, dried over $MgSO_4$ and then concentrated. The recovered yellow oil was then distilled using a Kugelrohr apparatus. A clear liquid (890 g) was obtained as the product. NMR showed that the product had a structure consistent with (1-(4-bromophenyl)vinyloxy)triisopropylsilane.

Step 2

To a reaction flask was added the product from Step 1 (580 g, 1.63 mol), dimethyl acetylenedicarboxylate (220 g, 1.55 mol), 2,3,5,6-tetrachloro-(1,4)-benzoquinone (401 g, 1.63 mol) and toluene (1.1 L). The mixture was refluxed for 6 h and then cooled to room temperature. Hexanes (1 L) were added to the mixture. The solid precipitate was filtered off. The solution was then concentrated. Brownish oil (980 g) was obtained and used directly in the next step.

Step 3

To a reaction flask was added the crude product from Step 2 (980 g), acetic acid (178 g, 3 mol), and methanol (450 mL). The mixture was stirred at room temperature. Potassium fluoride (138 g, 2.4 mol) was added in several portions. Half an hour after the completion of the addition of potassium fluoride, water (2 L) and hexanes (2 L) were added to the reaction mixture under vigorous stirring. Viscous oil precipitated from the mixture. The water and hexanes were decanted. The oil was washed several times with water, dissolved in ethyl acetate (3 L), dried over magnesium sulfate and concentrated until white crystals started to form. The mixture was then cooled in an ice bath. The precipitated off-white crystals were collected by vacuum filtration. NMR showed that the product (198 g) had a structure consistent with dimethyl 7-bromo-4-hydroxynaphthalene-1,2-dicarboxylate.

Step 4

To a reaction flask was added the product from Step 3 (30 g, 89 mmol), 1,1-diphenylprop-2-yn-1-ol (18.4 g, 89 mmol), methylene chloride (300 mL) and pTSA (1.68 g, 8.9 mmol). The mixture was refluxed for 17 hours and then dried over magnesium sulfate. After removal of most of the solvent, methanol (200 mL) was added. Yellow crystals precipitated and were collected by vacuum filtration. NMR showed that the product (48 g) had a structure consistent with dimethyl 8-bromo-5,6-bis(methoxycarbonyl)-2,2-diphenyl-2H-naphtho[1,2-b]pyran.

Step 5

To a reaction flask was added 4-aminophenylboronic acid pinacolate (52 g, 0.24 mol), 4-(4-pentylcyclohexyl)benzoic acid (65 g, 0.24 mol), methylene chloride (500 mL), DCC (64.4 g, 0.31 mol) and DMAP (2 g, 16 mmol). The mixture was stirred at room temperature for a few hours for the reaction to go to completion and stirring was continued for about 64 hours. Solids were filtered off. The resulting solution was concentrated until large amount of white crystals formed. Methanol (1 L) was added to the mixture. The resulting white solid was collected by vacuum filtration (102 g). NMR showed that the product (48 g) had a structure consistent with 4-(4-pentylcyclohexyl)-N-(4-(4,4,5,5-tetramethyl-1,3,2-dioxaborolan-2-yl)phenyl)benzamide.

Step 6

To a reaction flask was added the product from Step 4 (48 g, 91 mmol), the product from Step 5 (43.1 g, 91 mmol), dichloro-bis(triphenylphosphine)palladium(II) (1.3 g, 2 mmol), potassium fluoride (22 g, 360 mmol), THF (1 L) and water (500 mL). The mixture was degassed, protected with nitrogen and refluxed. After 17 hours, five more grams of product from Step 5 was added. Five hours later, the reaction was stopped. The organic portion was collected using a separatory funnel, dried over magnesium sulfate and concentrated. A plug column was used to remove the black impurity from the product. The product was recrystallized from a mixture of the solvents methylene chloride/methanol by adding the product to methylene chloride heated to below the boiling point and subsequently adding incremental amounts of methanol heated to below the boiling point and cooling until crystals were obtained. Slightly yellow crystals were obtained (57 g). NMR showed that the product (48 g) had a structure consistent with dimethyl 8-(4-(4-(4-pentylcyclohexyl)benzamido)benzoyloxy-5,6-bis(methoxycarbonyl)-2,2-diphenyl-2H-naphtho[1,2-b]pyran.

Dichroic Dyes

The following two dichroic dyes, which are available from Mitsubishi Chemical, were used to prepare individually dichroic dye-colored (i.e., blue or yellow) liquid crystal monomer solutions (LCMS):

DD-1 is LSR-335 reported to be a blue dye of Lot: 01C131; and

DD-2 is LSR-120 reported to be a yellow dye of Lot: 2D231.

Examples 8-30

Examples 8-30 were prepared according to the formulation listed in Table 2 using the specific LCM, DD and PC listed in Table 3 as described below.

TABLE 2

| Materials | Weight Percent (based on the total weight of the solution unless specified otherwise) |
|---|---|
| LCM solids: RM-257[1] | 30 |
| RM-105[2] | 12 |
| LCM-1 thru 7 | 18 |
| Solvent[3] | 40 |
| Initiator[4] | 1.5 based on LCM solids |

TABLE 2-continued

| Materials | Weight Percent (based on the total weight of the solution unless specified otherwise) |
|---|---|
| Stabilizer[5] | 0.1 based on LCM solids |
| Dye when present (DD or PC) | 2.0 based on LCM solids |

[1]RM-257 is a liquid crystal monomer available from EMD Chemicals, Inc. and is reported to have the molecular formula of $C_{33}H_{32}O_{10}$.
[2]RM-105 is a liquid crystal monomer available from EMD Chemicals, Inc. and is reported to have the molecular formula of $C_{23}H_{26}O_6$.
[3]Solvent was 99 weight percent anisole and 1 weight percent surfactant sold as BYK ®-346 additive by BYK Chemie, USA.
[4]Initiator was IRGACURE ® 819, a photoinitiator that is available from Ciba-Geigy Corporation.
[5]Stabilizer was 2-methyl hydroquinone.

TABLE 3

| Example No. | LCM No. | Dye |
|---|---|---|
| 8 | 7 | — |
| 9 | 3 | — |
| 10 | 4 | — |
| 11 | 6 | — |
| 12 | 1 | — |
| 13 | 2 | — |
| 14 | 5 | — |
| 15 | 7 | PC-4 |
| 16 | 7 | PC-3 |
| 17 | 7 | PC-1 |
| 18 | 7 | PC-2 |
| 19 | 7 | DD-2 |
| 20 | 3 | PC-3 |
| 21 | 3 | PC-2 |
| 22 | 4 | PC-4 |
| 23 | 6 | PC-3 |
| 24 | 1 | PC-4 |
| 25 | 1 | PC-3 |
| 26 | 2 | PC-4 |
| 27 | 2 | DD-1 |
| 28 | 2 | PC-1 |
| 29 | 5 | PC-4 |
| 30 | 5 | PC-1 |

To a vial (20 mL) containing a magnetic stir bar was added each of the liquid crystal monomers, stabilizer, and initiator. Solvent was added to the contents in the vial, and the vial was capped and wrapped with aluminum foil and then positioned on a magnetic stirrer. The resulting mixture was heated to 80° C. and stirred for about 30 min until the solution became clear. The solution was cooled to room temperature and a small drop of solution was taken by a capillary for phase transition study. If a dye was required, it was added to the clear solution and heated to 80° C with stirring for 30 min to dissolve. Afterwards, the resulting solution was cooled to room temperature and stored in darkness.

Comparative Examples (CE) 1-7

Comparative Examples (CE) 1-7 were prepared following the procedure used for Examples 8-30 except according to the formulation listed in Table 4 using the specific dyes listed in Table 5.

TABLE 4

| Materials | Weight Percent (based on the total weight of the solution unless specified otherwise) |
|---|---|
| LCM solids: RM-257[1] | 32.5 |
| RM-105[2] | 32.5 |
| Solvent[3] | 35 |
| Initiator[4] | 1.5 based on LCM solids |
| Stabilizer[5] | 0.1 based on LCM solids |
| Dye when present (DD or PC) | 2.0 based on LCM solids |

TABLE 5

| Comparative Example No. | Dye |
|---|---|
| 1 | — |
| 2 | PC-4 |
| 3 | PC-3 |
| 4 | PC-1 |
| 5 | PC-2 |
| 6 | DD-2 |
| 7 | DD-1 |

Example 31

Preparation of Samples Coated with the Examples and Comparative Examples

The procedures described hereinafter in Parts A-D were followed to prepare at least partial coatings of the Examples and Comparative Examples on the substrate surfaces. The phase transitions of each Example and Comparative Example was determined by the procedure described in Part E.

Part A—Substrate Cleaning

Square substrates measuring 5.08 cm by 5.08 cm by 0.318 cm (2 inches (in.) by 2 in. by 0.125 in.) prepared from CR-39® monomer were obtained from Homalite, Inc. Each substrate was cleaned by wiping with a tissue soaked with acetone and dried with a stream of nitrogen gas.

Part B—Alignment Layer Application

A solution of a photo-orientable polymer network, available as STARALIGN® 2200 CP10 solution from Huntsman Advanced Materials, was diluted to 4 weight percent in cyclopentanone. The resulting solution was applied by spin-coating to a portion of the surface of the test substrate by dispensing approximately 1.0 mL of the STARALIGN® solution and spinning the substrates at 1000 revolutions per minute (rpm) for 10 seconds. Afterwards, the coated substrates were placed in an oven maintained at 135° C. for 30 minutes.

For the alignment layer produced by rubbing, triacetate cellulose (TAC) was dissolved in cyclopentanone at 4 weight percent and applied by spin-coating to a portion of the surface of the test substrate by dispensing approximately 1.0 mL of the TAC solution and spinning the substrates at 500 rpm for 3 seconds followed by 1000 rpm for 10 seconds. Afterwards, the coated substrates were placed in an oven maintained at 140° C. for 60 minutes.

Part C—Orientation of the Alignment Layer

After application, the photo-orientable polymer network was at least partially ordered by exposure to linearly polarized ultraviolet radiation for 5 minute at a peak intensity of 80-100 Watts/$m^2$ of UVA (320-390 nm) as measured using International Light Research Radiometer, Model IL-1700 with a detector system comprising a Model SED033 detector, B Filter and diffuser. The output display of the radiometer was corrected (factor values set) against a Licor 1800-02 Optical Calibration Calibrator in order to display values representing Watts per square meter UVA. The source of linearly polarized UV radiation was a mercury arc lamp (Model 69910) from Newport Oriel equipped with an intensity controller Model 68951. The light source was oriented such that the radiation was linearly polarized in a plane perpendicular to the surface of the substrate. After ordering at least a portion of the photo-orientable polymer network, the substrates were cooled to room temperature and kept covered.

The substrates having the TAC layer were oriented by rubbing the coated surface with velvet uni-directionally 20 times.

Part D—Application of the Examples and Comparative Examples

Prior to application, 10 weight percent of $MgSO_4$ was added to each of the Examples and Comparative Examples and the resulting mixture was stirred for an hour at room temperature and subject to centrifuge filtration using a Millipore Ultrafree-MC (Durapore PVDF 5 um) filtration device in a Sorvall Legend Micro 21 centrifuge at 10,000 rpm for 5 min. A small drop of filtrate was taken by a capillary for phase transition study. Material not used for the subsequent coating step was stored in darkness.

The Examples and Comparative Examples were applied by spin-coating to the aligned layer on the substrates by spin-coating to a portion of the surface of the test substrate by dispensing 400 µL of the solution and spinning the substrates at 400 rpm for 9 seconds followed by 800 rpm for 15 seconds. A spin processor from Laurell Technologies Corp. (WS-400B-6NPP/LITE) was used for spin coating. Afterwards, the coated substrates were placed in a convection oven maintained at 5° C. to 10° C. lower than the corresponding clearing temperature (the temperature at which the liquid crystals transform into the isotropic state, as indicated in Table 6) for 10 to 15 minutes followed by curing under an ultraviolet lamp in the Irradiation Chamber BS-03 from Dr. Gröbel in a nitrogen atmosphere for 30 minutes at a peak intensity of 11-16 Watts/m² of UVA.

Part E—Measurement of Liquid Crystal Phase Transition Temperatures

Phase transition temperatures were determined by using a Leica DM 2500 M polarized optical microscope equipped with a Linkam LTS 120 hot stage and a Linkam PE 94 temperature controller. A small drop of solution from a capillary pipette was placed on a microscope glass slide, and a stream of nitrogen was used to evaporate the solvent. The glass slide was mounted on the sample stage so that the liquid crystal residue spot was in the optical path of the microscope. Phase transition temperatures were measured by observing the samples during heating at a rate of 10° C./min starting at 25° C. Phase below 25° C. was not determined. The sample was heated until it reached the isotropic phase and then cooled at 10° C./min to 25° C. to determine the phase transition temperatures during the cooling process as indicated in Table 6. The phases of the liquid crystals were determined according to the texture that appeared during the heating and cooling processes. *Textures of Liquid Crystals* by Dietrich Demus and Lothar Richter, published by Verlag Chemie, Weinheim & New York in 1978 was used in the identification of the different liquid crystal phases listed in Table 6.

The following abbreviations were used in the table: N represents the Nematic phase; I represents the Isotropic phase. Note that all numbers represent the temperature in ° C. at which the adjacent phase abbreviation occurred. Each phase measured is separated by // meaning that the phase extended until the next temperature or temperature range listed. For example, 25 N//37 I, indicates that the Nematic phase was present from 25° C. to about 37° C. when the Isotropic phase occurred. Observation of the sample's phase started at room temperature (25° C.) and reported the next phase transition temperature.

TABLE 6

| Example No. | Phase Transition Temperature |
|---|---|
| Example 8 | 25 N // 70 I // 65 N |
| Example 9 | 25 N // 62 I // 56 N |
| Example 10 | 25 N // 62 I // 53 N |
| Example 11 | 25 N // 50 I // 40 N |
| Example 12 | 25 N // 61 I // 56 N |
| Example 13 | 25 N // 65 I // 60 N |
| Example 14 | 25 N // 65 I // 58 N |
| Example 15 | 25 N // 67 I // 62 N |
| Example 16 | 25 N // 70 I // 61 N |
| Example 17 | 25 N // 62 I // 56 N |
| Example 18 | 25 N // 60 I // 56 N |
| Example 19 | 25 N // 72 I // 68 N |
| Example 20 | 25 N // 58 I // 53 N |
| Example 21 | 25 N // 48 I // 44 N |
| Example 22 | 25 N // 54 I // 49 N |
| Example 23 | 25 N // 47 I // 42 N |
| Example 24 | 25 N // 61 I // 55 N |
| Example 25 | 25 N // 64 I // 55 N |
| Example 26 | 25 N // 65 I // 56 N |
| Example 27 | 25 N // 60 I // 54 N |
| Example 28 | 25 N // 60 I // 54 N |
| Example 29 | 25 N // 60 I // 54 N |
| Example 30 | 25 N // 49 I // 41 N |
| CE 1 | 25 N // 83 I // 74 N |
| CE 2 | 25 N // 80 I // 72 N |
| CE 3 | 25 N // 78 I // 70 N |
| CE 4 | 25 N // 75 I // 65 N |
| CE 5 | 25 N // 76 I // 67 N |
| CE 6 | 25 N // 83 I // 75 N |
| CE 7 | 25 N // 78 I // 72 N |

Part F—Absorption Ratio and Optical Response Measurements

Absorption ratios for each of the substrates having coating containing dichroic dyes (DD) were determined as follows. A Cary 6000i UV-Visible spectrophotometer was equipped with a self-centering sample holder mounted on a rotation stage (Model M-060-PD from Polytech, PI) and the appropriate software. A polarizer analyzer (Moxtek PROFLUX® polarizer) was placed in the sample beam before the sample. The instrument was set with the following parameters: Scan speed=600 nm/min; Data interval=1.0 nm; Integration time=100 ms; Absorbance range=0-6.5; Y mode=absorbance; X-mode=nanometers; and the scanning range was 380 to 800 nm. Options were set for 3.5 SBW (slit band width), and double for beam mode. Baseline options were set for Zero/baseline correction. Also, 1.1 and 1.5 (~2.6 together) Screen Neutral Density filters were in the reference path for all scans. The coated substrate samples were tested in air, at room temperature (22.7° C.±2.4° C.) maintained by the lab air conditioning system.

Orientation of the sample polarizer to be parallel and perpendicular to the analyzer polarizer was accomplished in the following manner. The Cary 6000i was set to 443 nm for samples containing DD-2 and 675 nm for samples containing DD-1, and the absorbance was monitored as the sample was rotated in small increments (0.1 to 5 degrees, e.g., 5,1, 0.5 and 0.1 degrees). The rotation of the sample was continued until the absorbance was maximized. This position was defined as the perpendicular or 90 degree position. The parallel position was obtained by rotating the stage 90 degrees clock-wise or counter-clockwise. Alignment of the samples was achieved to ±0.1°.

The absorption spectra were collected at both 90 and 0 degrees for each sample. Data analysis was handled with the Igor Pro software available from WaveMetrics. The spectra were loaded into Igor Pro and the absorbances were used to calculate the absorption ratios at 443 nm and 675 nm. The calculated absorption ratios are listed in Table 7.

The $\lambda_{max\text{-}vis}$ in the visible light range is the wavelength in the visible spectrum at which the maximum absorption of the activated form of the photochromic compound or dichroic dye occurs. The $\lambda_{max\text{-}vis}$ was determined by testing the coated substrate in a Cary 6000i UV-Visible spectrophotometer.

Prior to response testing on an optical bench, the substrates having photochromic compounds in the coatings were conditioned by exposing them to 365 nm ultraviolet light for 10 minutes at a distance of about 14 cm from the source in order to pre-activate the photochromic molecules. The UVA irradiance at the sample was measured with a Licor Model Li-1800 spectroradiometer and found to be 22.2 Watts per square meter. The samples were then placed under a halogen lamp (500 W, 120 V) for about 10 minutes at a distance of about 36 cm from the lamp in order to bleach, or inactivate, the photochromic compound in the samples. The illuminance at the sample was measured with the Licor spectroradiometer and found to be 21.9 Klux. The samples were then kept in a dark environment for at least 1 hour prior to testing in order to cool and continue to fade back to a ground state.

An optical bench was used to measure the optical properties of the coated substrates and derive the absorption ratio and photochromic properties. Each test sample was placed on the optical bench with an activating light source (a Newport/Oriel Model 66485 300-Watt Xenon arc lamp fitted with a UNIBLITZ® VS-25 high-speed computer controlled shutter that momentarily closed during data collection so that stray light would not interfere with the data collection process, a SCHOTT® 3 mm KG-1 band-pass filter, which removed short wavelength radiation, neutral density filter(s) for intensity attenuation and a condensing lens for beam collimation) positioned at a 30° to 35° angle of incidence to the surface of the test sample. The arc lamp was equipped with a light intensity controller (Newport/Oriel model 68950).

A broadband light source for monitoring response measurements was positioned in a perpendicular manner to a surface of the test sample. Increased signal of shorter visible wavelengths was obtained by collecting and combining separately filtered light from a 100-Watt tungsten halogen lamp (controlled by a LAMBDA® UP60-14 constant voltage powder supply) with a split-end, bifurcated fiber optical cable. Light from one side of the tungsten halogen lamp was filtered with a SCHOTT® KG1 filter to absorb heat and a HOYA® B-440 filter to allow passage of the shorter wavelengths. The other side of the light was either filtered with a SCHOTT® KG1 filter or unfiltered. The light was collected by focusing light from each side of the lamp onto a separate end of the split-end, bifurcated fiber optic cable, and subsequently combined into one light source emerging from the single end of the cable. A 4" light pipe was attached to the single end of the cable to insure proper mixing. The broad band light source was fitted with a UNIBLITZ® VS-25 high-speed computer controlled shutter that momentarily opened during data collection.

Polarization of the light source was achieved by passing the light from the single end of the cable through a Moxtek, PROFLUX® Polarizer held in a computer driven, motorized rotation stage (Model M-061-PD from Polytech, PI). The monitoring beam was set so that the one polarization plane (0°) was perpendicular to the plane of the optical bench table and the second polarization plane (90°) was parallel to the plane of the optical bench table. The samples were run in air, at 23° C.±0.1° C. maintained by a temperature controlled air cell.

To align each sample, a second polarizer was added to the optical path. The second polarizer was set to 90° of the first polarizer. The sample was placed in an air cell in a self-centering holder mounted on a rotation stage (Model No M-061. PD from Polytech, PI). A laser beam (Coherent-ULN 635 diode laser) was directed through the crossed polarizers and sample. The sample was rotated (in 3° steps as course moves and in 0.1° steps as fine moves) to find the minimum transmission. At this point the sample was aligned either parallel or perpendicular to the Moxtek polarizer and the second polarizer as well as the diode laser beam was removed from the optical path. The sample was aligned ±0.2° prior to any activation.

To conduct the measurements, each test sample containing a photochromic dye was exposed to 6.7 W/m² of UVA from the activating light source for 10 to 20 minutes to activate the photochromic compound. An International Light Research Radiometer (Model IL-1700) with a detector system (Model SED033 detector, B Filter, and diffuser) was used to verify exposure at the beginning of each day. Light from the monitoring source that was polarized to the 0° polarization plane was then passed through the coated sample and focused into a 1" integrating sphere, which was connected to an OCEAN OPTICS® S2000 spectrophotometer using a single function fiber optic cable. The spectral information, after passing through the sample, was collected using OCEAN OPTICS® OOIBase32 and OOIColor software, and PPG propriety software. While the photochromic material was activated, the position of the polarizing sheet was rotated back and forth to polarize the light from the monitoring light source to the 90° polarization plane and back. Data was collected for approximately 600 to 1200 seconds at 5-second intervals during activation. For each test, rotation of the polarizers was adjusted to collect data in the following sequence of polarization planes: 0°, 90°, 90°, 0°, etc.

Absorption spectra were obtained and analyzed for each test sample using the Igor Pro software (available from WaveMetrics). The change in the absorbance in each polarization direction for each test sample was calculated by subtracting out the 0 time (i.e., unactivated) absorption measurement for the samples at each wavelength tested. Average absorbance values were obtained in the region of the activation profile where the photochromic response of the photochromic compound was saturated or nearly saturated (i.e., the regions where the measured absorbance did not increase or did not increase significantly over time) for each sample by averaging absorbance at each time interval in this region. The average absorbance values in a predetermined range of wavelengths corresponding $\lambda_{max\text{-}vis}$+/−5 nm were extracted for the 0° and 90° polarizations, and the absorption ratio for each wavelength in this range was calculated by dividing the larger average absorbance by the small average absorbance. For each wavelength extracted, 5 to 100 data points were averaged. The average absorption ratio for the photochromic compound was then calculated by averaging these individual absorption ratios.

Change in optical density (ΔOD) from the bleached state to the darkened state was determined by establishing the initial transmittance, opening the shutter from the xenon lamp to provide ultraviolet radiation to change the test lens from the bleached state to an activated (i.e., darkened) state. Data was collected at selected intervals of time, measuring the transmittance in the activated state, and calculating the change in optical density according to the formula: ΔOD=log(% Tb/%

Ta), where % Tb is the percent transmittance in the bleached state, % Ta is the percent transmittance in the activated state and the logarithm is to the base 10.

The fade half life (T1/2) is the time interval in seconds for the ΔOD of the activated form of the photochromic compound in the test samples to reach one half the ΔOD measured after fifteen minutes, or after saturation or near-saturation was achieved, at room temperature after removal of the source of activating light, e.g., by closing the shutter. The results of these tests are presented in Table 7.

TABLE 7

| Example No. | $\lambda_{max-vis}$ (nm) | Absorption Ratio | T½ (seconds) |
|---|---|---|---|
| Example 15 | 465 | 5.25 | 145 |
| Example 15* | 465 | 5.12 | 149 |
| Example 16 | 578 | 4.05 | 164 |
| Example 17 | 556 | 1.21 | 109 |
| Example 18 | 585 | 1.24 | 84 |
| Example 19 | 442 | 4.47 | — |
| Example 19* | 442 | 4.57 | — |
| Example 20 | 579 | 3.78 | 167 |
| Example 21 | 586 | 1.20 | 85 |
| Example 22 | 465 | 3.61 | 295 |
| Example 23 | 578 | 2.31 | 258 |
| Example 24 | 465 | 3.66 | 184 |
| Example 25 | 577 | 3.50 | 255 |
| Example 26 | 465 | 5.48 | 248 |
| Example 27 | 679 | 4.31 | — |
| Example 28 | 557 | 1.20 | 196 |
| Example 29 | 464 | 3.74 | 174 |
| Example 30 | 555 | 1.16 | 168 |
| CE 2 | 466 | 6.79 | 3042 |
| CE 3 | 581 | 4.72 | >3600 |
| CE 4 | 559 | 1.25 | 1065 |
| CE 5 | 585 | 1.33 | 1590 |
| CE 6 | 443 | 7.28 | — |
| CE 7 | 678 | 5.18 | — |

Example No.* denotes a sample having an alignment layer of rubbed TAC.

The invention claimed is:

1. A liquid crystal composition comprising:
   a mesogen containing compound represented by one of the following structures:

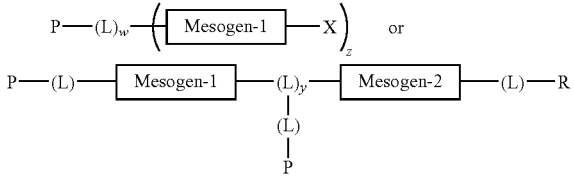

wherein,
a) each X is independently:
   i) a group R,
   ii) a group represented by -(L)$_y$-R,
   iii) a group represented by -(L)-R,
   iv) a group represented by -(L)$_w$-Q;
   v) a group represented by

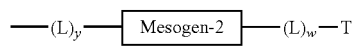

vi) a group represented by -(L)$_y$-P; or
   vii) a group represented by -(L)$_w$-[(L)$_w$-P]$_y$;
b) each P is a reactive group independently selected from a group Q, amino, alkylamino, nitro, acrylate, methacrylate, 2-chloroacrylate, 2-phenylacrylate, acryloylphenylene, acrylamide, methacrylamide, 2-chloroacrylamide, 2-phenylacryiamide, oxetane, glycidyl, cyano, vinyl ether, vinyl ester, a styrene derivative, siloxane, ethyleneimine derivatives, or substituted or unsubstituted chiral or non-chiral monovalent or divalent groups chosen from steroid radicals, terpenoid radicals, alkaloid radicals and mixtures thereof, wherein the substituents are independently chosen from alkyl, alkoxy, amino, cycloalkyl, alkylalkoxy, fluoroalkyl, cyano, cyanoalkyl, cyanoalkoxy or mixtures thereof, or P is a structure having from 2 to 4 reactive groups or P is an unsubstituted or substituted ring opening metathesis polymerization precursor;
c) the group Q is hydroxy, amine, alkenyl, alkynyl, azido, silyl, silylhydride, oxy(tetrahydro-2H-pyran-2-yl), thiol, isocyanato, thioisocyanato, acryloxy, methacryloxy, 2-(acryloxy)ethylcarbamyl, 2-(methacryloxy)ethylcarbamyl, aziridinyl, allyloxycarbonyloxy, epoxy, carboxylic acid, carboxylic acid derivatives selected from carboxylic ester, amide and carboxylic anhydride, or acyl halide, unsubstituted cinnamic acid derivatives, cinnamic acid derivatives that are substituted with at least one of methyl, methoxy, cyano and halogen;
d) each L is independently chosen for each occurrence, the same or different, from a single bond, a polysubstituted, monosubstituted, unsubstituted or branched spacer independently chosen from arylene, ($C_1$-$C_{30}$)alkylene, ($C_1$-$C_{30}$)alkylenecarbonyloxy, ($C_1$-$C_{30}$)alkyleneamino, ($C_1$-$C_{30}$)alkyleneoxy, ($C_1$-$C_{30}$)perfluoroalkylene, ($C_1$-$C_{30}$)perfluoroalkyleneoxy, ($C_1$-$C_{30}$)alkylenesilyl, ($C_1$-$C_{30}$)dialkylenesiloxyl, ($C_1$-$C_{30}$)alkylenecarbonyl, ($C_1$-$C_{30}$)alkyleneoxycarbonyl, ($C_1$-$C_{30}$) alkylenecarbonylamino, ($C_1$-$C_{30}$) alkyleneaminocarbonyl, ($C_1$-$C_{30}$) alkyleneaminocarbonyloxy, ($C_1$-$C_{30}$) alkyleneaminocarbonylamino, ($C_1$-$C_{30}$)alkyleneurea, ($C_1$-$C_{30}$)alkylenethiocarbonylamino, ($C_1$-$C_{30}$)alkyleneaminocarbonylthio, ($C_2$-$C_{30}$)alkenylene, ($C_1$-$C_{30}$) thioalkylene, ($C_1$-$C_{30}$)alkylenesulfone, or ($C_1$-$C_{30}$) alkylenesulfoxide, wherein each substituent is independently chosen from ($C_1$-$C_5$)alkyl, ($C_1$-$C_5$) alkoxy, fluoro, chloro, bromo, cyano, ($C_1$-$C_5$)alkanoate ester, isocyanato, thioisocyanato, or phenyl;
e) the group R is selected from hydrogen, $C_1$-$C_{18}$ alkyl, $C_1$-$C_{18}$ alkoxy, $C_1$-$C_{18}$ alkoxycarbonyl, $C_3$-$C_{10}$ cycloalkyl, $C_3$-$C_{10}$ cycloalkoxy, poly($C_1$-$C_{18}$ alkoxy), or a straight-chain or branched $C_1$-$C_{18}$ alkyl group that is unsubstituted or substituted with cyano, fluoro, chloro, bromo, or $C_1$-$C_{18}$ alkoxy, or poly-substituted with fluoro, chloro, or bromo; and
f) the groups Mesogen-1 and Mesogen-2 are each independently a rigid straight rod-like liquid crystal group, a rigid bent rod-like liquid crystal group, or a rigid disc-like liquid crystal group;
g) the group T is selected from P and hydrogen, aryl, alkyl, alkoxy, alkylalkoxy, alkoxyalkoxy, polyalkylether, ($C_1$-$C_6$)alkyl($C_1$-$C_6$)-alkoxy($C_1$-$C_6$)alkyl, polyethyleneoxy and polypropyleneoxy;
wherein w is an integer from 1 to 26, y is an integer from 2 to 25, z is 1 or 2, provided that when:
   (i) the group X is represented by R, then w is an integer from 2 to 25, and z is 1;
   (ii) the group X is represented by -(L)$_y$-R, then w is 1, y is an integer from 2 to 25, and z is 1;
   (iii) the group X is represented by -(L)$_w$-R, then w is an integer from 3 to 26, and z is 2;

(iv) the group X is represented by -(L)$_w$-Q; then if P is represented by the group Q, then w is 1, and z is 1; and if P is other than the group Q, then each w is independently an integer from 1 to 26, and z is 1;

(v) the group X is represented by

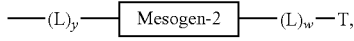

—(L)$_y$—[Mesogen-2]—(L)$_w$—T, then w is 1, y is an integer from 2 to 25, and z is 1;

(vi) the group X is represented by -(L)$_y$-P, then w is 1, y is an integer from 2 to 25, and z is 1 and -(L)$_y$-comprises a linear sequence of at least 25 bonds between the mesogen and P;

(vii) the group X is represented by -(L)$_w$-[(L)$_w$-P]$_y$, then each w is independently an integer from 1 to 25, y is an integer from 2 to 6, whereby and z is 1; and in -(L)$_y$- and -(L)$_w$-no two arylene groups are linked by a single bond;

or residue thereof;

a compound selected from a photochromic compound, a dichroic compound and a photochromic-dichroic compound; and optionally a liquid crystal polymer.

2. The composition of claim 1, wherein the groups Mesogen-1 and Mesogen-2 in the mesogen containing compound independently have a structure represented by:

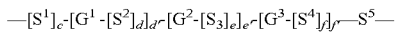

—[S$^1$]$_c$-[G$^1$-[S$^2$]$_d$]$_{d'}$-[G$^2$-[S$^3$]$_e$]$_{e'}$-[G$^3$-[S$^4$]$_f$]$_{f'}$—S$^5$— wherein:

(i) each G$^1$, G$^2$, and G$^3$ is independently chosen for each occurrence from: a divalent group chosen from: an unsubstituted or a substituted aromatic group, an unsubstituted or a substituted alicyclic group, an unsubstituted or a substituted heterocyclic group, and mixtures thereof, wherein substituents are chosen from: thiol, hydroxy($C_1$-$C_{18}$)alkyl, isocyanato($C_1$-$C_{18}$)alkyl, acryloyloxy, acryloyloxy($C_1$-$C_{18}$)alkyl, halogen, $C_1$-$C_{18}$ alkoxy, poly($C_1$-$C_{18}$ alkoxy), amino, amino($C_1$-$C_{18}$)alkylene, $C_1$-$C_{18}$ alkylamino, di-($C_1$-$C_{18}$)alkylamino, $C_1$-$C_{18}$ alkyl, $C_2$-$C_{18}$ alkenyl, $C_2$-$C_{18}$ alkynyl, $C_1$-$C_{18}$ alkyl($C_1$-$C_{18}$)alkoxy, $C_1$-$C_{18}$ alkoxycarbonyl, $C_1$-$C_{18}$ alkylcarbonyl, $C_1$-$C_{18}$ alkyloxycarbonyloxy, aryloxycarbonyloxy, perfluoro($C_1$-$C_{18}$)alkylamino, di-(perfluoro($C_1$-$C_{18}$)alkyl)amino, $C_1$-$C_{18}$ acetyl, $C_3$-$C_{10}$ cycloalkyl, $C_3$-$C_{10}$ cycloalkoxy, isocyanato, amido, cyano, nitro, a straight-chain or branched $C_1$-$C_{18}$ alkyl group that is mono-substituted with cyano, halo, or $C_1$-$C_{18}$ alkoxy, or poly-substituted with halo, and a group comprising one of the following formulae: -M(T)$_{(t-1)}$, and -M(OT)$_{(t-1)}$, wherein M is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and t is the valence of M;

(ii) c, d, e, and f are each independently chosen from an integer ranging from 0 to 20, inclusive; d', e' and f' are each independently an integer from 0 to 4 provided that a sum of d'+e'+f' is at least 2; and each S$^1$, S$^2$, S$^3$, S$^4$, and S$^5$ is independently chosen for each occurrence from a spacer unit chosen from:

(A) —(CH$_2$)$_g$—, —(CF$_2$)$_h$—, —Si(CH$_2$)$_g$—, or —(Si(CH$_3$)$_2$O)$_h$—, wherein g is independently chosen for each occurrence from 1 to 20 and h is a whole number from 1 to 16 inclusive;

(B) —N(Z)—, —C(Z)=C(Z)—, —C(Z)=N—, —C(Z')$_2$—C(Z')$_2$—, or a single bond, wherein Z is independently chosen for each occurrence from hydrogen, $C_1$-$C_6$ alkyl, cycloalkyl and aryl, and Z' is independently chosen for each occurrence from $C_1$-$C_6$ alkyl, cycloalkyl and aryl; or (C) —O—, —C(O)—, —C≡C—, —N=N—, —S—, —S(O)—, —S(O)(O)—, —(O)S(O)O—, —O(O)S(O)O—or straight-chain or branched $C_1$-$C_{24}$ alkylene residue, said $C_1$-$C_{24}$ alkylene residue being unsubstituted, mono-substituted by cyano or halo, or poly-substituted by halo;

provided that when two spacer units comprising heteroatoms are linked together the spacer units are linked so that heteroatoms are not directly linked to each other and when S$_1$ and S$_5$ are linked to another group, they are linked so that two heteroatoms are not directly linked to each other.

3. The composition of claim 1, wherein the mesogen containing compound is selected from the group consisting of:

a) 1,12-bis{2-(4-(4-(4-(3-(methacryloyloxy)propyloxy)benzoyloxy)phenyl) benzoyloxy)ethyloxy)dodecyl-1,12-dione;

b) 1,12-bis(6-(4-(4-(4-(6-(methacryloyloxy)hexyloxy)benzoyloxy)phenyl) benzoyloxy)hexyloxy)dodecyl-1,12-dione;

c) 1,10-bis(6-(4-(4-(4-(6-(methacryloyloxy)hexyloxy)benzoyloxy)phenyl) benzoyloxy)hexyloxy) 2,2,3,3,4,4,5,5,6,6,7,7,8,8,9,9-hexadecafluorodecyl-1,10-dione;

d) 1,12-bis{6-(4-(4-(6-methacryloyloxyhexyloxy)benzoyloxy)benzoyloxy) hexyloxy)dodecyl-1,12-dione;

e) 1-{3-(4-(3-(4-(6-(4(4-(4-(6-methacryloyloxyhexyloxy)benzoyloxy)phenyl) benzoyloxy)hexyloxy)-4-oxobutoyloxy)propyloxy)benzoyloxy)propyloxy}-4-{(6-(4(4-(4-(6-methacryloyioxyhexyloxy)benzoyloxy)phenyl)benzoyloxy)hexyloxy)}butane-1,4-dione;

f) 1-{3-(4-(3-(4-6-(4-(4-(trans-4-propylcyclohexyl)phenoxycarbonyl)phenoxy) hexyloxy)-4-oxobutanoyloxy)propyloxy)benzoyloxy)propyloxy}-4-{6-(4-(4-(trans-4-propylcyclohexyl)phenoxycarbonyl)phenoxy)hexyloxy)butane-1,4-dione;

g) 2,2'-bis (6-(6-(4-(4-(trans-4-propylcyclohexyl)phenoxycarbonyl)phenoxy) hexanoyloxy)-6-hexanoyloxy)diethylether;

h) 1-{6-(6-(6-(6-(6-(6-(6-(4-(6-(4-(4-(4-nonylbenzoyloxy)phenoxycarbonyl) phenoxy)hexyloxy)-4-oxobutanoyloxy)hexyloxy)-6-carbonyloxyhexyloxy)-6-carbonyloxyhexyloxy)-6-carbonyloxyhexyloxy)-6-carbonyloxyhexyloxy)-6-carbonyloxyhexyloxy}-4-{6-(4-(6-(4-(4-(4-nonylbenzoyloxy) phenoxycarbonyl)phenoxy)hexyloxy)butane-}1,4-dione;

i) 2,5-bis(4-(12-hydroxydodecyloxy)benzoyloxy))toluene;

j) 2,5-bis(4-(12-tetrahydro-2H-pyran-2-yloxydodecyloxy)benzoyloxy)toluene;

k) 2-(6-(4-(4-(6-(tetrahydro-2H-pyran-2-yloxy)hexyloxy)benzyloxy)phenoxy) hexyloxy)tetrahydro-2H-pyran;

l) (1R,4R)-bis(4-(6-(tetrahydro-2H-pyran-2-yloxy)hexyloxy)phenyl) cyclohexane -1,4-dicarboxylate;

m) 2-(6-(4-(4-(6-(tetrahydro-2H-pyran-2-yloxy)dodecyloxy)benzoyloxy)phenoxy) hexyloxy)tetrahydro-2H-pyran;

n) 6-(4-(4-(12-hydroxydodecyloxy)benzoyloxy)phenoxy) hexan-1-ol;

o) 2-(5-(trans-4-(4-(6-(tetrahydro-2H-pyran-2-yloxy) hexyloxy)cyclohexyl) benzyloxy)pentyloxy)tetrahydro-2H-pyran;

p) 6-(tetrahydro-2H-pyran-2-yloxy)hexyl 2,5-bis(6-(3-(6-(4-(4-(trans-4-pentylcyclohexyl)phenoxycarbonyl)phenoxy)hexyloxy)-4-oxobutoyloxy)hexyloxy) benzoate;

q) 2,5-bis{6-(4-(6-(4-(trans-4-propylcyclohexyl)phenoxy)hexyloxy)-4-oxobutoyloxy)hexyloxy}-1-(6-(tetrahydro-2H-pyran-2-yloxy)hexyl)benzoate;

r) 2,5-bis{6-(4-(6-(4-(trans-4-propylcyclohexyl)phenoxy) hexyloxy)-4-oxobutoyloxy)hexyloxy}-1-(6-methacryloyloxyhexAbenzoate;

s) 2,5-bis{6-(4-(6-(4-(trans-4-propylcyclohexyl)phenoxy) hexyloxy)-4-oxobutoyloxy)hexyloxy}-1-(6-hydroxyhexyl)benzoate;

t) 6-(tetrahydro-2H-pyran-2-yloxy)hexyl 2,5-bis(8-(3-(8-(4-(4-(trans-4-pentylcyclohexyl)phenoxylcarbonyl) phenoxy)octyloxy)-4-oxobutoyloxy)octyloxy) benzoate;

u) 6-hydroxyhexyl 2,5-bis(8-(3-(8-(4-(4-(trans-4-pentylcyclohexyl) phenoxylcarbonyl)phenoxy)octyloxy)-4-oxobutoyloxy)octyloxy)benzoate;

v) 6-methacryloyloxyhexyl 2,5-bis(8-(3-(8-(4-(4-(trans-4-pentylcyclohexyl) phenoxylcarbonyl)phenoxy)octyloxy)-4-oxobutoyloxy)octyloxy)benzoate;

w) 1,2-bis(4-(6-(tetrahydro-2H-pyran-2-yloxy)hexyloxy) phenyl)ethanone;

x) 2-(6-(4-(trans-4-(12-(1-tetrahydro-2H-pyran-2-yloxy) dodecanoyloxy) cyclohexyl)phenoxy)hexyloxy)tetrahydro-2H-pyran;

y) 1-(11-(4-(trans-4-(4-(6-(1-(tetrahydro-2H-pyran-2-yloxy)hexyloxy)phenyl) cyclohexyloxycarbonyl)phenoxy)undecanoxy)prop-2-en-1-one;

z) 1-(6-(6-(6-(6-(6-(6-(6-(4-(4-(trans-4-pentylcyclohexyl) phenoxycarbonyl) phenoxy)hexyloxy)-6-oxohexyloxy)-6-oxohexyloxy)-6-oxohexyloxy)-6-oxohexyloxy)-6-oxohexyloxy)-2-methylprop-2-en-1-one;

aa) 1-(6-(6-(6-(6-(4-(4-(trans-4-pentylcyclohexyl)phenoxy)hexyloxy)-6-oxonexyloxy) -6-oxohexyloxy)-6-oxohexyloxy)-2-methylprop-2-en-1-one;

bb) 1-(6-(6-(6-(6-(6-(6-(6-(6-(6-(6-(6-(6-(6-(6-(6-(6-(6-(6-(6-(4-(4-(trans-4-pentylcyclohexyl)phenoxycarbonyl)phenoxy)hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxonexyloxy)-6-oxonexyloxy)-6-oxohexyloxy)-6-oxohexyloxy)-6-oxohexanol;

cc) 1,2-bis(4-(6-(tetrahydro-2H-pyran-2-yloxy)hexyloxy) phenyl)ethane;

dd) 2-(6-(trans-4-(4-(12-(tetrahydro-2H-pyran-2-yloxy) dodecanoyloxy)cyclohexyl) phenoxy)-12-oxododecanoxy)tetrahydro-2H-pyran;

ee) 1-(6-(6-(6-(6-(6-(6-(6-(6-(4-(4-(trans-4-pentylcyclohexyl)phenoxylcarbonyl) phenoxy)hexyloxy)-6-oxohexyloxy)-6-oxohexyloxy)-6-oxohexyloxy)-6-oxohexyloxy)-6-oxohexyloxy)-6-oxonexyloxy)-6-oxohexyloxy)-2-rnethylprop -2-en -1-one;

ff) 1-(5-(5-(5-(5-(6-(4-(4-(trans-4-pentylcyclohexyl)phenoxycarbonyl)phenoxy) hexyloxy)-5-oxopentyloxy)-5-oxopentyloxy)-5-oxopentyloxy)-5-oxopentyloxy)-2-methylprop-2-en-1-one;

gg) 1-(6-(6-(6-(6-(4-(4-(trans-4-pentylcyclohexyl)phenoxycarbonyl)phenoxy) hexyloxy)-6-oxohexyloxy)-6-oxohexyloxy)-6-oxonexyloxy)-2-methylprop-2-en-1-one;

hh) 1-(6-(6-(6-(6-(6-(6-(6-(6-(6-(6-(6-(6-(6-(4-(4-(trans-4-pentylcyclohexyl) phenoxycarbonyl)phenoxy)hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-en -1-one;

ii) 1-(6-(6-(6-(6-(6-(6-(6-(6-(6-(6-(6-(6-(6-(6-(6-(6-(4-(4-(trans-4-pentylcyclohexyl) phenoxycarbonyl) phenoxy) hexyloxy)-6-oxohexyloxy)-6-oxohexyloxy)-6-oxohexyloxy)-6-oxonexyloxy)-6-oxohexyloxy)-6-oxonexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxonexyloxy)-6-oxohexyloxy)-2-methylprop-2-en-1-one;

jj) 1-(6-(5-(5-(6-(5-(6-(5-(6-(6-(4-(4-(trans-4-pentylcyclohexyl) phenoxycarbonyl)phenoxy)hexyloxy)-6-oxohexyloxy)-5-oxopentyloxy)-6-oxohexyloxy)-5-oxopentyloxy)-6-oxohexyloxy)-5-oxopentyloxy)-5-oxopentyloxy) -8-oxohexyloxy)-2-methylprop-2-en-1-one;

kk) 1-(6-(5-(6-(6-(4-(4-(trans-4-pentylcyclohexyl)phenoxycarbonyl)phenoxy) hexyloxy)-6-oxohexyloxy)-5-oxopentyloxy)-6-oxohexyloxy)-2-methylprop-2-en-1-one;

ll) 1-(6-(6-(6-(6-(4-(4-(trans-4-pentylcyclohexyl)phenoxycarbonyl)phenoxy) hexyloxy)-6-oxohexyloxy)-6-oxohexyloxy)-6-oxohexyloxy)-2-methylprop-2-en-1-one;

mm) 1-(6-(6-(6-(6-(6-(6-(6-(6-(6-(6-(4-(4-(trans-4-pentylcyclohexyl)phenyl)phenoxy) nexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one;

nn) 1-(6-(6-(6-(6-(6-(6-(6-(6-(6-(6-(4-(4-(trans-4-pentylcyclohexyl) phenyloxycarbonyl)phenoxy)hexyloxy)-6-oxonexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxonexyloxy)-2-methylprop-2-en-1-one;

oo) 1-(6-(6-(6-(6-(6-(6-(6-(6-(6-(6-(4-(4-(trans-4-propylcyclohexyl)phenyloxy) hexanoyl)hexanoyl)hexanoyphexanoyphexanoyi)hexanoyl)-hexanoyl)hexanoyloxy)-prop-2-ene;

pp) 1-{3-(3-methacryloyloxy-2,2-dimethylpropyloxy)-3-oxo-2-methylpropyl}-3-{(8-(4-(trans-4-(trans-4-pentylcyclohexyl)-cyclohexyloxycarbonyl)phenoxy)octyloxycarbonyl) ethyt)}-hexamethylenetrisiloxane;

qq) 2,5-bis(4-(8-hydroxyoctyloxy)benzoyloxy)toluene;

rr) 2,5-bis(4-(8-(6-hydroxyhexyloyloxy)octyloxy)benzoyloxy)toluene;

ss) 1-(6-(6-(6-(6-(6-(6-(6-(8-(4-(4-(4-hexyloxybenzoyloxy)phenoxycarbonyl) phenoxy)octyloxy)-6-oxohexyloxy)-6-oxonexyloxy)-6-oxohexyloxy)-6-oxohexyloxy)-6-oxonexyfoxy)-6-oxohexyloxy)-6-oxotiexyloxy)-6-oxohexyloxy)-2-methylprop -2-en -1-one;

tt) 1-(6-(6-(6-(8-(4-(4-(4-hexyloxybenzoyloxy)phenoxycarbonyl)phenoxy) octyloxy) -6-oxohexyloxy)-6-oxonexyloxy)-6-oxohexyloxy)-2-methylprop-2-en-1-one;

uu) 4-{4-(6-(6-(6-hydroxyhexanoyloxy)hexanoyloxy) hexyloxy)benzoyloxy}-3-methoxy -1-ethyl cinnamate;

vv) 1-(6-(6-(6-(6-(6-(6-(6-(6-(6-(6-(4-(4-(trans-4-pentylcyclonexyl) phenyloxycarbonyl)phenoxy)hexyloxy)-6-oxohexyloxy)-6-oxonexyloxy)-6-oxonexyloxy)-6-oxonexyloxy)-6-oxohexyloxy)-6- ww) 1-(6-(6-(6-(4-(4-(trans-4-pentylcyclohexyl)phenyloxycarbonyl)phenoxy) hexyloxy) -6-oxohexyloxy)-6-oxohexyloxy)-2-methylprop-2-en-l-one;

xx) 1-(6-(6-(6-(6-(6-(6-(6-(6-(6-(6-(trans-4-(4-(4-hexyloxybenzoyioxy) phenoxycarbonyl)cyclohexyloxy)hexyloxy)-6-oxohexyloxy)-6-oxonexyloxy)-6-oxohexyloxy)-6-oxonexyloxy)-6-oxohexyloxy)-6-oxohexyloxy)-6-oxonexyloxy)-6-oxohexyloxy)-6-oxohexyloxy)-6-oxohexyloxy)-2-methylprop-2-en-1-one;

yy) 1-(6-(6-(6-(6-(trans-4-(4-(4-hexyloxybenzoyloxy) phenoxycarbonyl) cyclohexyloxy)hexyloxy)-6-oxohexyloxy)-6-oxonexyloxy)-6-oxonexyloxy)-2-methylprop-2-en-1-one;

zz) 2,8-di(4-(6-(6-(6-(6-(6-hydroxyhexanoyloxy)hexanoyloxy)hexanoyloxy) hexanoyloxy)hexanoyloxy) benzoyloxylnaphthalene;

aaa) 2,8-di{4-(6-(6-(6-(6-(6-(methacryloyloxy)hexanoyloxy)hexanoyloxy) hexanoyloxy)hexanoyloxy)hexanoyloxy)benzoyloxy}naphthalene;

bbb) 2,8-di{4-(6-(6-(6-(6-(6-hydroxyhexanoyloxy)hexanoyloxy)hexanoyloxy) hexanoyloxy)benzoyloxy}naphthalene;

ccc) 4-{4-(6-(6-(6-hydroxyhexanoyloxy)hexanoyloxyl) octyloxy)benzoyloxy}-3-methoxy -1-ethyl cinnamate;

ddd) 1-(6-(6-(6-(6-(6-(6-(6-(6-(8-(4-(4-methylbenzoyloxy)phenyloxycarbonyl) phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one;

eee) 1-(6-(6-(6-(6-(8-(4-(4-methylbenzoyloxy)phenyloxycarbonyl)phenoxy) octyloxy)-6-oxohexyloxy)-6-oxohexyloxy)-6-oxohexyloxy)-2-methylprop-2-en-1-one;

fff) 4,4'-bis(4-(8-(tetrahydro-2H-pyran-2-yloxy)octyloxy) benzoyloxy)biphenyl;

ggg) 1-(6-(4-(4-(trans-4-(6-hydroxyhexyloxy)cyclohexyl) phenyloxycarbonyl) phenyloxy)hexyloxy)prop-2-en-1-one;

hhh) 1-(6-(6-(6-(6-(trans-4-(4-(4-methylbenzoyloxy)phenyl)cyclohexyloxy) hexyloxy)-6-oxohexyloxy)-6-oxohexykoxy)-6-oxohexyloxy)-2-methylprop-2-en-1-one iii) 4,4'-bis(4-(8-hydroxyoctyloxy)benzoyloxy)biphenyl;

jjj) 1-(6-(6-(6-(6-(trans-4-(4-(4-(6-acryloyloxy hexyloxy) benzoyl oxy) phenyl) cyclohexyloxy)hexyloxy)-6-oxohexyloxy)-6-oxohexyloxy)-6-oxohexyloxy)-2-methylprop-2-en-1-one;

kkk) 1-(6-(6-(6-(6-(6-(6-(trans-4-(4-(4-(6-acryloyloxyhexyloxy)benzoyloxy)phenyl) cyclohexyloxy)hexyfoxy)-6-oxohexyloxy)-6-oxohexyloxy)-6-oxohexyloxy)-6-oxohexyloxy)-6-oxohexyloxy)pentan-1-one;

lll) 2-(8-(4-(4-(4-(4-(6-acryloyloxy)hexyloxy)benzoyloxy)phenyl) phenyloxycarbonyl)phenoxy)octyloxy) tetrahydro-2H-pyran;

mmm) 8-(4-(4-(4-(4-(6-acryloyloxy)hexyloxy)benzoyloxy)phenyl)phenyloxycarbonyl) phenoxy)octan-1-ol;

nnn) 1,4-bis-{(6-(6-(6-(6-(6-(6-(trans-4-(4-(6-acryloyloxyhexyloxy)benzoyloxy) phenyl)cyclohexyloxy) hexyloxy)-6-oxohexyloxy)-6-oxohexyloxy)-6-oxohexyloxy) -6-oxohexyloxy)-6-oxohexyloxy}butan-1,4-dione;

ooo) 1-(6-(6-(6-(4-(4-(4-(4-(6-acryloyloxyhexyloxy)benzoyloxy)phenyl) phenyloxy)octyloxy)-6-oxohexyloxy)-6-oxohexyloxy)-2-methylprop-2-en-1-one;

ppp) 1,4-bis{(6-(6-(6-(6-(6-(4-(4-(4-(4-(6-acryloyloxyhexyloxy)benzoyloxy)phenyl) phenyloxycarbonyl)phenyloxy)hexyloxy)-6-oxohexyloxy)-6-oxohexyloxy)-6-oxohexyloxy)-6-oxohexyloxyl}butan-1,4-dione;

qqq) 1-(6-(8-(4-(4-(4-(4-(8-(6-niethacryloyloxy)hexyloyloxy)octyloxy)benzoyloxy) phenyl)phenyloxycarbonyl)phenyloxy)octyloxy)-6-oxohexyloxy)-2-methylprop-2-en-1-one;

rrr) 1-(6-(6-(6-(6-(6-(6-(6-(6-(6-(6-(4-(4-(trans-4-pentylcyclohexyl) phenyloxycarbonyl)phenoxy)hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one;

sss) 1-(6-(6-(6-(6-(4-(4-(trans-4-pentylcyclohexyl)phenyloxyca rbonyl)phenoxy) hexyloxy)-6-oxohexyloxy)-6-oxohexyloxy)-6-oxohexyloxy)-2-methylprop-2-en-1one;

ttt) 1-(6-(6-(6-(6-(6-(6-(6-(6-(6-(6-(6-(6-(4-(4-(trans-4-pentylcyclohexyl) phenyloxycarbonyl)phenoxy) hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop -2-en -1-one;

uuu) 1-(6-(6-(6-(6-(6-(6-(6-(4-(4-(trans-4-pentylcyclohexyl)phenyloxycarbonyl) phenoxy)hexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one;

vvv) 1-(6-(6-(8-(4-(4-methylbenzoyloxy)phenyloxycarbonyl)phenoxy)octyloxy)-6-oxohexyloxy)-2-methylprop-2-en-1-one;

www) 1-(5-(5-(5-(5-(5-(5-(6-(4-(4-(trans-4-propyicyclohexyl)phenyloxycarbonyl) phenoxy)hexyloxy)-5-oxopentyloxy)-5-oxopentyloxy)-5-oxopentyloxy)-5-oxopentyloxy)-5-oxopentyloxy)-5-oxopentyloxy)-2-rnethylprop-2-en-1-one;

xxx) 1-(5-(5-(6-(5-(6-(5-(6-(6-(4-(4-(trans-4-propylcyclohexyl)phenoxycarbonyl) phenoxy)hexyloxy)-6-oxohexyloxy)-5-oxopentyloxy)-6-oxohexyloxy)-5-oxopentyloxy)-6-oxohexyloxy)-5-oxopentyloxy)-5-oxopentyloxy)-2-met hylprop-2-en-1-one;

yyy) 1-(6-(8-(4-(4-(4-(4-(8-(6-methacryloyloxy)hexyloioxy)octyloxy)benzoyloxy) phenyl)phenyloxycarbonyl)phenyloxy)octyloxy)-6-oxohexyloxy)-2-methylprop-2-en-1-one;

zzz) 1-(11-(4-(4-(4-(6-(11-(tetrahydro-2H-pyran-2-yloxy)undecanyloxy)benzoyloxy) phenoxycarbonyl)phenoxy)hexyloxy)prop-2-en-1-one;

aaaa) 1,4-bis(4-(11-(tetrahydro-2H-pyran-2-yloxy)undecanyloxy)benzoyloxy)benzene;

bbbb) 1-(6-(6-(6-(4-(trans-4-pentylcyclohexyl)phenoxycarbonyl)phenoxy)hexyloxy)-6-oxohexyloxy)-6-oxohexyloxy)-2-methylprop-2-en-1-one;

cccc) 1-(6-(6-(6-(4-(4-benzoyloxyphenoxycarbonyl)phenoxy)hexyloxy)-6-oxohexyloxy)-6-oxohexyloxy)prop-2-en-1-one;

dddd) 1-(6-(6-(6-(6-(6-(6-(6-(6-(4-(4-benzoyloxyphenoxycarbonyl)phenoxy)hexyloxy)-6-oxohexyloxy)-6-oxohexyloxy)-6-oxohexyloxy)-6-oxohexyloxy)-6-oxohexyloxy)-6-oxohexyloxy)prop-2-en-1-one;

eeee) 1-(3-(3-(6-(4-(trans-4-propylcyclohexyl)phenoxycarbonyl)phenoxy)hexyloxy)-3-carbonyloxypropyloxy)-3-carbonyloxypropyloxy)-2-methylprop-2-en-1-one;

ffff) 1-(3-(3-(3-(3-(6-(4-(trans-4-propylcyclohexyl)phenoxycarbonyl)phenoxy) hexyloxy)-3-carbonyloxypropyloxy)-3-carbonyloxypropyloxy)-3-carbonyloxypropyloxy)-3-carbonyloxypropyloxy)-2-nnethylprop-2-en-1-one;

gggg) 1-(6-(6-(6-(4-(trans-4-propylcyclohexyl)phenoxycarbonyl)phenoxy)hexyloxy)-6-oxohexyloxy)-6-oxohexyloxo)-2-methylprop-2-en-1-one;

hhhh) 1-(6-(6-(6-(6-(6-(6-(6-(8-(4-(4-(4-methylbenzoyloxy)phenyloxycarbonyl) phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one;

iiii) 1-(5-(6-(4-(trans-4-propylcyclohexyl)phenoxycarbonyl)phenoxy)hexyloxy)-5-oxopentyloxy)-2-methylprop-2-en-1-one;

jjjj) 1-(5-(6-(4-(4-(4-methylbenzoyloxy)phenyloxycarbonyl)phenoxy)hexyloxy)-5-oxopentyloxy)-2-methylprop-2-en-1-one;

kkkk) 1-(5-(5-(5-(5-(5-(5-(5-(5-(6-(4-(4-(4-methylbenzoyloxy)phenyloxycarbonyl) phenoxy)hexyloxy)-5-oxopentyloxy)-5-oxopentyloxy)-5-oxopentyloxy)-5-oxopentyloxy)-5-oxopentyloxy)-5-oxopentyloxy)-5-oxopentyloxy)-5-oxopentyloxy) -2-methylprop-2-en-1-one;

llll) 2-(6-(4-(4-(4-(6-acryloyloxy)hexyloxy)benzoyloxy)phenyloxycarbonyl) phenoxy)hexan-1-ol;

mmmm) 1-(6-(6-(6-(6-(6-(6-(6-(8-(4-(4-(4-methylbenzoyloxy)phenyloxy carbonyl) phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop -2-en -1-one;

nnnn) 1-(5-(5-(5-(5-(5-(5-(5-(5-(5-(6-(4-(4-(4-methylbenzoyloxy)phenyloxycarbonyl) phenoxy)hexyloxy)-5-oxopentyloxy)-5-oxopentyloxy)-5-oxopentyloxy)-5-oxopentyloxy)-5-oxopentyloxy)-5-oxopentyloxy)-5-oxopentyloxy)-5-oxopentyloxy)-2-methylprop-2-en-1-one;

oooo) 1-(6-(6-(6-(6-(6-(6-(6-(6-(8-(4-(4-(4-methylbenzoyloxy)phenyloxycarbonyl) phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-1-carbonylanninoethyloxy)-2-methylprop-2-en-1-one;

pppp) 1-(6-(6-(6-(6-(6-(6-(6-(6-(6-(6-(4-(4-(4-(6-acryloyloxyhexyloxy)benzoyloxy) phenyloxycarbonyl)phenyloxy)hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one;

qqqq) 1-(6-(6-(6-(6-(4-(4-(4-(6-acryloyloxyhexyloxy)benzoyloxy)phenyloxycarbonyl) phenyloxy)hexyloxy)-6-oxohexyloxy)-6-oxohexyloxy)-6-oxohexyloxy)-2-methylprop-2-en-1-one;

rrrr) 1-(5-(5-(5-(5-(5-(6-(4-(4-(4-(6-acryloyloxyhexyloxy)benzoyloxy) phenyloxycarbonyl)phenyloxy)hexyloxy)-5-oxopentyloxy)-5-oxopentyloxy)-5-oxopentyloxy)-5-oxopentyloxy)-2-methylprop-2-en-1-one;

ssss) 2-(6-(4-(4-(6-acryloyloxy)hexyloxy)benzoyloxy) phenyloxycarbonyl) phenoxy)undecan-1-ol;

tttt) 1-(6-(6-(6-(11-(4-(4-(4-(4-(6-acryloyloxyhexyloxy) benzoyloxy)phenyl) phenyloxycarbonyl)phenyloxy) undecanyloxy)-6-oxohexyloxy)-6-oxohexyloxy)-6-oxohexyloxy)-2-methylprop-2-en-1-one;

uuuu) 1-(6-(6-(6-(6-(6-(6-(6-(8-(4-(4-(4-methoxybenzoyloxy)phenyloxycarbonyl) phenoxy)octyloxy)-6-oxohexyloxy)-6-oxohexyloxy)-6-oxohexyloxy)-6-oxohexyloxy)-6-oxohexyloxy)-6-oxohexyloxy)-2-methylprop -2-en -1-one;

vvvv) 1-(6-(6-(6-(6-(6-(6-(6-(6-(6-(6-(6-(trans-4-(4-(4-methylbenzoyloxy)phenyl) cyclohexyloxy)hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)prop-2-en-1-one;

wwww) 1-(6-(6-(6-(trans-4-(4-(4-methylbenzoyloxy) phenyl)cyclohexyloxy)hexyloxy)-6-oxohexyloxy)-6-oxohexyloxy)prop-2-en-1-one;

xxxx) 1-(6-(6-(6-(6-(6-(6-(6-(6-(6-(6-(6-(6-(6-(6-(6-(6-(6-(6-(6-(trans-4-(4-(4-methylbenzoyloxy)phenyl)cyclohexyloxy)hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)prop-2-en-1-one;

yyyy) 1-(6-(6-(6-(6-(6-(6-(6-(6-(6-(4-(4-(4-ethoxyphenoxycarbonyl) phenyloxycarbonyl)phenoxy)hexyloxy)-6-oxohexyloxy)-6-oxohexyloxy)-6-oxonexyloxy)-6-oxohexy loxy)-6-oxohexyloxy)-6-oxohexyloxy)-6-oxohexyl oxy)-6-oxohexyloxy)-6-oxohexyloxy)-2-rnethylprop-2-en-1-one;

zzzz) 1-(6-(6-(6-(6-(4-(4-(4-ethoxyphenoxycarbonyl) phenyloxycarbonyl)phenoxy) hexyloxy)-6-oxohexyloxy)-6-oxohexyloxy)-6-oxohexyloxy)-2-methyl prop-2-en-1-one;

aaaaa) 1-(6-(6-(6-(6-(6-(6-(6-(6-(6-(6-(6-(4-(4-phenylphenoxycarbonyl)phenoxy) hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)prop-2-en-1-one;

bbbbb) 1-(6-(6-(6-(4-(4-phenylphenoxycarbonyl)phenoxy)hexyloxy)-6-oxohexyloxy)-6-oxohexyloxy)prop-2-en-1-one;

ccccc) 1-(6-(6-(6-(trans-4-(4-(4-phenyl phenoxycarbonyl) phenyl)cyclohexyloxy) hexyloxy)-6-oxohexyloxy)-6-oxohexyloxy)prop-2-en-1-one;

ddddd) 1-(6-(6-(6-(6-(6-(6-(6-(6-(6-(6-(trans-4-(4-(4-phenylphenoxycarbonyl)phenyl) cyclohexyloxy)hexyloxy)-6-oxonexyl oxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyl oxy)prop-2-en-1-one;

eeeee) 1-(6-(6-(6-(6-(6-(6-(6-(6-(6-(4-(4-(4-(6-acryloyloxyhexyloxy)benzoyloxy) phenyloxycarbonyl)phenoxy)hexyloxy)-6-oxohexyloxy)-6-oxohexyloxy)-6-oxohexyloxy)-6-oxohexyloxy)-6-oxonexyloxy)-6-oxohexyloxy)-6-oxohexanol;

fffff) 8-(4-(4-(4-(2,3-diacryloyloxypropyloxy)benzoyloxy)phenoxycarbonyl)phenoxy) octanol;

ggggg) 6-(6-(6-(6-(6-(6-(6-(6-(6-(6-(6-(6-(6-(6-(6-(6-(8-(4-(4-(4-(2,3-diacryloyloxypropyloxy)benzoyloxy)phen oxycarbonyl)phenoxy)octyloxy)-6-oxohexyloxy)-6-oxohexyl oxy)-6-oxohexyloxy)-6- oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxonexyloxy)-6-oxohexyloxy)-6-oxohexan-1-ol;

hhhhh) 8-(4-(4-(4-(11-acryloyloxyundecyloxy)benzoyloxy)phenoxycarbonyl)phenoxy) octanol;

iiiii) 6-(6-(6-(6-(6-(6-(6-(6-(8-(4-(4-(4-(11-acryloyloxyundecanyloxy)benzoyloxy) phenoxycarbonyl)phenoxy)octyloxy) 6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexan-1-ol;

jjjjj) 8-(4-(4-(4-(8-acryloyloxyoctyloxy)benzoyloxy)phenoxycarbonyl)phenoxy) octanol;

kkkkk) 6-(6-(6-(6-(6-(6-(6-(6-(8-(4-(4-(4-(11-acryloyloxyoctyloxy)benzoyloxy) phenoxycarbonyl)phenoxy)octyloxy)6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexan-1-ol;

lllll) 1-[3-(6-(acryloyloxy)hexanoyloxy)-2-(6-(acryloyloxy)hexanoyloxy)methyl)-2-methylpropyloxy]-4-[6-(4-((4-(4-methylbenzoyloxy)phenoxy)carbonyl)phenoxy) hexyloxy]butan-1,4-dione;

mmmmm) 1-[3-(acryloyloxy)-2,2-bis(acryloyloxymethyl)propyloxy]-4[8-(4-((4-(4-methylbenzoyloxy)phenoxy)carbonyl)phenoxy)octyloxy]-butan-1,4-dione; and nnnnn) 1-(6-(6-(6-(6-(6-(8-(4-(4-(4-(8-acryloyloxyoctyloxy)benzoyloxy) phenyloxycarbonyl)phenoxy)octyloxy)-6-oxohexyloxy)-6-oxohexyloxy)-6-oxohexyloxy)-6-oxohexyloxy)-6-oxohexyloxy)pentan-1-one.

4. The composition of claim 1, wherein the mesogen containing compound comprises a liquid crystal monomer.

5. The composition of claim 1, wherein the mesogen containing compound comprises a di-functional monomer that can be incorporated into a polymer backbone.

6. The composition of claim 1, wherein the liquid crystal polymer is present and is a block or non-block copolymer comprised of the mesogen containing compound incorporated into the copolymer.

7. The composition of claim 1, further comprising at least one of a photosensitive material, a non-photosensitive material, and one or more additives, wherein the one of more additives are chosen from the group consisting of a liquid crystal, a liquid crystal property control additive, a non-linear optical material, a dye, an alignment promoter, a kinetic enhancer, a photoinitiator, a thermal initiator, a surfactant, a polymerization inhibitor, a solvent, a light stabilizer, a thermal stabilizer, a mold release agent, a rheology control agent, a gelator, a leveling agent, a free radical scavenger, a coupling agent, a tilt control additive, a block or non-block polymeric material, and an adhesion promoter.

8. The composition of claim 1, wherein the at least one photochromic compound or photochromic-dichroic compound is chosen from the group consisting of indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, non-thermally reversible photochromic compounds, and mixtures thereof.

9. An article of manufacture comprising the liquid crystal composition of claim 1.

10. The article of manufacture of claim 9, wherein the article is an optical element comprising:
a substrate; and
an at least partial layer on at least a portion of the substrate, the layer comprising said liquid crystal composition.

11. The article of claim 10, wherein the at least partial layer is at least partially aligned by exposing at least a portion of the layer to a magnetic field, an electric field, linearly polarized radiation, and/or shear force.

12. The article of claim 10, wherein the at least partial layer is adapted to switch from a first state to a second state in response to at least actinic radiation and to revert back to the first state in response to thermal energy.

13. The article of claim 12 wherein the at least partial layer is adapted to linearly polarize at least transmitted radiation in at least one of the first state and the second state.

14. The article of claim 10, wherein the at least partial layer comprises a liquid crystal phase having at least one of a nematic phase, a smectic phase, or a chiral nematic phase.

15. The article of claim 10, wherein the article is an optical element chosen from an ophthalmic element; a display element; a window; a mirror; and an active and a passive liquid crystal cell element.

16. The article of claim 15 wherein the optical element is an ophthalmic element is chosen from a corrective lens, a non-corrective lens, a contact lens, an intra-ocular lens, a magnifying lens, a protective lens, and a visor.

17. The article of manufacture of claim 9 wherein the article is a liquid crystal cell comprising:
a first substrate having a first surface;
a second substrate having a second surface, wherein the second surface of the second substrate is opposite and spaced apart from the first surface of the first substrate so as to define a region; and
said liquid crystal composition positioned within the region defined by the first surface and the second surface.

18. The article of claim 17, wherein the liquid crystal cell further comprises an at least partial layer chosen from linearly polarizing layers, circularly polarizing layers, elliptically polarizing layers, photochromic layers, reflective layers, tinted layers, retarder layers, and wide-angle view layers connected to at least a portion of a surface of at least one of the first substrate and the second substrate.

19. The article of claim 18, wherein the liquid crystal cell is a pixelated cell comprising a plurality of regions or compartments.

20. A method of forming an ophthalmic element comprising:
formulating a liquid crystal composition according to claim 1;
coating at least a portion of a substrate with the liquid crystal composition;
at least partially aligning at least a portion of the liquid crystal composition in the coating; and
curing the liquid crystal coating layer.

* * * * *